(12) United States Patent
Omaki et al.

(10) Patent No.: US 10,788,362 B2
(45) Date of Patent: Sep. 29, 2020

(54) LIGHT DETECTION DEVICE

(71) Applicant: MITSUBISHI ELECTRIC CORPORATION, Tokyo (JP)

(72) Inventors: Masayuki Omaki, Tokyo (JP); Kenya Nakai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 306 days.

(21) Appl. No.: 15/750,667

(22) PCT Filed: Aug. 3, 2016

(86) PCT No.: PCT/JP2016/072777
§ 371 (c)(1),
(2) Date: Feb. 6, 2018

(87) PCT Pub. No.: WO2017/026344
PCT Pub. Date: Feb. 16, 2017

(65) Prior Publication Data
US 2019/0154500 A1    May 23, 2019

(30) Foreign Application Priority Data
Aug. 7, 2015   (JP) ................................ 2015-156737

(51) Int. Cl.
*G01J 1/42*      (2006.01)
*G01S 3/782*    (2006.01)
(Continued)

(52) U.S. Cl.
CPC ............ *G01J 1/4257* (2013.01); *G01J 1/0411* (2013.01); *G01S 3/782* (2013.01); *G01S 3/784* (2013.01);
(Continued)

(58) Field of Classification Search
CPC ....... G01J 1/0411; G01J 1/4257; Y02A 90/19; G01M 11/00; G01S 17/95; G01S 3/782; G01S 3/784; G01S 7/4814; G01S 7/4972
(Continued)

(56) References Cited

U.S. PATENT DOCUMENTS 5,489,986 A * 2/1996 Magome .................. G03F 9/70
                                                            356/401
6,185,167 B1   2/2001   Arai et al.
(Continued)

FOREIGN PATENT DOCUMENTS

| JP | 11-073658 A | 3/1999 |
|---|---|---|
| JP | 2002-352463 A | 12/2002 |

(Continued)

*Primary Examiner* — Tri T Ton
(74) *Attorney, Agent, or Firm* — Birch, Stewart, Kolasch & Birch, LLP

(57) ABSTRACT

A light detection device includes a diffraction element and a light detection element. The diffraction element diffracts a beam of light that is incident on the diffraction element. The light detection element includes light receivers to receive diffracted light. The diffraction element generates beams of the diffracted light by dividing the beam of light. The light detection element determines a displacement of the beam of light relative to the diffraction element on the basis of quantities of light of the beams of the diffracted light. The light detection element determines an angle change of the beam of light relative to the diffraction element by dividing the quantity of light of one of the beams of the diffracted light.

20 Claims, 30 Drawing Sheets

(51) Int. Cl.

| | | |
|---|---|---|
| *G01S 17/95* | (2006.01) | |
| *G01S 7/481* | (2006.01) | |
| *G01S 7/497* | (2006.01) | |
| *G01S 3/784* | (2006.01) | |
| *G01J 1/04* | (2006.01) | |

(52) U.S. Cl.
CPC .......... *G01S 7/4814* (2013.01); *G01S 7/4972* (2013.01); *G01S 17/95* (2013.01); *Y02A 90/19* (2018.01)

(58) Field of Classification Search
USPC ................................................. 356/121–155
See application file for complete search history.

(56) References Cited

U.S. PATENT DOCUMENTS

| | | | |
|---|---|---|---|
| 9,857,314 B1* | 1/2018 | Yang | .................. G01N 21/4788 |
| 2005/0052649 A1* | 3/2005 | Tsujita | ...................... G01J 3/06 |
| | | | 356/328 |
| 2012/0106310 A1 | 5/2012 | Shinoda et al. | |

FOREIGN PATENT DOCUMENTS

| | | |
|---|---|---|
| JP | 2012-142085 A | 7/2012 |
| JP | 2014-010101 A | 1/2014 |

\* cited by examiner

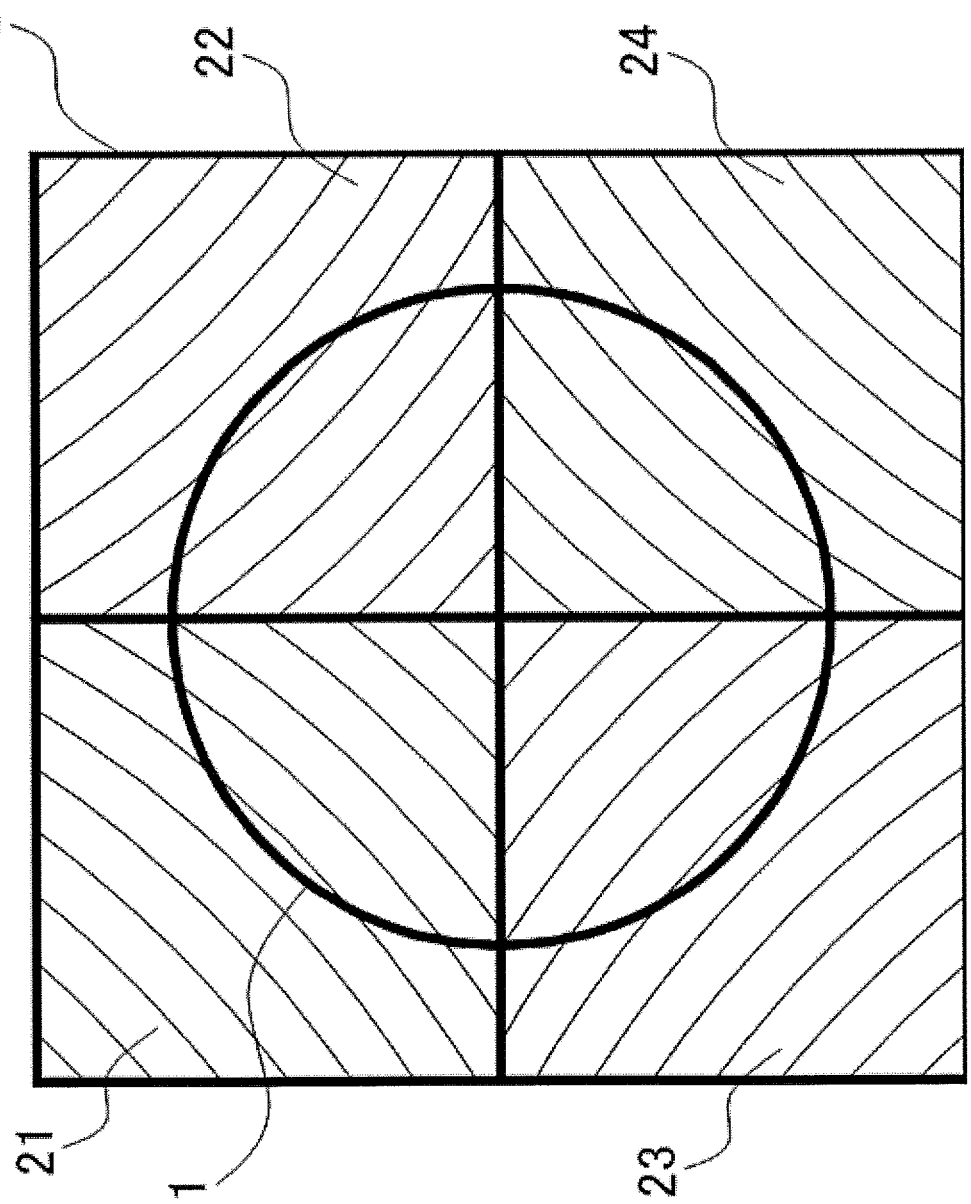

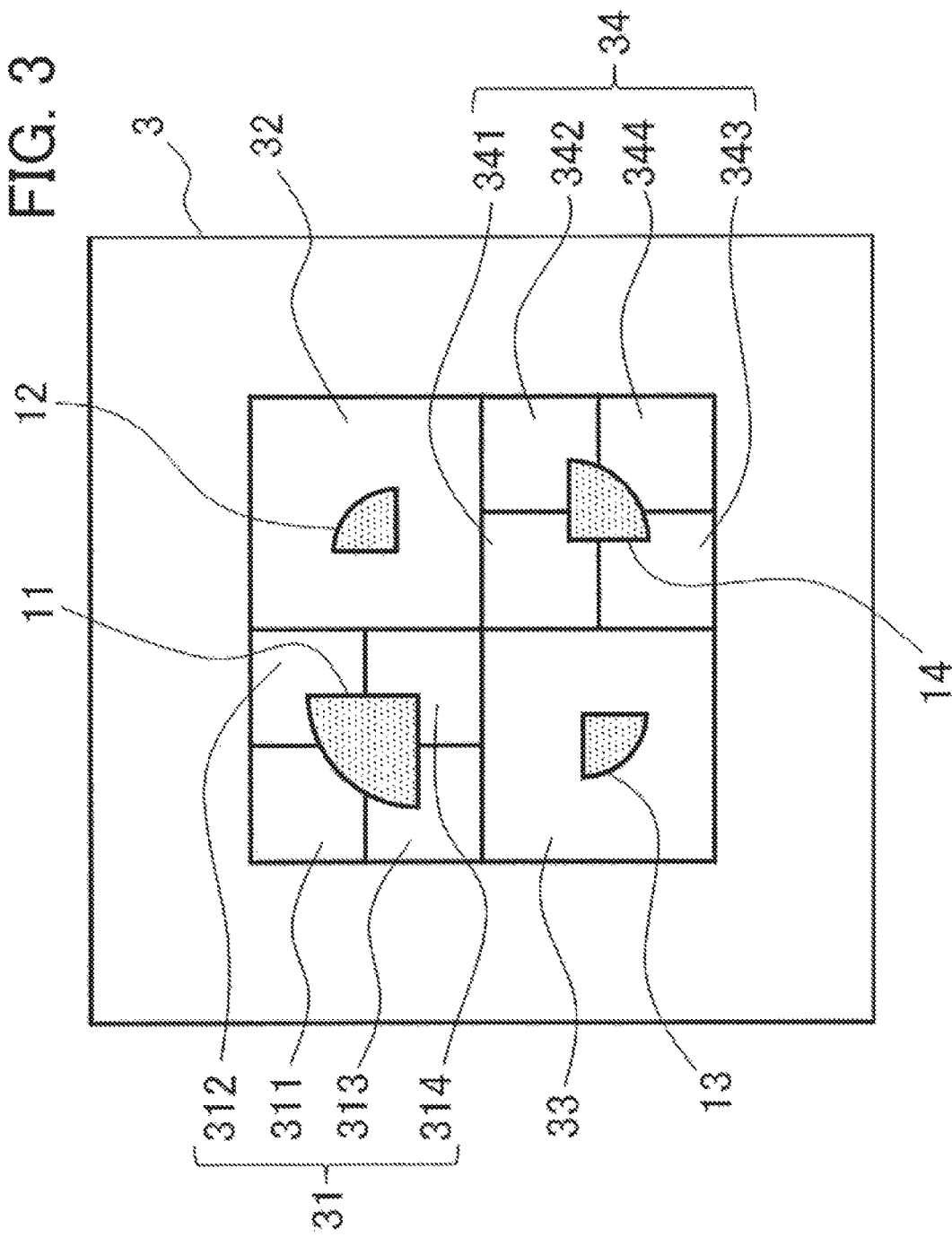

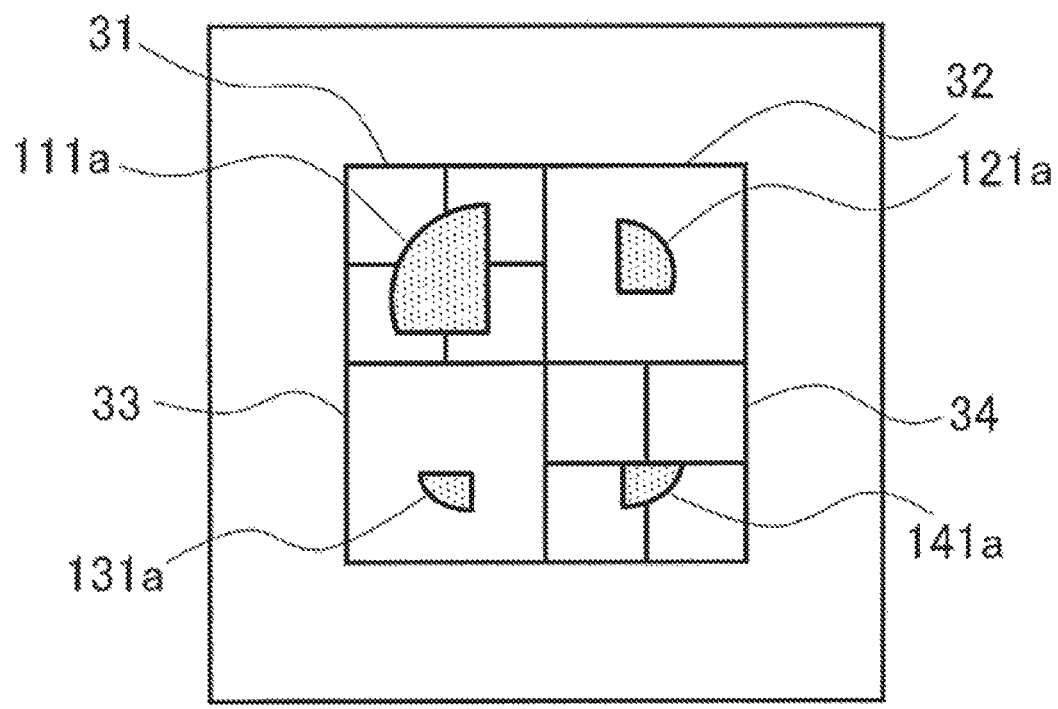
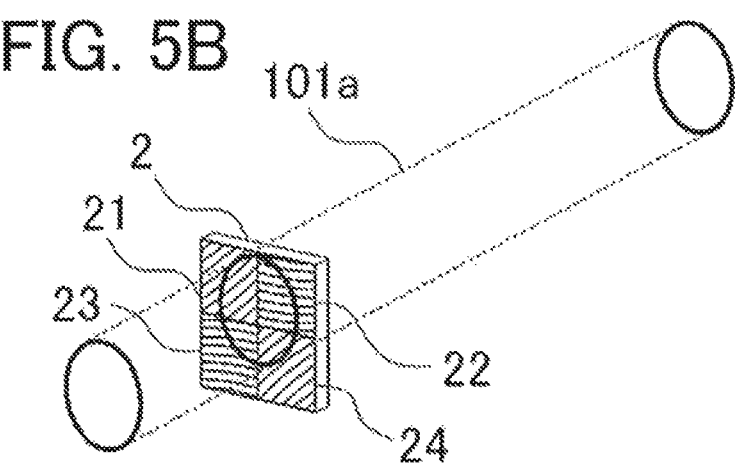

LIGHT DETECTION DEVICE

TECHNICAL FIELD

The present invention relates to a light detection device that simultaneously detects a displacement and an angle change of a beam of light in a device that uses the beam of light, such as a lidar device or an optical communication device.

BACKGROUND ART

The position and the angle of a beam of light have been adjusted so far, when a device that uses the beam of light, such as a lidar device or an optical communication device, is assembled.

Light detection and ranging (lidar) measures a moving speed of dusts, fine particles, and the like in atmospheric air as a wind speed, by emitting laser light and receiving reflected light from the dusts, the fine particles, and the like. The lidar device normally uses a beam of light of parallel light.

"Displacement" means a change of a position of an object. Here, the "displacement" means a change of a position of a beam of light relative to a device, for example. Specifically, the "displacement" means a change of a position of a beam of light relative to a sensor for detection.

Moreover, "angle change" means a change of an angle of an object. Here, the "angle change" means a change of a traveling direction of a beam of light relative to a device or a change of an orientation of the device relative to the beam of light, for example. Specifically, the "angle change" means a change of a traveling direction of a beam of light relative to a sensor for detection. For example, when a beam of light is incident on a light receiving element, the "angle change" means a change of the angle of the center axis of the beam of light relative to a light receiving surface of the light receiving element.

However, for example, when a lidar device is provided in a car, an airplane, or the like and is used under an environment with intense vibration, an optical component inside the device also vibrates during operation. Thus, the performance of the lidar device deteriorates.

In particular, a device using an optical fiber usually employs an optical fiber with a center core of a maximum diameter of approximately 100 [μm]. Hence, even if the displacement of the optical component is approximately several micron meter, the performance of the device is influenced significantly.

Moreover, the same applies to the angle change of the optical component. Even if the angle change of the optical component is approximately several minutes, the performance of the device is influenced significantly.

Hence, even during the operation of the device, it is necessary to actively reduce the displacement and the angle change of the beam of light relative to the optical component, against the vibration or the like of the optical component. To that end, it is necessary to detect the position and the angle of the beam of light with high accuracy.

Moreover, even under an environment with less vibration, usage for a long period results in aging. There is a request for detecting the position and the angle of the beam of light with high accuracy, from a viewpoint of maintenance.

To deal with this problem, there is disclosed a technology that divides one beam of light into two beams of light by a half mirror or the like, measures the displacement by causing one of the beams of light to be incident on a Charge Coupled Device (CCD) sensor, and measures the angle change by focusing the other of the beams of light onto another CCD sensor by a condensing lens (for example, patent reference 1).

PRIOR ART REFERENCE

Patent Reference

Patent Reference 1: Japanese Patent Application Publication No. 2014-10101

SUMMARY OF THE INVENTION

Problem to be Solved by the Invention

However, the technology disclosed in patent reference 1 uses two different sensors to detect the displacement and the angle change of the beam of light. Hence, there is a problem that an error is generated between the angle change of the beam of light and the displacement of the beam of light, owing to vibration or the like.

In consideration of the above, the present invention provides a detection device capable of improving the detection accuracy of the displacement of the beam of light and the angle change of the beam of light.

Means for Solving the Problem

In order to achieve the purpose, a light detection device according to the present invention includes a diffraction element to diffract a beam of light that is incident on the diffraction element and a light detection element including at least one light receiver to receive the diffracted light diffracted by the diffraction element. The diffraction element generates beams of the diffracted light by dividing the beam of light. The light detection element determines a displacement of the beam of light relative to the diffraction element on the basis of quantities of light of the beams of the diffracted light, and determines an angle change of the beam of light relative to the diffraction element by dividing quantity of light of one of the beams of the diffracted light.

Effects of the Invention

According to the present invention, the detection accuracy of the displacement of the beam of light and the angle change of the beam of light can be improved.

BRIEF DESCRIPTION OF THE DRAWINGS

FIG. 2 is a schematic diagram illustrating a pattern of a diffraction area of a diffraction element 2 of the first embodiment.

FIG. 3 is a schematic diagram illustrating a pattern of a light receiving surface of a light detection element 3 of the first embodiment.

FIGS. 5A and 5B are diagrams schematically illustrating behavior of spots 11, 12, 13, 14 of diffracted light formed on the light detection element 3 in response to a displacement of the beam of light 1 of the first embodiment.

MODE FOR CARRYING OUT THE INVENTION

Figure 1:
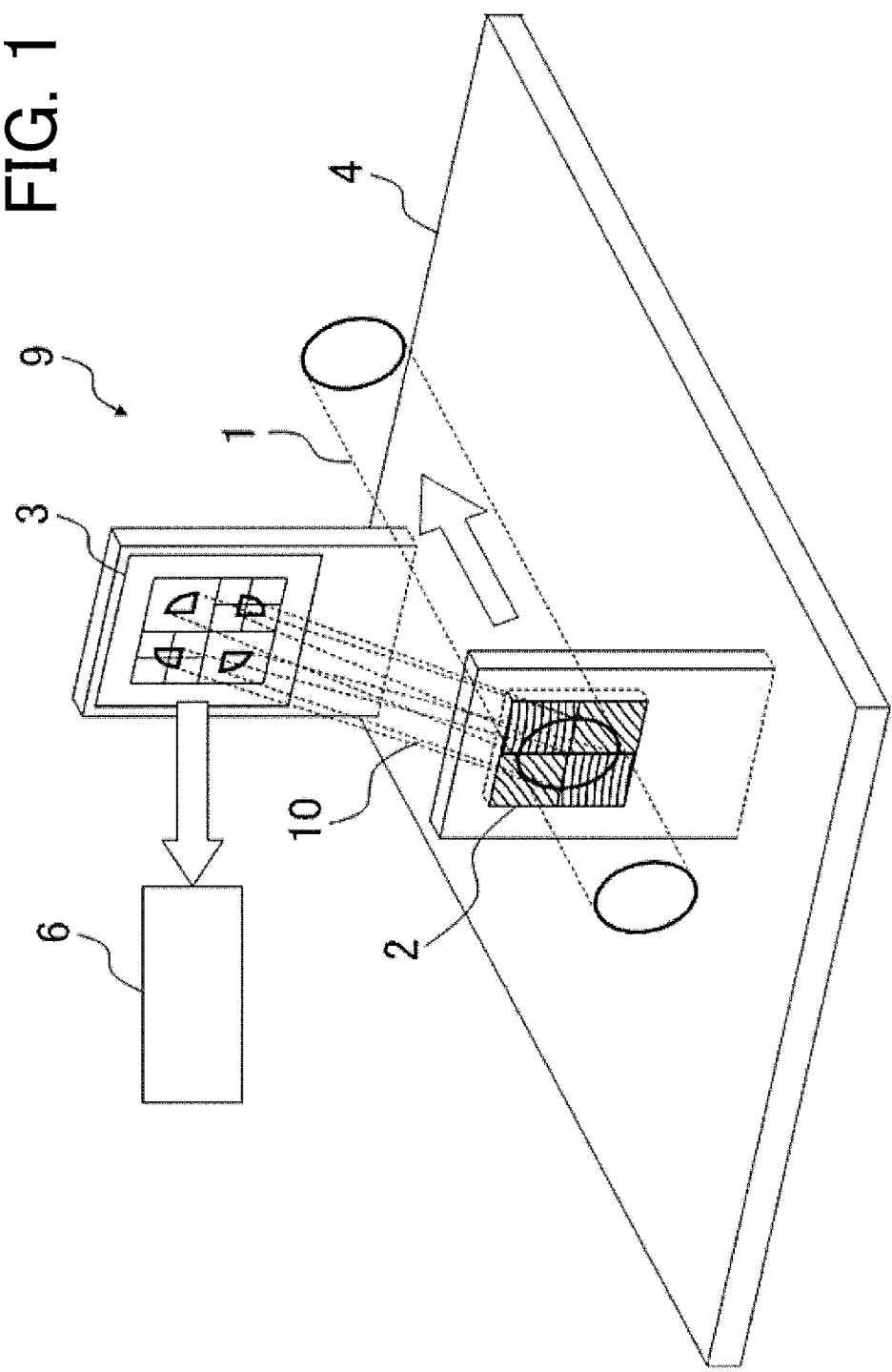
FIG. 1 is a diagram schematically illustrating a detection device 9 of a first embodiment for detecting a displacement and an angle change.

In the following, various embodiments of the present invention will be described with reference to the drawings. In the drawings, similar components are denoted with the same reference signs, and their detailed description is not repeated.

The technology described in above patent reference 1 uses a CCD as a sensor. Hence, there is a following problem.

First, the CCD responds slowly and can measure only a displacement of several ten [Hz] order. Moreover, even with a comparatively high-speed Position Sensitive Detector (PSD) element, it is possible to measure approximately 100 [kHz] at most.

In addition, the CCD has a large size together with components for driving the CCD and the like, and thus is not suitable for installation on a car, an airplane, or the like.

The present invention provides a detection device capable of improving a detection speed for detecting a displacement of a beam of light and an angle change of the beam of light. In addition, the present invention makes it easy to downsize the detection device.

Moreover, in the below embodiment, the beam of light will be described as a beam of light of parallel light, as far as there is no additional description. Note that the beam of light is not limited to the parallel light. However, when a configuration is employed in which only a part of light is led from a light path to a sensor system, the parallel beam of light makes it easy to lead the part of the light to the sensor system from any part of the light path.

Note that, in the case of using in simple evaluation such as adjustment of an optical axis, the light path is needless to be divided. Hence, a diffraction grating or the like is needless to be used specially. In such a case, the light is divided into two, and one is focused by a light detector, while the other is incident on the light detector as it is.

First Embodiment

FIG. 1 is a diagram schematically illustrating a detection device 9 of a first embodiment for detecting a displacement and an angle change. In the embodiment, the detection device 9 is illustrated as a light detection device that detects the displacement and the angle change by using light.

As illustrated in FIG. 1, the detection device 9 includes a diffraction element 2 and a light detection element 3. That is, the detection device 9 is a light detection device. In addition, the detection device 9 can include a housing 4 or a signal processing circuit 6.

The detection device 9 is provided in a lidar device, an optical communication device, or the like, for example. The detection device 9 is disposed in a light path of a beam of light 1 used in the lidar device or the optical communication device, for example.

<Diffraction Element 2>

The diffraction element 2 diffracts the beam of light 1. Here, for example, the beam of light 1 is parallel light. Then, +1st order diffracted light 10 is generated by the diffraction element 2.

The +1st order diffracted light 10 is incident on the light detection element 3 described later. The light detection element 3 receives the +1st order diffracted light 10. Then, the light detection element 3 detects the displacement and the angle change of the beam of light 1.

When the diffraction element 2 is formed of general rectangular grooves, +1st order diffracted light and −1st order diffracted light are generated. The −1st order diffracted light is the light that is diffracted in an opposite direction to the diffraction direction of the +1st order diffracted light. Hence, instead of the +1st order diffracted light, the −1st order diffracted light may be incident on the light detection element 3. The light detection element 3 may receive the −1st order diffracted light, instead of the +1st order diffracted light.

Moreover, +3rd order diffracted light, +5th order diffracted light, or the like. of higher order are also generated. Thus, these higher-order diffracted light can also be incident on the light detection element 3. The light detection element 3 can also receive these higher-order diffracted light. However, as the order becomes higher, the quantity of light of the diffracted light decreases. Hence, the light reception of the higher-order diffracted light is less preferable than the light reception of the first-order diffracted light.

However, when the obtained quantity of light is sufficient for detection sensitivity of the light detection element 3, the higher-order diffracted light may be received. The arrangement of the light detection element 3 can be set away from the beam of light 1, by the reception of the higher-order diffracted light.

Note that, even when the first-order diffracted light is received, the arrangement of the light detection element 3 is set away from the beam of light 1, by narrowing the pitch of the diffraction grating of the diffraction element 2.

FIG. 2 is a schematic diagram illustrating a pattern of a diffraction area of the diffraction element 2. Moreover, FIG. 3 is a schematic diagram illustrating a pattern of light receivers 31, 32, 33, 34 of the light detection element 3. The beam of light 1 incident on the diffraction element 2 is illustrated in FIG. 2.

As illustrated in FIG. 2, the diffraction element 2 includes four diffraction areas 21, 22, 23, 24, for example. In FIG. 2, the diffraction element 2 is equally divided into four areas, the diffraction areas 21, 22, 23, 24, for example. In FIG. 2, the diffraction areas 21, 22, 23, 24 are illustrated in square shapes, for example.

In FIG. 2, the diffraction area 21 and the diffraction area 22 are arranged side by side in a horizontal direction, for example. Moreover, the diffraction area 23 and the diffraction area 24 are arranged side by side in the horizontal direction. Moreover, the diffraction area 21 and the diffraction area 23 are arranged side by side in a vertical direction. Moreover, the diffraction area 22 and the diffraction area 24 are arranged side by side in the vertical direction.

In FIG. 2, the direction in which the diffraction areas 21, 22 are located is an upper side, and the direction in which the diffraction areas 23, 24 are located is a lower side. Moreover, the direction in which the diffraction areas 21, 23 are located is a left side, and the direction in which the diffraction areas 22, 24 are located is a right side.

Moreover, in FIG. 2, the beam of light 1 is equally divided into four by the diffraction areas 21, 22, 23, 24. That is, the light of the same quantity of light is incident on the diffraction areas 21, 22, 23, 24.

The diffraction element 2 generates beams of the diffracted light 10 by dividing the beam of light 1. The diffraction element 2 generates beams of the diffracted light 10 corresponding to the areas that the beam of light 1 is divided into. The diffraction element 2 generates beams of the diffracted light 10 corresponding to the respective areas that the beam of light 1 is divided into. The diffraction element 2 generates the diffracted light 10 corresponding to the respective areas that the beam of light 1 is divided into. That is, the diffraction element 2 generates the diffracted light 10 corresponding to the areas that the beam of light 1 is divided into. Thus, the divided beams of the diffracted light 10 are generated by the diffraction element 2.

The beam of light 1 is divided by a plurality of diffraction areas 21, 22, 23, 24.

The diffraction element 2 focuses at least a part of the diffracted light 10.

The diffraction element 2 focuses the diffracted light 10 by at least one of the plurality of diffraction areas 21, 22, 23, 24. In the first embodiment, it is the diffraction area 21, for example.

The diffraction element 2 includes a non-linear diffraction grating pattern having a lens effect, for example. Hence, the diffraction element 2 has a function for focusing the light, in addition to a function for diffracting the light. Here, "lens effect" means having the function for focusing the light.

<Light Detection Element 3>

FIG. 3 is a schematic diagram illustrating a pattern of a light receiving surface of the light detection element 3.

As illustrated in FIG. 3, the light detection element 3 includes light receivers 31, 32, 33, 34.

In FIG. 3, the light receivers 31, 32, 33, 34 of the light detection element 3 are also equally divided into four, similarly to the diffraction areas 21, 22, 23, 24 of the diffraction element 2. In FIG. 3, the light receivers 31, 32, 33, 34 are illustrated in square shapes, for example.

In FIG. 3, the light receiver 31 and the light receiver 32 are arranged side by side in the horizontal direction, for example. Moreover, the light receiver 33 and the light receiver 34 are arranged side by side in the horizontal direction. Moreover, the light receiver 31 and the light receiver 33 are arranged side by side in the vertical direction. Moreover, the light receiver 32 and the light receiver 34 are arranged side by side in the vertical direction.

In FIG. 3, the direction in which the light receivers 31, 32 are located is an upper side, and the direction in which the light receivers 33, 34 are located is a lower side. Moreover, the direction in which the light receivers 31, 33 are located is a left side, and the direction in which the light receivers 32, 34 are located is a right side.

The light receiver 31 receives the diffracted light diffracted by the diffraction area 21 of the diffraction element 2. The light receiver 32 receives the diffracted light diffracted by the diffraction area 22 of the diffraction element 2. The light receiver 33 receives the diffracted light diffracted by the diffraction area 23 of the diffraction element 2. The light receiver 34 receives the diffracted light diffracted by the diffraction area 24 of the diffraction element 2.

The +1st order diffracted light generated in these diffraction areas 21, 22, 23, 24 reach the positions of spots 11, 12, 13, 14 of the diffracted light on the light receivers 31, 32, 33, 34 of the light detection element 3 illustrated in FIG. 3, respectively.

The spots 11, 12, 13, 14 of the diffracted light represent the beams of light of the diffracted light that has reached the light receivers 31, 32, 33, 34.

The +1st order diffracted light generated in the diffraction area 21 reaches the position of the spot 11 of the diffracted light on the light receiver 31. The +1st order diffracted light generated in the diffraction area 22 reaches the position of the spot 12 of the diffracted light on the light receiver 32. The +1st order diffracted light generated in the diffraction area 23 reaches the position of the spot 13 of the diffracted light on the light receiver 33. The +1st order diffracted light generated in the diffraction area 24 reaches the position of the spot 14 of the diffracted light on the light receiver 34.

In FIG. 3, each spot 11, 12, 13, 14 is positioned at the center of each light receiver 31, 32, 33, 34.

Moreover, the light receiver 31 includes sub-light receivers 311, 312, 313, 314. In FIG. 3, the light receiver 31 is equally divided into four sub-light receivers, the sub-light receivers 311, 312, 313, 314. In FIG. 3, the sub-light receivers 311, 312, 313, 314 are illustrated in square shapes, for example.

In FIG. 3, the sub-light receiver 311 and the sub-light receiver 312 are arranged side by side in the horizontal direction, for example. Moreover, the sub-light receiver 313 and the sub-light receiver 314 are arranged side by side in the horizontal direction. Moreover, the sub-light receiver 311 and the sub-light receiver 313 are arranged side by side in the vertical direction. Moreover, the sub-light receiver 312 and the sub-light receiver 314 are arranged side by side in the vertical direction.

In FIG. 3, the direction in which the sub-light receivers 311, 312 are located is an upper side, and the direction in which the sub-light receivers 313, 314 are located is a lower side. Moreover, the direction in which the sub-light receivers 311, 313 are located is a left side, and the direction in which the sub-light receivers 312, 314 are located is a right side.

Each of the sub-light receivers 311, 312, 313, 314 receives a part of the spot 11 of the diffracted light.

Moreover, the light receiver 34 includes sub-light receivers 341, 342, 343, 344. In FIG. 3, the light receiver 34 is equally divided into four sub-light receivers, the sub-light receivers 341, 342, 343, 344. In FIG. 3, the sub-light receivers 341, 342, 343, 344 are illustrated in square shapes, for example.

In FIG. 3, the sub-light receiver 341 and the sub-light receiver 342 are arranged side by side in the horizontal direction, for example. Moreover, the sub-light receiver 343 and the sub-light receiver 344 are arranged side by side in the horizontal direction. Moreover, the sub-light receiver 341 and the sub-light receiver 343 are arranged side by side in the vertical direction. Moreover, the sub-light receiver 342 and the sub-light receiver 344 are arranged side by side in the vertical direction.

In FIG. 3, the direction in which the sub-light receivers 341, 342 are located is an upper side, and the direction in which the sub-light receivers 343, 344 are located is a lower side. Moreover, the direction in which the sub-light receivers 341, 343 are located is a left side, and the direction in which the sub-light receivers 342, 344 are located is a right side.

Each of the sub-light receivers 341, 342, 343, 344 receives a part of the spot 14 of the diffracted light.

Moreover, in FIG. 3, the light receiver 31 and the light receiver 32 are in contact with each other. Moreover, the light receiver 32 and the light receiver 34 are in contact with each other. The light receiver 34 and the light receiver 33 are in contact with each other. The light receiver 33 and the light receiver 31 are in contact with each other.

However, this arrangement is not a limitation. Interspaces may be provided between the light receivers 31, 32, 33, 34.

Moreover, the interspaces between the light receivers 31, 32, 33, 34 are needless to be constant. The interspaces may have different amounts from each other.

However, the positions of the spots 11, 12, 13, 14 of the diffracted light are decided according to the diffraction grating pattern of the diffraction element 2. Hence, the interspaces between the light receivers 31, 32, 33, 34 are preferably designed in consideration of both of the positions of the spots 11, 12, 13, 14 of these diffracted light and the positions of the light receivers 31, 32, 33, 34.

Moreover, in FIG. 3, the light receivers 31, 32, 33, 34 are illustrated in the same size. However, this is not a limitation. The light receivers 31, 32, 33, 34 may have different sizes from each other.

Moreover, the light receivers 31, 32, 33, 34 have rectangle shapes. In FIG. 3, the light receivers 31, 32, 33, 34 are illustrated in square shapes. However, this is not a limitation. The shapes of the light receivers 31, 32, 33, 34 may be circular shapes or the like, for example.

The sub-light receiver 311 generates a signal $SA_1$ according to the received quantity of light. That is, the sub-light receiver 311 receives a part of the spot 11 of the diffracted light, and generates the signal $SA_1$. Then, the sub-light receiver 311 supplies the signal $SA_1$ to the signal processing circuit 6.

The sub-light receiver 312 generates a signal $SA_2$ according to the received quantity of light. That is, the sub-light receiver 312 receives a part of the spot 11 of the diffracted light, and generates the signal $SA_2$. Then, the sub-light receiver 312 supplies the signal $SA_2$ to the signal processing circuit 6.

The sub-light receiver 313 generates a signal $SA_3$ according to the received quantity of light. That is, the sub-light receiver 313 receives a part of the spot 11 of the diffracted light, and generates the signal $SA_3$. Then, the sub-light receiver 313 supplies the signal $SA_3$ to the signal processing circuit 6.

The sub-light receiver 314 generates a signal $SA_4$ according to the received quantity of light. That is, the sub-light receiver 314 receives a part of the spot 11 of the diffracted light, and generates the signal $SA_4$. Then, the sub-light receiver 314 supplies the signal $SA_4$ to the signal processing circuit 6.

The light receiver 32 generates a signal SB according to the received quantity of light. That is, the light receiver 32 receives the spot 12 of the diffracted light, and generates the signal SB. The light receiver 32 supplies the signal SB to the signal processing circuit 6.

The light receiver 33 generates a signal SC according to the received quantity of light. That is, the light receiver 33 receives the spot 13 of the diffracted light, and generates the signal SC. The light receiver 33 supplies the signal SC to the signal processing circuit 6.

The sub-light receiver 341 generates a signal $SD_1$, according to the received quantity of light. That is, the sub-light receiver 341 receives a part of the spot 14 of the diffracted light, and generates the signal $SD_1$. Then, the sub-light receiver 341 supplies the signal $SD_1$, to the signal processing circuit 6.

The sub-light receiver 342 generates a signal $SD_2$ according to the received quantity of light. That is, the sub-light receiver 342 receives a part of the spot 14 of the diffracted light, and generates the signal $SD_2$. Then, the sub-light receiver 342 supplies the signal $SD_2$ to the signal processing circuit 6.

The sub-light receiver 343 generates a signal $SD_3$ according to the received quantity of light. That is, the sub-light receiver 343 receives a part of the spot 14 of the diffracted light, and generates the signal $SD_3$. Then, the sub-light receiver 343 supplies the signal $SD_3$ to the signal processing circuit 6.

The sub-light receiver 344 generates a signal $SD_4$ according to the received quantity of light. That is, the sub-light receiver 344 receives a part of the spot 14 of the diffracted light, and generates the signal $SD_4$. Then, the sub-light receiver 344 supplies the signal $SD_4$ to the signal processing circuit 6.

At least one of the light receivers 31, 34 includes a plurality of sub-light receivers 311, 312, 313, 314, 341, 342, 343, 344 that the light receivers 31, 34 are divided into.

<Generation of Displacement Signal of Beam of Light 1 (Vertical Direction)>

A method for generating a displacement signal of the beam of light 1 in the vertical direction (up-down direction) will be described below.

A displacement signal Sv in the vertical direction is calculated by below equations (1), (1a), and (1b).

$$Sv = (SA+SB) - (SC+SD) \quad (1)$$

$$SA = SA_1 + SA_2 + SA_3 + SA_4 \quad (1a)$$

$$SD = SD_1 + SD_2 + SD_3 + SD_4 \quad (1b)$$

In equation (1), the signals $SA_1$, $SA_2$, $SA_3$, $SA_4$, SB, SC, $SD_1$, $SD_2$, $SD_3$, $SD_4$ correspond to the quantities of light received by the light receivers 311, 312, 313, 314, 32, 33, 341, 342, 343, 344.

The signal SA corresponds to the quantity of light received by the entire light receiver 31. The signal SD corresponds to the quantity of light received by the entire light receiver 34.

The displacement signal Sv in the vertical direction is generated by performing the computation expressed by equation (1) in the signal processing circuit 6.

Figure 4A:
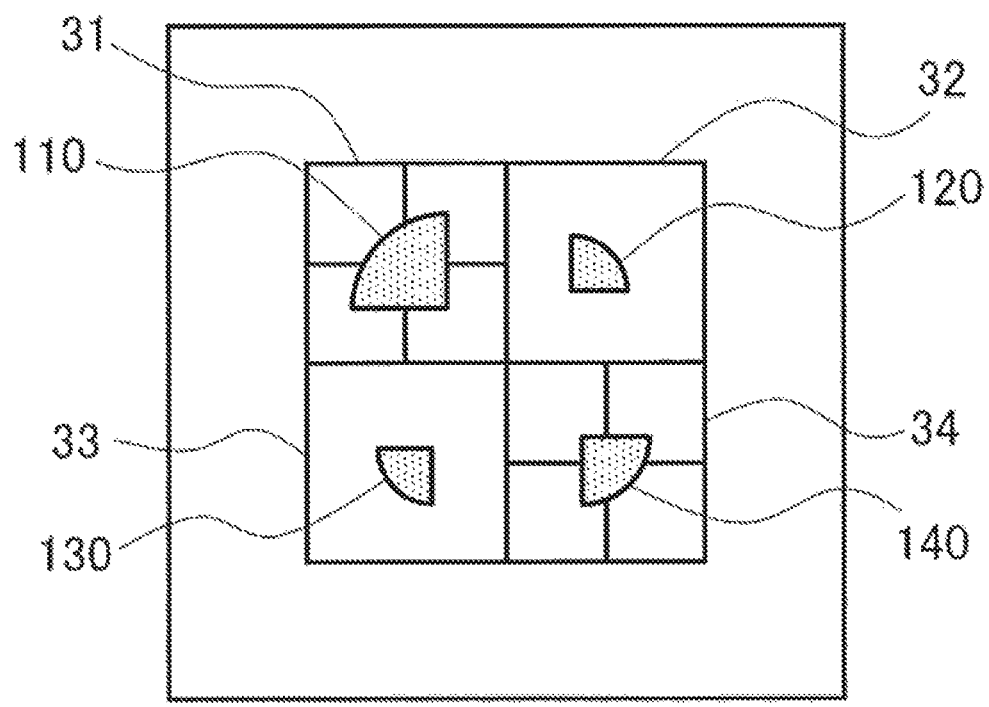
FIGS. 4A and 4B are diagrams schematically illustrating behavior of spots 11, 12, 13, 14 of diffracted light formed on the light detection element 3 in response to a displacement of a beam of light 1 of the first embodiment.
Figure 6A:
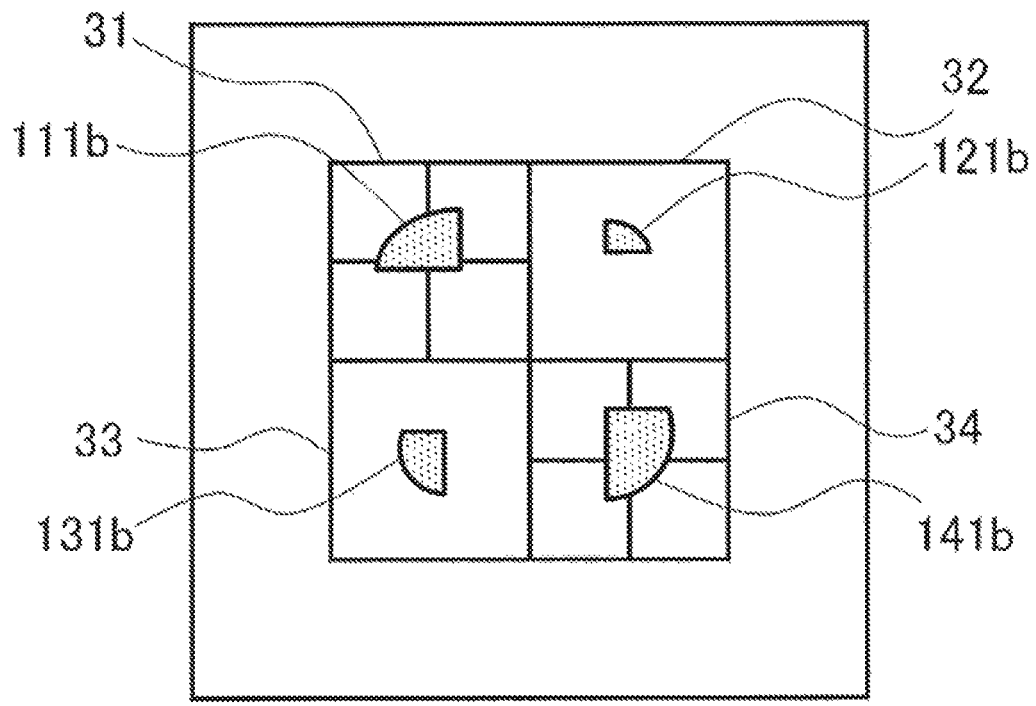
FIGS. 6A and 6B are diagrams schematically illustrating behavior of spots 11, 12, 13, 14 of diffracted light formed on the light detection element 3 in response to a displacement of the beam of light 1 of the first embodiment.

FIG. 4A, FIG. 5A, and FIG. 6A are diagrams schematically illustrating the behavior of the spots 11, 12, 13, 14 of the diffracted light formed on the light detection element 3 in response to the displacement of the beam of light 1. Here, the "behavior of the spots of the diffracted light" means the sizes, the shapes, the positions on the light detection element 3, or the like. of the spots of the diffracted light. Moreover, FIG. 4B, FIG. 5B, and FIG. 6B are perspective views of the beam of light 1 that transmits through the diffraction element 2.

Figure 4B:
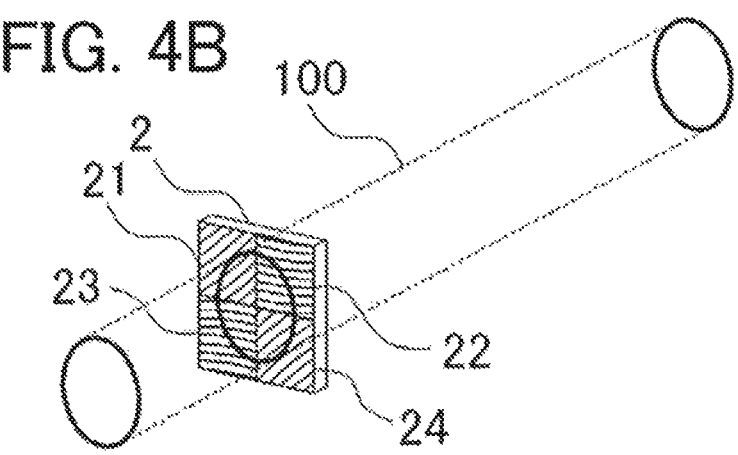

FIG. 4A and FIG. 4B illustrate a case in which the beam of light 1 transmits through the center of the diffraction element 2. The beam of light 1 in this case is illustrated as a beam of light 100 in FIG. 4B. Moreover, the spots 11, 12, 13, 14 of the diffracted light illustrated in FIG. 3 are illustrated as spots 110, 120, 130, 140 of the diffracted light in FIG. 4A.

FIG. 5A and FIG. 5B illustrate a case in which the beam of light 1 transmits through the upper side than the center of the diffraction element 2. The beam of light 1 in this case is illustrated as a beam of light 101a in FIG. 5B. Moreover, the spots 11, 12, 13, 14 of the diffracted light illustrated in FIG. 3 are illustrated as spots 111a, 121a, 131a, 141a of the diffracted light in FIG. 5A. The "upper side" is the diffraction areas 21, 22 side. Moreover, the "upper side" is the light receivers 31, 32 side.

Figure 6B:
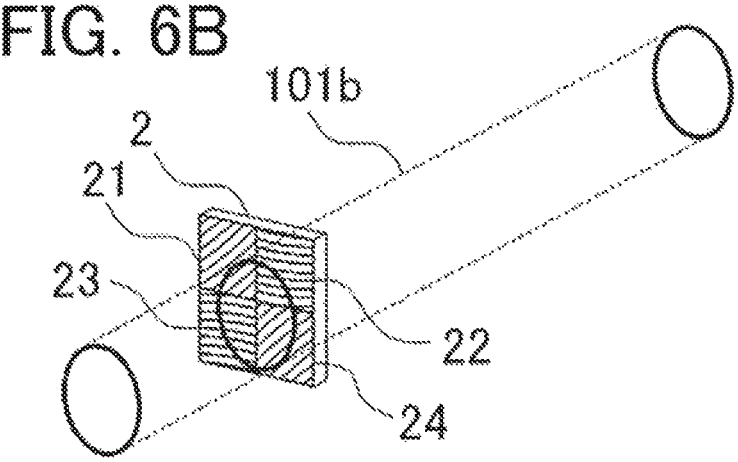

FIG. 6A and FIG. 6B illustrate a case in which the beam of light 1 transmits through the lower side than the center of the diffraction element 2. The beam of light 1 in this case is illustrated as the beam of light 101b in FIG. 6B. Moreover, the spots 11, 12, 13, 14 of the diffracted light illustrated in FIG. 3 are illustrated as spots 111b, 121b, 131b, 141b of the diffracted light in FIG. 6A. The "lower side" is the diffraction areas 23, 24 side. Moreover, the "lower side" is the light receivers 33, 34 side.

That is, FIG. 5A, FIG. 5B, FIG. 6A, and FIG. 6B illustrate cases in which the beam of light 1 swerves from the center of the diffraction element 2 in the vertical direction and transmits through the diffraction element 2.

Next, the cases in which the beam of light 1 is misaligned in the vertical direction will be described individually.

First, the case in which the beam of light 100 transmits through the center of the diffraction element 2 as illustrated in FIG. 4A and FIG. 4B will be described.

In this case, the quantities of light of the beam of light 100 incident on the diffraction area 21, the diffraction area 22, the diffraction area 23, and the diffraction area 24 are equal to each other. Hence, the quantities of light of the spot 110 of the diffracted light, the spot 120 of the diffracted light, the spot 130 of the diffracted light, and the spot 140 of the diffracted light are equal to each other.

Thus, the signals SA, SB, SC, SD are all equal to each other. Hence, the displacement signal Sv in the vertical direction calculated from equation (1) is zero. The signals SA, SB, SC, SD are output from the light receivers 31, 32, 33, 34.

In FIG. 4A, the sizes of the spots 110, 120, 130, 140 differ from each other. This is because of the lens effect by varied space diffraction grating shapes of the diffraction areas 21, 22, 23, 24. The "varied space diffraction grating" is a diffraction grating in which the diffraction grating grooves are varied space grooves. The varied space diffraction grating is also referred to as varied space groove diffraction grating or varied space grating groove diffraction grating.

The diffraction element 2 has the lens effect by the varied space diffraction grating shape. Hence, the light that transmits through each diffraction area 21, 22, 23, 24 is focused or diverged, depending on the grating shape in each diffraction area 21, 22, 23, 24. Hence, the sizes of the spots 110, 120, 130, 140 of the +1st order diffracted light 10 illuminated on the light detection element 3 differ according to the degree of convergence or the degree of divergence of each +1st order diffracted light 10.

When the beam of light 100 transmits through the center of the diffraction element 2, the light of even quantity of light is incident on the four diffraction areas 21, 22, 23, 24 on the diffraction element 2. Hence, even when the focused spots 110, 120, 130, 140 have different sizes after transmitting through and diffracted by the diffraction element 2, the integrated quantities of light are equal to each other.

Next, the case in which the beam of light 101a transmits through the upper side than the center of the diffraction element 2 as illustrated in FIG. 5A and FIG. 5B will be described.

In this case, the quantity of light incident on the diffraction area 21 of the diffraction element 2 is larger than the case of the beam of light 100 having no displacement as illustrated in FIG. 4A and FIG. 4B. Hence, the quantity of light of the spot 111a of the diffracted light is larger than the quantity of light of the spot 110 of the diffracted light having no displacement. Thus, the quantity of light received by the entire light receiver 31 increases. Hence, the signal SA becomes large.

Similarly, the quantity of light incident on the diffraction area 22 of the diffraction element 2 is also larger than the case of the beam of light 100 having no displacement as illustrated in FIG. 4A and FIG. 4B. Hence, the quantity of light of the spot 121a of the diffracted light is larger than the quantity of light of the spot 120 of the diffracted light having no displacement. Thus, the quantity of light received by the light receiver 32 increases. Hence, the signal SB becomes large.

On the other hand, the quantity of light incident on the diffraction area 23 of the diffraction element 2 is smaller than the case of the beam of light 100 having no displacement as illustrated in FIG. 4A and FIG. 4B. Hence, the quantity of light of the spot 131a of the diffracted light is smaller than the quantity of light of the spot 130 of the diffracted light having no displacement. Thus, the quantity of light received by the light receiver 33 decreases. Hence, the signal SC becomes small.

Similarly, the quantity of light incident on the diffraction area 24 of the diffraction element 2 is also smaller than the case of the beam of light 100 having no displacement as illustrated in FIG. 4A and FIG. 4B. Hence, the quantity of light of the spot 141a of the diffracted light is smaller than the quantity of light of the spot 140 of the diffracted light having no displacement. Thus, the quantity of light received by the entire light receiver 34 decreases. Hence, the signal SD becomes small.

From the above, from equation (1), the displacement signal Sv in the vertical direction becomes large when the beam of light 100 of the parallel light is displaced in the upward direction. If the displacement signal Sv is zero when the beam of light 100 transmits through the center of the diffraction element 2, the value of the displacement signal Sv (of the beam of light 101a) is a positive value when the beam of light 100 is displaced in the upward direction.

Lastly, the case in which the beam of light 101b transmits through the lower side than the center of the diffraction element 2 as illustrated in FIG. 6A and FIG. 6B will be described.

In this case, the quantity of light incident on the diffraction area 21 of the diffraction element 2 is smaller than the case of the beam of light 100 having no displacement as illustrated in FIG. 4A and FIG. 4B. Hence, the quantity of light of the spot 111b of the diffracted light is smaller than the quantity of light of the spot 110 of the diffracted light having no displacement. Thus, the quantity of light received by the entire light receiver 31 decreases. Hence, the signal SA becomes small.

Similarly, the quantity of light incident on the diffraction area 22 of the diffraction element 2 is also smaller than the case of the beam of light 100 having no displacement as illustrated in FIG. 4A and FIG. 4B. Hence, the quantity of light of the spot 121b of the diffracted light is smaller than the quantity of light of the spot 120 of the diffracted light having no displacement. Thus, the quantity of light received by the light receiver 32 decreases. Hence, the signal SB becomes small.

On the other hand, the quantity of light incident on the diffraction area 23 of the diffraction element 2 is larger than the case of the beam of light 100 having no displacement as illustrated in FIG. 4A and FIG. 4B. Hence, the quantity of light of the spot 131b of the diffracted light is larger than the quantity of light of the spot 130 of the diffracted light having no displacement. Thus, the quantity of light received by the light receiver 33 increases. Hence, the signal SC becomes large.

Similarly, the quantity of light incident on the diffraction area 24 of the diffraction element 2 is also larger than the case of the beam of light 100 having no displacement as illustrated in FIG. 4A and FIG. 4B. Hence, the quantity of light of the spot 141b of the diffracted light is larger than the quantity of light of the spot 140 of the diffracted light having no displacement. Thus, the quantity of light received by the entire light receiver 34 increases. Hence, the signal SD becomes large.

From the above, from equation (1), the displacement signal Sv in the vertical direction becomes small when the beam of light 100 of the parallel light is displaced in the downward direction. If the displacement signal Sv is zero when the beam of light 100 transmits through the center of the diffraction element 2, the value of the displacement signal Sv (of the beam of light 101b) is a negative value when the beam of light 100 is displaced in the downward direction.

In this way, the displacement information of the beam of light 1 in the vertical direction can be obtained.

<Generation of Displacement Signal of Beam of Light 1 (Horizontal Direction)>

A method for generating a displacement signal of the beam of light 1 in the horizontal direction (left-right direction) will be described below.

The displacement signal Sh in the horizontal direction is calculated by below equation (2), similarly to the displacement signal Sv in the vertical direction.

$$Sh = (SA + SC) - (SB + SD) \qquad (2)$$

The displacement signal Sh in the horizontal direction is generated by performing the computation expressed by equation (2) in the signal processing circuit 6.

Figure 7A:
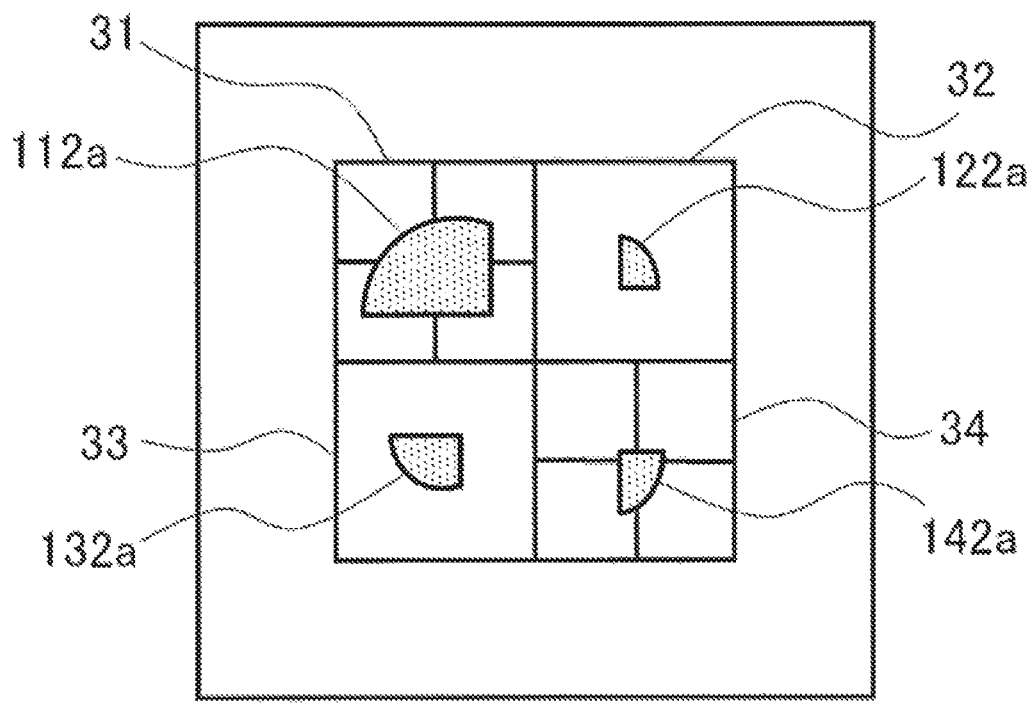
FIGS. 7A and 7B are diagrams schematically illustrating behavior of spots 11, 12, 13, 14 of diffracted light formed on the light detection element 3 in response to a displacement of the beam of light 1 of the first embodiment.
Figure 7B:
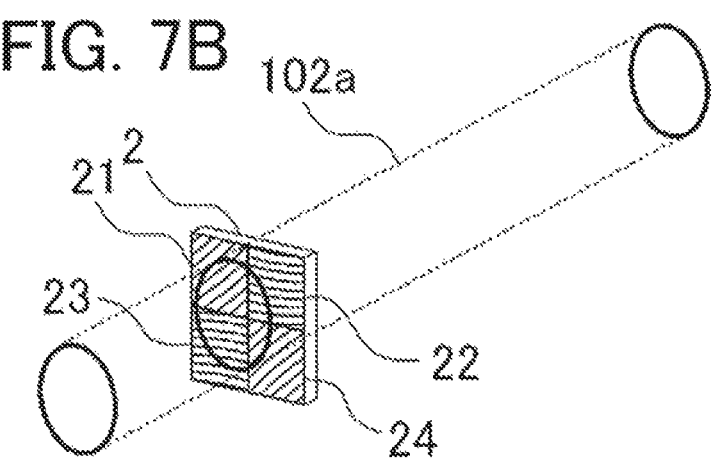
Figure 8A:
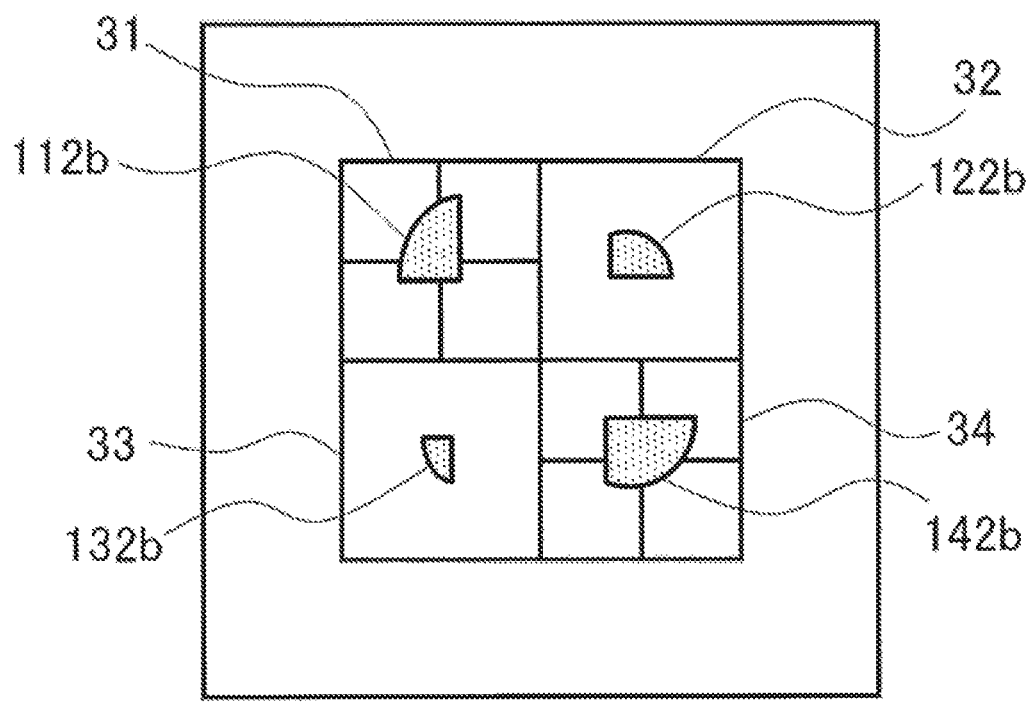
FIGS. 8A and 8B are diagrams schematically illustrating behavior of spots 11, 12, 13, 14 of diffracted light formed on the light detection element 3 in response to a displacement of the beam of light 1 of the first embodiment.

FIG. 7A and FIG. 8A are diagrams schematically illustrating the behavior of the spots 11, 12, 13, 14 of the diffracted light formed on the light detection element 3 in response to the displacement of the beam of light 1. Moreover, FIG. 7B and FIG. 8B are perspective views of the beam of light 1 that transmits through the diffraction element 2.

FIG. 7A and FIG. 7B illustrate a case in which the beam of light 1 transmits through the left side from the center of the diffraction element 2. The beam of light 1 in this case is illustrated as a beam of light 102a in FIG. 7B. Moreover, the spots 11, 12, 13, 14 of the diffracted light illustrated in FIG. 3 are illustrated as spots 112a, 122a, 132a, 142a of the diffracted light in FIG. 7A. Note that the "left side" illustrated in the embodiment is the left side with respect to the traveling direction of the beam of light 1 (here, the beam of light 102a). The "left side" is the diffraction areas 21, 23 side. Moreover, the "left side" is the light receivers 31, 33 side.

Figure 8B:
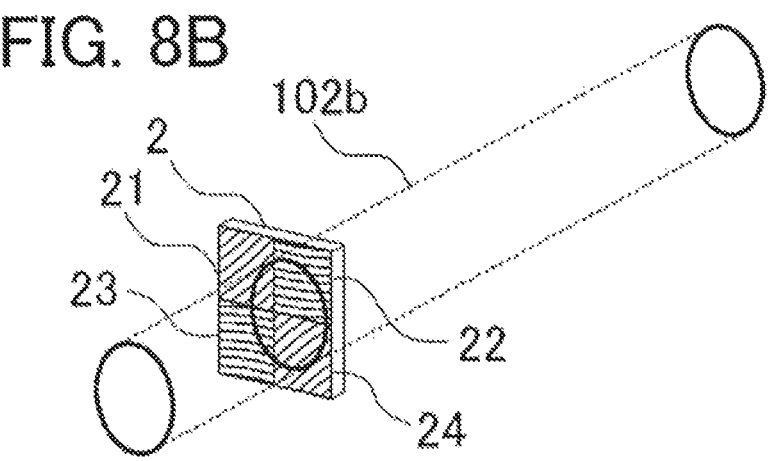

FIG. 8A and FIG. 8B illustrate a case in which the beam of light 1 transmits through the right side from the center of the diffraction element 2. The beam of light 1 in this case is illustrated as a beam of light 102b in FIG. 8B. Moreover, the spots 11, 12, 13, 14 of the diffracted light illustrated in FIG. 3 are illustrated as spots 112b, 122b, 132b, 142b of the diffracted light in FIG. 8A. Note that the "right side" illustrated in the embodiment is the right side with respect to the traveling direction of the beam of light 1 (here, the beam of light 102a). The "right side" is the diffraction areas 22, 24 side. Moreover, the "right side" is the light receivers 32, 34 side.

That is, FIG. 7A, FIG. 7B, FIG. 8A, and FIG. 8B illustrate the cases in which the beam of light 1 transmits through the diffraction element 2, misaligned from the center of the diffraction element 2 in the horizontal direction.

Next, the cases in which the beam of light 1 is misaligned in the horizontal direction will be described individually.

First, the case in which the beam of light 102a transmits through the left side from the center of the diffraction element 2 as illustrated in FIG. 7A and FIG. 7B will be described.

In this case, the quantity of light incident on the diffraction area 21 of the diffraction element 2 is larger than the case of the beam of light 100 having no displacement as illustrated in FIG. 4A and FIG. 4B. Hence, the quantity of light of the spot 112a of the diffracted light is larger than the quantity of light of the spot 110 of the diffracted light having no displacement. Thus, the quantity of light received by the entire light receiver 31 increases. Hence, the signal SA becomes large.

On the other hand, the quantity of light incident on the diffraction area 22 of the diffraction element 2 is smaller than the case of the beam of light 100 having no displacement as illustrated in FIG. 4A and FIG. 4B. Hence, the quantity of light of the spot 122a of the diffracted light is smaller than the quantity of light of the spot 120 of the diffracted light having no displacement. Thus, the quantity of light received by the light receiver 32 decreases. Hence, the signal SB becomes small.

Moreover, the quantity of light incident on the diffraction area 23 of the diffraction element 2 is larger than the case of the beam of light 100 having no displacement as illustrated in FIG. 4A and FIG. 4B. Hence, the quantity of light of the spot 132a of the diffracted light is larger than the quantity of light of the spot 130 of the diffracted light having no displacement. Thus, the quantity of light received by the light receiver 33 increases. Hence, the signal SC becomes large.

On the other hand, the quantity of light incident on the diffraction area 24 of the diffraction element 2 is smaller than the case of the beam of light 100 having no displacement as illustrated in FIG. 4A and FIG. 4B. Hence, the quantity of light of the spot 142a of the diffracted light is smaller than the quantity of light of the spot 140 of the diffracted light having no displacement. Thus, the quantity of light received by the entire light receiver 34 decreases. Hence, the signal SD becomes small.

From the above, from equation (2), the displacement signal Sh in the horizontal direction becomes large when the beam of light 100 of the parallel light is displaced in the left direction. If the displacement signal Sh is zero when the beam of light 100 transmits through the center of the diffraction element 2, the value of the displacement signal Sh (of the beam of light 102a) is a positive value when the beam of light 100 is displaced in the left direction.

Next, the case in which the beam of light 102b transmits through the right side from the center of the diffraction element 2 as illustrated in FIG. 8A and FIG. 8B will be described.

In this case, the quantity of light incident on the diffraction area 21 of the diffraction element 2 is smaller than the case of the beam of light 100 having no displacement as illustrated in FIG. 4A and FIG. 4B. Hence, the quantity of light of the spot 112b of the diffracted light is smaller than the quantity of light of the spot 110 of the diffracted light having no displacement. Thus, the quantity of light received by the entire light receiver 31 decreases. Hence, the signal SA becomes small.

On the other hand, the quantity of light incident on the diffraction area 22 of the diffraction element 2 is larger than the case of the beam of light 100 having no displacement as illustrated in FIG. 4A and FIG. 4B. Hence, the quantity of light of the spot 122b of the diffracted light is larger than the quantity of light of the spot 120 of the diffracted light having no displacement. Thus, the quantity of light received by the light receiver 32 increases. Hence, the signal SB becomes large.

Moreover, the quantity of light incident on the diffraction area 23 of the diffraction element 2 is smaller than the case of the beam of light 100 having no displacement as illustrated in FIG. 4A and FIG. 4B. Hence, the quantity of light of the spot 132b of the diffracted light is smaller than the quantity of light of the spot 130 of the diffracted light having no displacement. Thus, the quantity of light received by the light receiver 33 decreases. Hence, the signal SC becomes small.

On the other hand, the quantity of light incident on the diffraction area 24 of the diffraction element 2 is larger than the case of the beam of light 100 having no displacement as illustrated in FIG. 4A and FIG. 4B. Hence, the quantity of light of the spot 142b of the diffracted light is larger than the quantity of light of the spot 140 of the diffracted light having no displacement. Thus, the quantity of light received by the entire light receiver 34 increases. Hence, the signal SD becomes large.

From the above, from equation (2), the displacement signal Sh in the horizontal direction becomes small when the beam of light 100 of the parallel light is displaced in the right direction. If the displacement signal Sh is zero when the beam of light 100 transmits through the center of the diffraction element 2, the value of the displacement signal Sh (of the beam of light 102b) is a negative value when the beam of light 100 is displaced in the right direction.

In this way, the displacement information of the beam of light 1 in the horizontal direction can be obtained.

As above, the detection device 9 simultaneously acquires the displacement information of the beam of light 1 in the vertical direction and the displacement information of the beam of light 1 in the horizontal direction. That is, the detection device 9 can acquire the displacement information of the beam of light 1 two-dimensionally.

Moreover, unlike the CCD, the four light receivers 31, 32, 33, 34 receive light, and thus the computation time and the transfer time can be made faster.

Moreover, unlike the PSD, the sizes of the light receivers 31, 32, 33, 34 can be made smaller. Thereby, the time for converting the light to the signals SA, SB, SC, SD can be made faster.

Moreover, the summation of the entire quantity of light of the diffracted light 10 is expressed by below equation (3).

$$S\text{sum} = (SA + SB + SC + SD) \qquad (3)$$

Thus, the displacement signal not influenced by the fluctuation of the entire quantity of light of the diffracted light 10 is obtained by dividing each of equation (1) and equation (2) by equation (3). That is, the displacement signal less influenced by the fluctuation of the entire quantity of light is obtained.

In this case, a detection error becomes smaller as the amounts of changes of the signals SA, SB, SC, SD become larger. That is, the detection error is small when there is no interspace between the diffraction areas 21, 22, 23, 24. Moreover, the detection error is small when all the beam of light 1 is diffracted by the diffraction areas 21, 22, 23, 24.

Moreover, from equation (1) and equation (2), the detection error can be reduced by orthogonally arranging the horizontal division line that divides the light receivers 31, 32, 33, 34 of the light detection element 3 in the horizontal direction and the vertical division line that divides the light receivers 31, 32, 33, 34 of the light detection element 3 in the vertical direction. The horizontal division line is a line that divides the light receivers 31, 32 and the light receivers 33, 34. The vertical division line is a line that divides the light receivers 31, 33 and the light receivers 32, 34.

A plurality of diffraction areas 21, 22, 23, 24 are located in the directions in which the beam of light 1 is displaced. The quantities of light of the diffracted light 10 in the diffraction areas 21, 22, 23, 24 located in the direction in which the beam of light 1 is displaced increase. The quantities of light of the diffracted light 10 in the diffraction areas 21, 22, 23, 24 located in the opposite direction to the direction in which the beam of light 1 is displaced decrease.

The detection device 9 determines quantity of the displacement or a displacement direction of the beam of light 1, by comparing the quantity of light of the diffracted light 10 whose quantity of light has increased and the quantity of light of the diffracted light 10 whose quantity of light has decreased.

The detection device 9 determines the displacement direction of the beam of light 1 relative to the diffraction element 2, on the basis of the each quantity of light received by the respective light receivers 31, 32, 33, 34.

The detection device 9 determines the quantity of the displacement of the beam of light 1 relative to the diffraction element 2, on the basis of the each quantity of light received by the respective light receivers 31, 32, 33, 34.

<Inclination of Beam of Light 1 and Position of Diffracted Light on Light Detection Element 3>

Next, a method for generating an angle change signal of the beam of light 1 will be described below.

Figure 9:
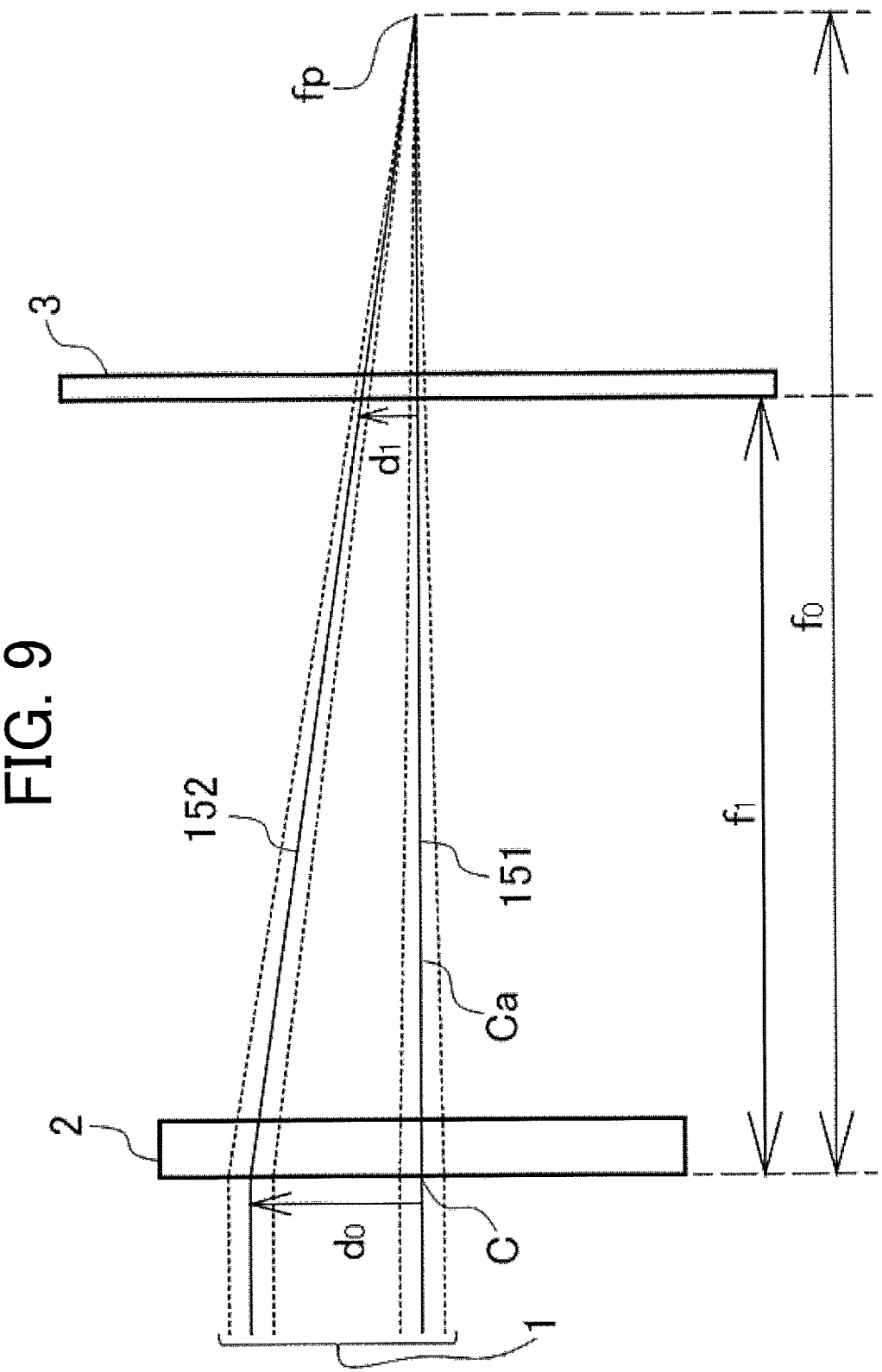
FIG. 9 is a schematic diagram schematically illustrating a relationship between an incident position on a diffraction element 2 and an incident position on the light detection element 3 of a beam of light of diffracted light of the first embodiment.

FIG. 9 is a schematic diagram schematically illustrating a relationship between the incident position (incidence height $d_0$) of the beam of light 1 on the diffraction element 2 and the incident position (incidence height $d_1$) of the diffracted light on the light detection element 3.

As described above, the diffraction element 2 has the lens effect, as well as the diffraction effect.

The beam of light 1 of the parallel light incident on the diffraction element 2 is diffracted by the diffraction element 2. In addition, the beam of light 1 of the parallel light is focused at a focal length $f_0$ by the lens effect of the diffraction element 2.

In FIG. 9, the diffraction element 2 will be described as a lens having the focal length $f_0$.

A beam of light 151 of the diffracted light is the diffracted light of the beam of light 1 incident on the center position C of the lens. The center position C of the lens is positioned on the optical axis Ca of the lens. Hence, the beam of light 151 of the diffracted light is focused at the position (focal point fp) of the focal length $f_0$.

The optical axis Ca is a symmetry axis that passes through the center of the optical image formation system. The focal point fp is defined on the optical axis Ca.

On the other hand, a beam of light 152 of the diffracted light is the diffracted light of the beam of light 1 incident on the position of the height $d_0$ from the center position C of the lens. The height of the beam of light from the center position C is referred to as "incidence height". The beam of light 152 of the diffracted light is focused at the position of the focal length $f_0$, in the same way as the beam of light 151 of the diffracted light.

As illustrated in FIG. 9, the beams of light 151, 152 of the diffracted light are ideally focused to a single point at the position of the focal length $f_0$, not depending on the incident position of the diffraction element 2.

The distance from the diffraction element 2 to the light detection element 3 is set to a distance $f_1$, for example. In this case, the incidence height $d_1$ is the height on the light detection element 3 corresponding to the incidence height $d_0$ on the diffraction surface of the diffraction element 2. That is, the incidence height $d_0$ is the height of the beam of light 152 of the diffracted light on the diffraction element 2. Moreover, the incidence height $d_1$ is the height of the beam of light 152 of the diffracted light on the light detection element 3. Thus, the incidence height $d_1$ is expressed by below equation (4).

$$d_1 = d_0 \times (f_0 - f_1)/f_0 \qquad (4)$$

Figure 10:
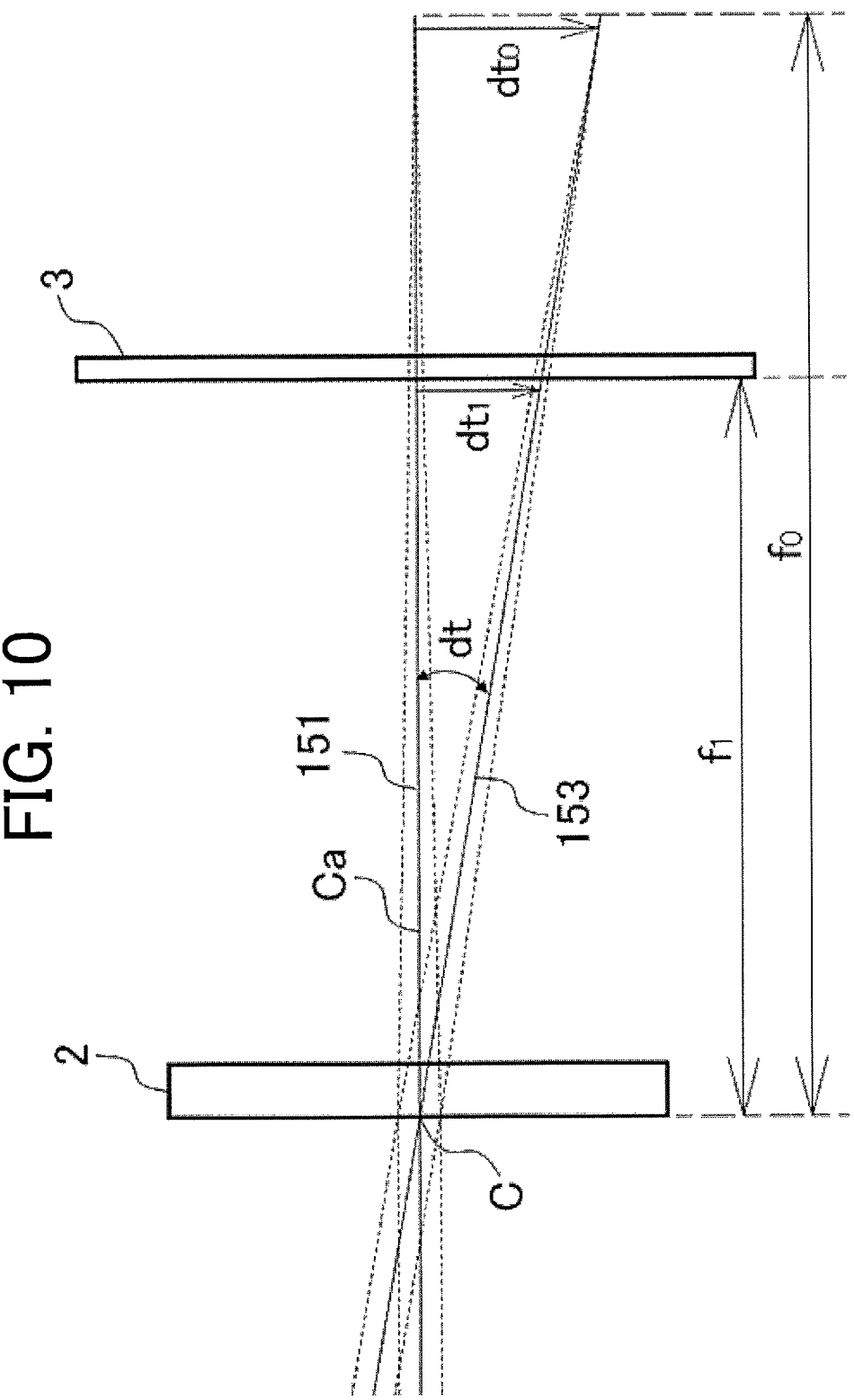
FIG. 10 is a schematic diagram schematically illustrating a relationship between an incident angle on the diffraction element 2 and the incident position on the light detection element 3 of the beam of light of diffracted light of the first embodiment.

Moreover, FIG. 10 is a schematic diagram schematically illustrating a relationship between the incident angle dt [rad] of the beam of light 1 on the diffraction element 2 and the incident position (incidence height $dt_1$) of the diffracted light on the light detection element 3.

In FIG. 10 as well, the diffraction element 2 will be described as the lens having the focal length $f_0$, in the same way as FIG. 9.

The beam of light 151 of the diffracted light is the diffracted light of the beam of light 1 incident on the center position C of the lens. That is, the incidence height on the diffraction element 2 of the beam of light 1 corresponding to the beam of light 151 of the diffracted light is zero. This applies to FIG. 9, too.

Moreover, the central light ray of the beam of light 151 of the diffracted light is on the optical axis Ca of the diffraction element 2. Hence, the beam of light 151 of the diffracted light is focused at the position of the focal length $f_0$.

On the other hand, the beam of light 1 corresponding to the beam of light 153 of the diffracted light is incident on the diffraction element 2 while being inclined by an angle dt with the beam of light 1 corresponding to the beam of light 151 of the diffracted light. That is, when the diffraction element 2 is considered as the lens having the focal length $f_0$, the beam of light 1 corresponding to the beam of light 153 of the diffracted light is inclined from the optical axis Ca of the diffraction element 2.

Moreover, the incidence height of the beam of light 1 corresponding to the beam of light 153 of the diffracted light is zero when incident on the diffraction element 2. Hence, the beam of light 153 of the diffracted light is focused at the position of the focal length $f_0$, in the same way as the beam of light 151 of the diffracted light.

As illustrated in FIG. 10, the diffraction by the diffraction element 2 does not change the angle between the optical axis Ca and the beam of light 153 of the diffracted light, from the angle between the optical axis Ca and the beam of light 1 corresponding to the beam of light 153 of the diffracted light. That is, the angle of the beam of light 153 of the diffracted light with the optical axis Ca is equal to the angle of the beam of light 1 corresponding to the beam of light 153 of the diffracted light with the optical axis Ca.

Moreover, the beams of light 151, 153 of the diffracted light are ideally focused at the positions of the focal length $f_0$, not depending on the angle formed when the beam of light is incident on the diffraction element 2. The beam of light 153 of the diffracted light is focused to the position of a height $dt_0$ from the optical axis Ca, at the position of the focal length $f_0$. The height $dt_0$ is the height, at the position of the focal length $f_0$, of the beam of light 1 that inclines at the angle dt with the optical axis Ca.

The height $dt_0$ at the light collection position is expressed by below equation (5).

$$dt_0 = f_0 \times \tan(dt) \quad (5)$$

The height $dt_1$ is the height on the light detection element 3 corresponding to the angle dt of the beam of light 1 with the optical axis Ca formed when incident on the diffraction surface of the diffraction element 2. The height $dt_1$ is the height, on the light detection element 3, of the beam of light 1 that inclines at the angle dt with the optical axis Ca. Thus, the height $dt_1$ is expressed by below equation (6).

$$dt_1 = f_1 \times \tan(dt) \quad (6)$$

A general angle detection device is configured to ignore the displacement component on the light detection element 3 and detect only the angle component, by setting the distance $f_0$ and the distance $f_1$ equal to each other ($f_1 = f_0$). That is, the general angle detection device assumes that the distance $f_0$ and the distance $f_1$ are equal to each other ($f_1 = f_0$). In addition, the general angle detection device ignores the displacement component on the light detection element 3.

For example, in FIG. 9, if the distance $f_1$ is set equal to the focal length $f_0$, the incidence height $d_1$, which is the displacement component, is 0 (zero). That is, if the incident angle is the same, the light beam is focused at the same position on the light detection element 3, regardless of the incident position of the light beam on the diffraction element 2.

Moreover, FIG. 10 is a diagram of a case in which the beams of light 151, 153 pass the same area on the diffraction element 2. In FIG. 10, the value of the height $dt_0$ remains unchanged, regardless of the incident position of the beam of light 1 on the diffraction element 2, as described above.

In contrast, in the present invention, an angle change signal can be detected at a high speed as described below, by setting the distance $f_1$ of the light detection element 3 to a different value from the focal length $f_0$.

<Generation of Angle Change Signal of Beam of Light 1 (Vertical Direction)>

The angle change signal Ss in the vertical direction is calculated by below equation (7). Note that, as illustrated in FIG. 10, there is no displacement of the beam of light 1 corresponding to the beam of light 153 of the diffracted light on the diffraction grating surface of the diffraction element 2. That is, the beam of light 1 corresponding to the beam of light 153 of the diffracted light passes through the center position C of the diffraction element 2.

$$Ss = (SA_1 + SA_2) - (SA_3 + SA_4) \quad (7)$$

The signals $SA_1$, $SA_2$, $SA_3$, $SA_4$ in equation (7) are signals correspond to the quantities of light received by the sub-light receivers 311, 312, 313, 314 of the above light receiver 31 respectively. The signal processing circuit 6 performs computation expressed by equation (7), by using these signals $SA_1$, $SA_2$, $SA_3$, $SA_4$. Thereby, the angle signal Ss of the beam of light 1 in the vertical direction is calculated.

Figure 11A:
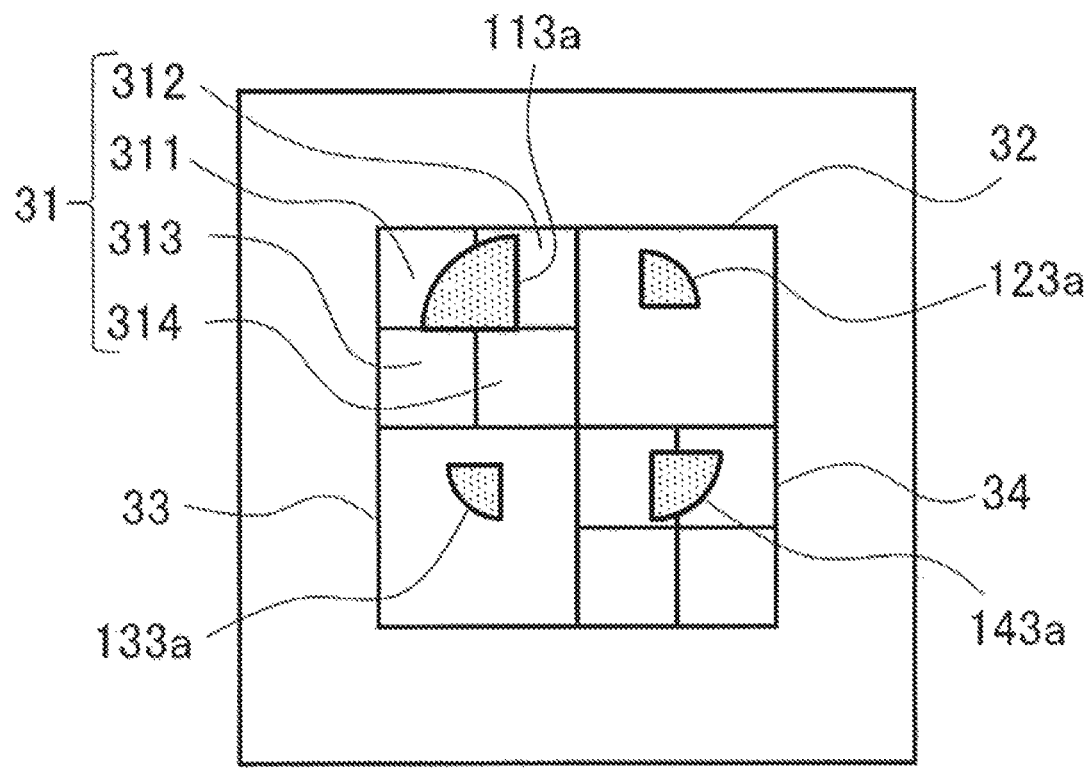
FIGS. 11A and 11B are diagrams schematically illustrating behavior of spots 11, 12, 13, 14 of diffracted light formed on the light detection element 3 in response to an angle change of the beam of light 1 of the first embodiment.
Figure 11B:
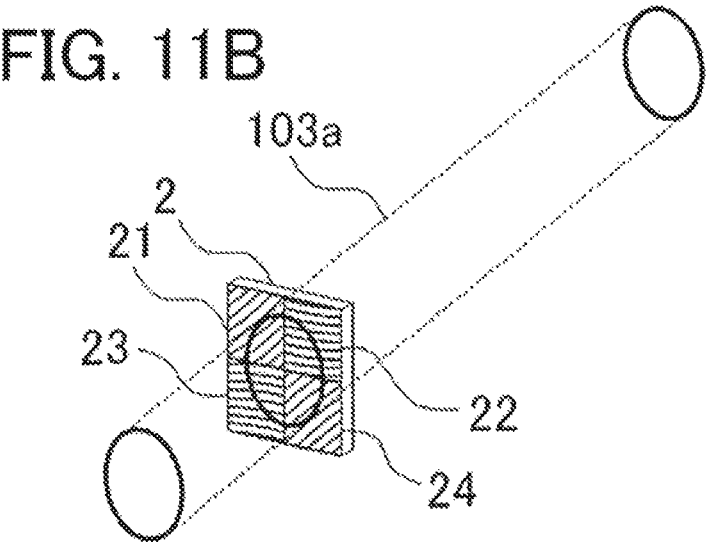
Figure 12A:
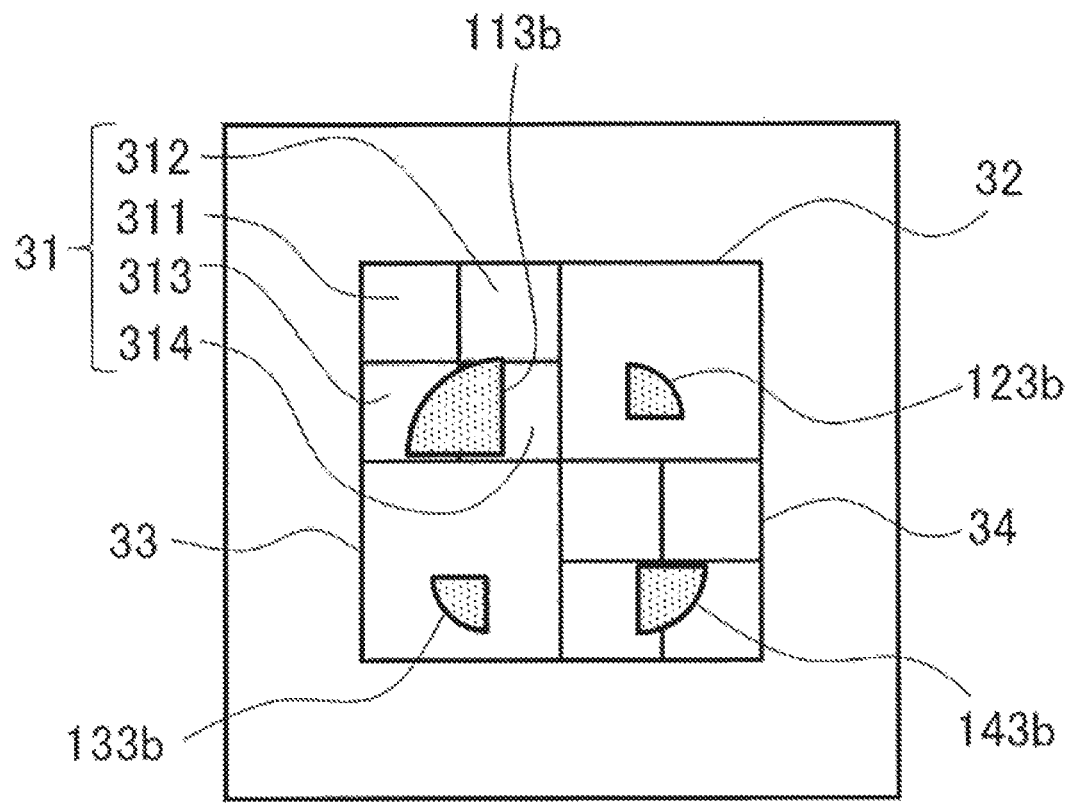
FIGS. 12A and 12B are diagrams schematically illustrating behavior of spots 11, 12, 13, 14 of diffracted light formed on the light detection element 3 in response to an angle change of the beam of light 1 of the first embodiment.

FIG. 11A and FIG. 12A are diagrams schematically illustrating the behavior of the spots 11, 12, 13, 14 of the diffracted light formed on the light detection element 3 in response to the angle change of the beam of light 1. Moreover, FIG. 11B and FIG. 12B are perspective views of the beam of light 1 that transmits through the diffraction element 2.

FIG. 11A and FIG. 11B illustrate a case in which the beam of light 1 transmits through the center (center position C) of the diffraction element 2 while being inclined in the upward direction. The beam of light 1 in this case is illustrated as a beam of light 103a in FIG. 11B. Moreover, the spots 11, 12, 13, 14 of the diffracted light illustrated in FIG. 3 are illustrated as spots 113a, 123a, 133a, 143a of the diffracted light in FIG. 11A.

Note that "incline in the upward direction" illustrated in the embodiment indicates a case in which, as the beam of light 1 (here, the beam of light 103a) proceeds, the beam of light 1 passes an upper position in the vertical direction.

Figure 12B:
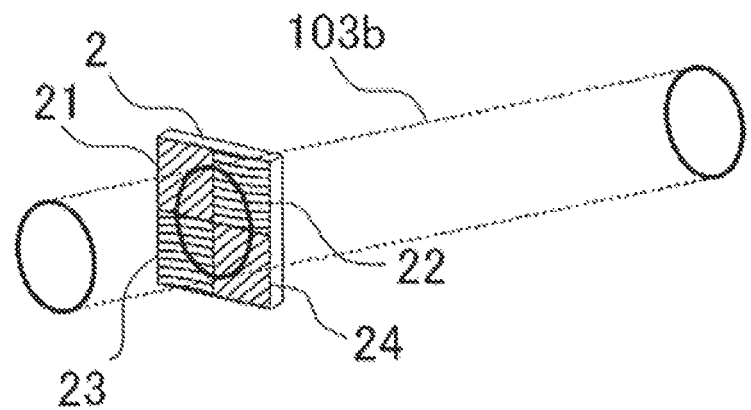

FIG. 12A and FIG. 12B illustrate a case in which the beam of light 1 transmits through the center (center position C) of the diffraction element 2 while being inclined in the downward direction. The beam of light 1 in this case is illustrated as a beam of light 103b in FIG. 12B. Moreover, the spots 11, 12, 13, 14 of the diffracted light illustrated in FIG. 3 are illustrated as spots 113b, 123b, 133b, 143b of the diffracted light in FIG. 12A.

Note that "incline in the downward direction" illustrated in the embodiment indicates a case in which, as the beam of light 1 (here, the beam of light 103b) proceeds, the beam of light 1 passes a lower position in the vertical direction.

That is, FIG. 11A, FIG. 11B, FIG. 12A, and FIG. 12B illustrate cases in which the beam of light 1 transmits through the center (center position C) of the diffraction element 2 while being inclined in the vertical direction.

Next, the cases in which the beam of light 1 is inclined in the vertical direction will be described individually.

First, the case in which the beam of light 103a transmits through the center of the diffraction element 2 while being inclined in the upward direction, as illustrated in FIG. 11A and FIG. 11B will be described.

In this case, the position of the spot 113a of the diffracted light corresponding to the beam of light 103a incident on the diffraction area 21 of the diffraction element 2 moves to an upper side than the position of the spot 110 of the diffracted light having no inclination as illustrated in FIG. 4A and FIG. 4B. The moving amount of the spot 113a of the diffracted light from the spot 110 of the diffracted light depends on the incident angle dt formed when the beam of light 103a of the parallel light is incident on the diffraction element 2, as indicated by equation (6).

Moreover, the quantity of light of the spot 113a of the diffracted light is equal to the quantity of light of the spot 110 of the diffracted light.

Hence, the quantity of light of the spot 113a of the diffracted light incident on the sub-light receivers 311, 312 is larger than the quantity of light of the spot 110 of the diffracted light whose angle is not changed (in the case of the beam of light 100). Hence, the signals $SA_1$, $SA_2$ become large.

On the other hand, the quantity of light of the spot 113a of the diffracted light incident on the sub-light receivers 313, 314 is smaller than the quantity of light of the spot 110 of the diffracted light whose angle is not changed (in the case of the beam of light 100). Hence, the signals $SA_3$, $SA_4$ become small.

From the above, from equation (7), the angle signal Ss in the vertical direction becomes large when the beam of light 100 of the parallel light transmits through the center of the diffraction element 2 while being inclined in the upward direction (in the case of the beam of light 103a). If the angle signal Ss is zero when the beam of light 100 transmits through the center of the diffraction element 2 without inclination, the value of the angle signal Ss (of the beam of light 103a) is a positive value when the beam of light 100 is inclined in the upward direction.

Next, the case in which the beam of light 103b transmits through the center of the diffraction element 2 while being inclined in the downward direction, as illustrated in FIG. 12A and FIG. 12B will be described.

In this case, the position of the spot 113b of the diffracted light corresponding to the beam of light 103b incident on the diffraction area 21 of the diffraction element 2 moves to a lower side than the position of the spot 110 of the diffracted light having no inclination as illustrated in FIG. 4A and FIG. 4B. The moving amount of the spot 113b of the diffracted light from the spot 110 of the diffracted light depends on the incident angle dt formed when the beam of light 103b of the parallel light is incident on the diffraction element 2, as indicated by equation (6).

Moreover, the quantity of light of the spot 113b of the diffracted light is equal to the quantity of light of the spot 110 of the diffracted light.

Hence, the quantity of light of the spot 113b of the diffracted light incident on the sub-light receivers 311, 312 is smaller than the quantity of light of the spot 110 of the diffracted light whose angle is not changed (in the case of the beam of light 100). Hence, the signals $SA_1$, $SA_2$ become small.

On the other hand, the quantity of light of the spot 113b of the diffracted light incident on the sub-light receivers 313, 314 is larger than the quantity of light of the spot 110 of the diffracted light whose angle is not changed (in the case of the beam of light 100). Hence, the signals $SA_3$, $SA_4$ become large.

From the above, from equation (7), the angle signal Ss in the vertical direction becomes small when the beam of light 100 of the parallel light transmits through the center of the diffraction element 2 while being inclined in the downward direction (in the case of the beam of light 103b). If the angle signal Ss is zero when the beam of light 100 transmits through the center of the diffraction element 2 without inclination, the value of the angle signal Ss (of the beam of light 103b) is a negative value when the beam of light 100 is inclined in the downward direction.

<Generation of Angle Change Signal of Beam of Light 1 (Horizontal Direction)>

Moreover, an angle change signal Sp in the horizontal direction is calculated by below equation (8).

$$Sp=(SA_1+SA_3)-(SA_2+SA_4) \quad (8)$$

The signal processing circuit 6 performs computation expressed by equation (8), by using the signals $SA_1$, $SA_2$, $SA_3$, $SA_4$. Thereby, the angle signal Sp in the horizontal direction is calculated.

Figure 13A:
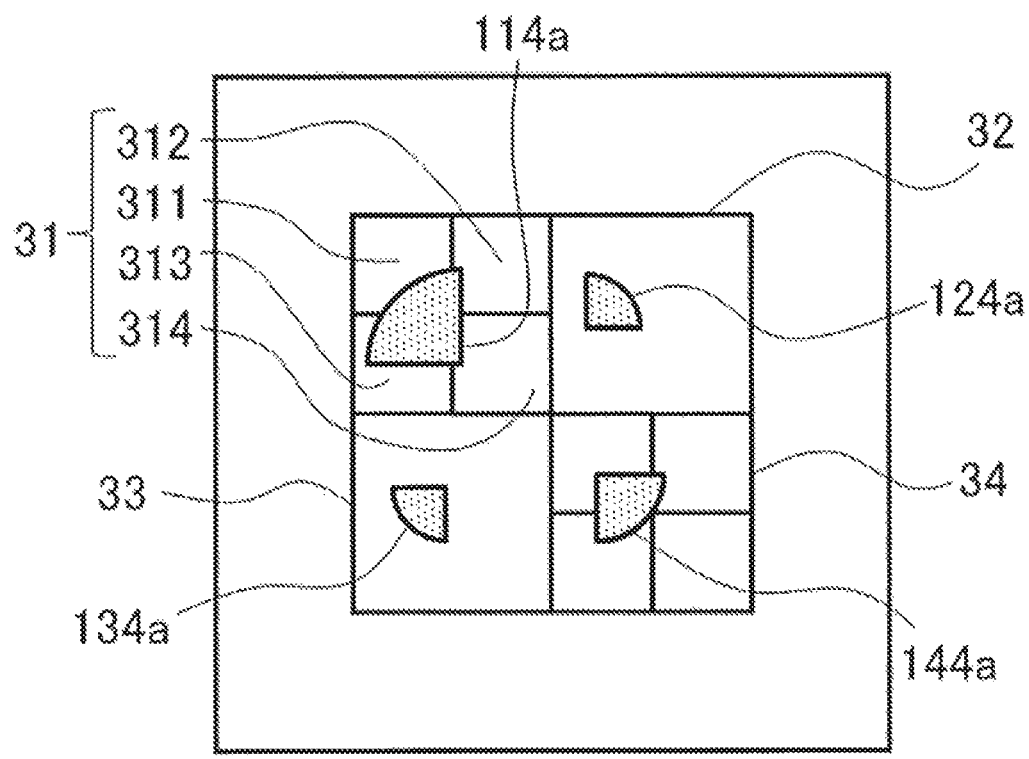
FIGS. 13A and 13B are diagrams schematically illustrating behavior of spots 11, 12, 13, 14 of diffracted light formed on the light detection element 3 in response to an angle change of the beam of light 1 of the first embodiment.
Figure 13B:
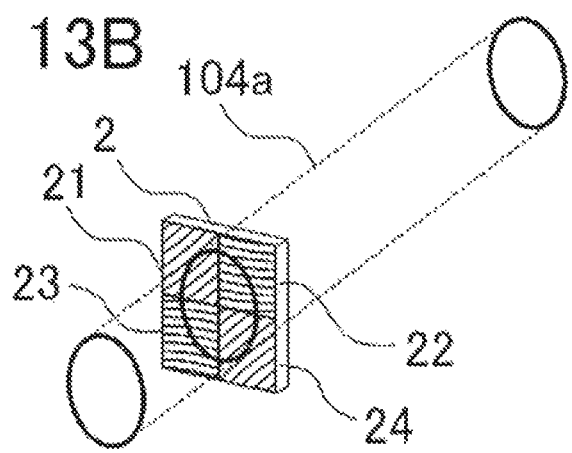
Figure 14A:
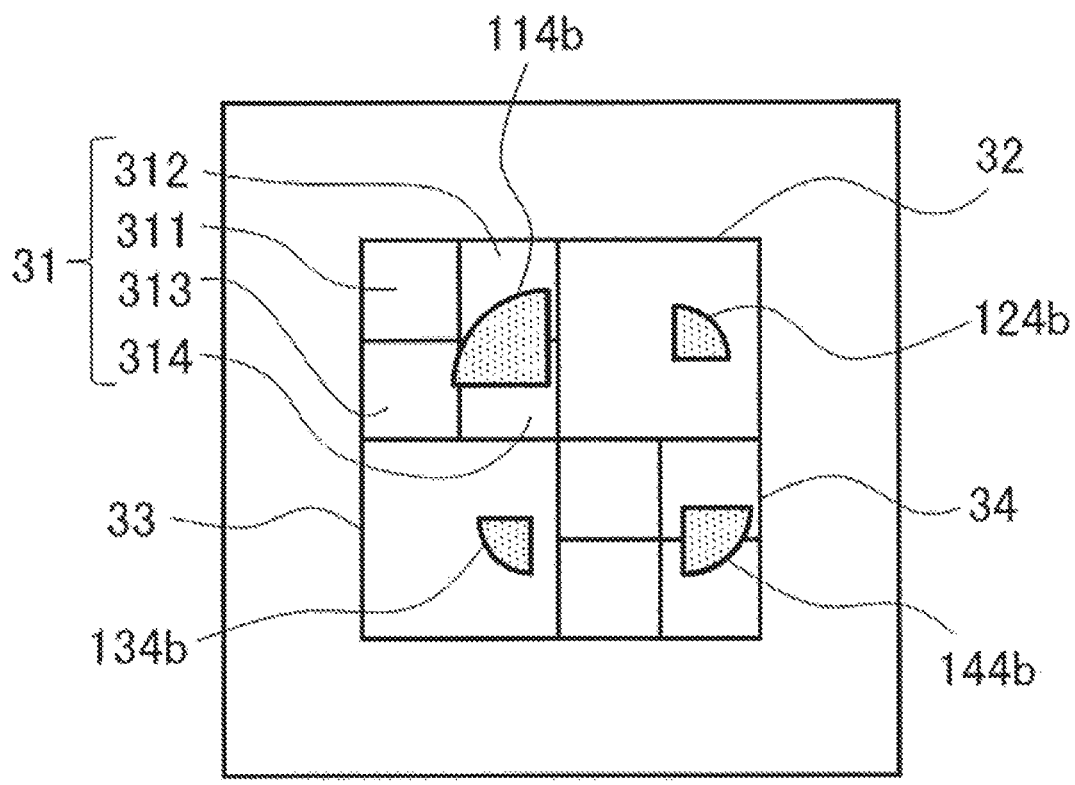
FIGS. 14A and 14B are diagrams schematically illustrating behavior of spots 11, 12, 13, 14 of diffracted light formed on the light detection element 3 in response to an angle change of the beam of light 1 of the first embodiment.

FIG. 13A and FIG. 14A are diagrams schematically illustrating the behavior of the spots 11, 12, 13, 14 of the diffracted light formed on the light detection element 3 in response to the angle change of the beam of light 1. Moreover, FIG. 13B and FIG. 14B are perspective views of the beam of light 1 that transmits through the diffraction element 2.

FIG. 13A and FIG. 13B illustrate a case in which the beam of light 1 transmits through the center (center position C) of the diffraction element 2 while being inclined in the left direction. The beam of light 1 in this case is illustrated as a beam of light 104a in FIG. 13B. Moreover, the spots 11, 12, 13, 14 of the diffracted light illustrated in FIG. 3 are illustrated as spots 114a, 124a, 134a, 144a of the diffracted light in FIG. 13A.

Note that "incline in the left direction" illustrated in the embodiment indicates a case in which, as the beam of light 1 (here, the beam of light 104a) proceeds, the beam of light 1 passes a more left position in the horizontal direction.

Figure 14B:
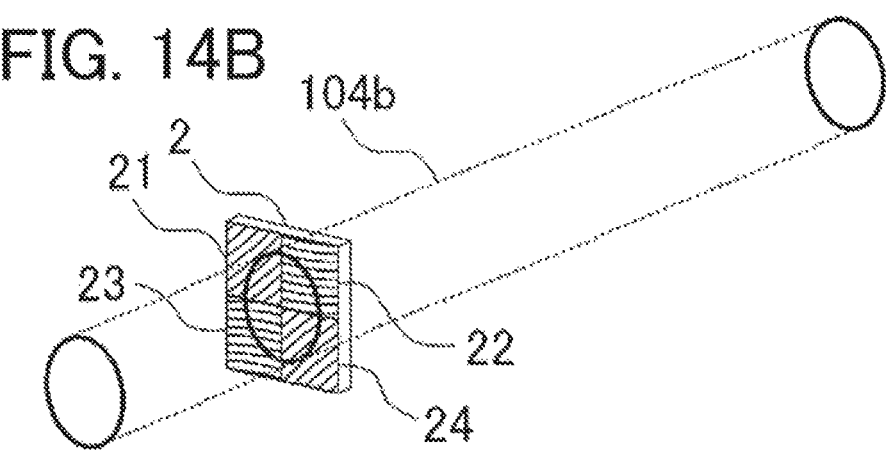

FIG. 14A and FIG. 14B illustrate a case in which the beam of light 1 transmits through the center (center position C) of the diffraction element 2 while being inclined in the right direction. The beam of light 1 in this case is illustrated as a beam of light 104b in FIG. 14B. Moreover, the spots 11, 12, 13, 14 of the diffracted light illustrated in FIG. 3 are illustrated as spots 114b, 124b, 134b, 144b of the diffracted light in FIG. 14A.

Note that "incline in the right direction" illustrated in the embodiment indicates a case in which, as the beam of light 1 (here, the beam of light 104b) proceeds, the beam of light 1 passes a more right position in the horizontal direction.

That is, FIG. 13A, FIG. 13B, FIG. 14A, and FIG. 14B illustrate cases in which the beam of light 1 transmits through the center (center position C) of the diffraction element 2 while being inclined in the horizontal direction.

Next, the cases in which the beam of light 1 is inclined in the horizontal direction will be described individually.

First, the case in which the beam of light 104a transmits through the center of the diffraction element 2 while being inclined in the left direction, as illustrated in FIG. 13A and FIG. 13B will be described.

In this case, the position of the spot 114a of the diffracted light corresponding to the beam of light 104a incident on the diffraction area 21 of the diffraction element 2 moves to a left side from the position of the spot 110 of the diffracted light having no inclination as illustrated in FIG. 4A and FIG. 4B. The moving amount of the spot 114a of the diffracted light from the spot 110 of the diffracted light depends on the incident angle dt formed when the beam of light 104a of the parallel light is incident on the diffraction element 2, as indicated by equation (6).

Moreover, the quantity of light of the spot 114a of the diffracted light is equal to the quantity of light of the spot 110 of the diffracted light.

Hence, the quantity of light of the spot 114a of the diffracted light incident on the sub-light receivers 311, 313 is larger than the quantity of light of the spot 110 of the diffracted light whose angle is not changed (in the case of the beam of light 100). Hence, the signals $SA_2$, $SA_3$ become large.

On the other hand, the quantity of light of the spot 114a of the diffracted light incident on the sub-light receivers 312, 314 is smaller than the quantity of light of the spot 110 of the diffracted light whose angle is not changed (in the case of the beam of light 100). Hence, the signals $SA_2$, $SA_4$ become small.

From the above, from equation (8), the angle signal Sp in the horizontal direction becomes large when the beam of light 100 of the parallel light transmits through the center of the diffraction element 2 while being inclined in the left direction (in the case of the beam of light 104a). If the angle signal Sp is zero when the beam of light 100 transmits through the center of the diffraction element 2 without inclination, the value of the angle signal Sp (of the beam of light 104a) is a positive value when the beam of light 100 is inclined in the left direction.

Next, the case in which the beam of light 104b transmits through the center of the diffraction element 2 while being inclined in the right direction, as illustrated in FIG. 14A and FIG. 14B will be described.

In this case, the position of the spot 114b of the diffracted light corresponding to the beam of light 104b incident on the diffraction area 21 of the diffraction element 2 moves to a right side from the position of the spot 110 of the diffracted light having no inclination as illustrated in FIG. 4A and FIG. 4B. The moving amount of the spot 114b of the diffracted light from the spot 110 of the diffracted light depends on the incident angle dt formed when the beam of light 104b of the parallel light is incident on the diffraction element 2, as indicated by equation (6).

Moreover, the quantity of light of the spot 114b of the diffracted light is equal to the quantity of light of the spot 110 of the diffracted light.

Hence, the quantity of light of the spot 114b of the diffracted light incident on the sub-light receivers 311, 313 is smaller than the quantity of light of the spot 110 of the diffracted light whose angle is not changed (in the case of the beam of light 100). Hence, the signals $SA_1$, $SA_3$ become small.

On the other hand, the quantity of light of the spot 114b of the diffracted light incident on the sub-light receivers 312, 314 is larger than the quantity of light of the spot 110 of the diffracted light whose angle is not changed (in the case of the beam of light 100). Hence, the signals $SA_2$, $SA_4$ become large.

From the above, from equation (8), the angle signal Sp in the horizontal direction becomes small when the beam of light 100 of the parallel light transmits through the center of the diffraction element 2 while being inclined in the right direction (in the case of the beam of light 104b). If the angle signal Sp is zero when the beam of light 100 transmits through the center of the diffraction element 2 without inclination, the value of the angle signal Sp (of the beam of light 104b) is a negative value when the beam of light 100 is inclined in the right direction.

As above, the detection device 9 simultaneously acquires the angle change signal Ss in the vertical direction and the angle change signal Sp in the horizontal direction. That is, the detection device 9 can acquire the angle change information of the beam of light 1 of the parallel light two-dimensionally.

Moreover, unlike the CCD, the four sub-light receivers 311, 312, 313, 314 receive light, and thereby the computation time or the transfer time can be made faster.

Moreover, unlike the PSD, the sizes of the sub-light receivers 311, 312, 313, 314 can be made smaller. Thereby, the time for converting the light to the signals $SA_1$, $SA_2$, $SA_3$, $SA_4$ can be made faster.

In this case, the angle change signal not influenced by the fluctuation of the entire quantity of light is obtained by dividing equation (7) by equation (1a). In addition, the angle change signal not influenced by the fluctuation of the entire quantity of light is obtained by dividing equation (8) by equation (1a). That is, the angle change signal less influenced by the fluctuation of the entire quantity of light is obtained.

Moreover, equation (7) of angle change information is an equation similar to equation (2) of displacement information. However, the beam of light 1 is divided by the diffraction element 2, to acquire the displacement information. In contrast, to acquire the angle change information, the spot of the diffracted light is divided by the light receiving areas (the sub-light receivers) on the light receiving surface of the light detection element 3.

That is, the light detection element 3 determines the displacement of the beam of light 1 relative to the diffraction element 2 on the basis of the quantities of light of beams of the diffracted light 10. Moreover, the light detection element 3 determines the angle change of the beam of light 1 relative to the diffraction element 3, by dividing the quantity of light of the diffracted light 10 corresponding to one of the areas.

Hence, the detection error is small when there is no interspace between the sub-light receivers 311, 312, 313, 314, by the same reason as the displacement information.

The detection error can be reduced by orthogonally arranging the horizontal division line that divides the sub-light receivers 311, 312, 313, 314 of the light receiver 31 in the horizontal direction and the vertical division line that divides the sub-light receivers 311, 312, 313, 314 of the light receiver 31 in the vertical direction. The horizontal division line is a line that divides the sub-light receivers 311, 312 and the sub-light receivers 313, 314. The vertical division line is a line that divides the sub-light receivers 311, 313 and the sub-light receivers 312, 314.

In this case, the horizontal division line on the light detection element 3 is not necessarily parallel to the horizontal division line on the diffraction element 2, but may have an inclined relationship. Moreover, the vertical division line on the light detection element 3 is not necessarily parallel to the vertical division line on the diffraction element 2, but may have an inclined relationship.

The detection device 9 determines a direction of the angle change of the beam of light 1 relative to the diffraction element 2 on the basis of the each quantity of light received by the respective sub-light receivers 311, 312, 313, 314.

The detection device 9 determines a quantity of the angle change of the beam of light 1 relative to the diffraction element 2 on the basis of the each quantity of light received by the respective sub-light receivers 311, 312, 313, 314.

A plurality of sub-light receivers 311, 312, 313, 314 are located in the directions in which the diffracted light 10 is displaced on the light receiver 31 including the sub-light receivers 311, 312, 313, 314, when the beam of light 1 is inclined relative to the diffraction element 2. The quantities of light received by the sub-light receiver 311, 312, 313, 314 located in the direction to which the diffracted light is displaced 10 increase. On the other hand, the quantities of light received by the sub-light receiver 311, 312, 313, 314 located in the opposite direction to the direction to which the diffracted light 10 is displaced decrease.

The detection device 9 determines the quantity of the angle change or the direction of the angle change of the beam of light 1, by comparing the quantity of light of the diffracted light 10 whose quantity of light has increased and the quantify of light of the diffracted light 10 whose quantity of light has decreased.

<Generation of Parallelism Signal of Beam of Light 1>

Next, a method for generating a parallelism signal Sc of the beam of light will be described below.

First, a general astigmatic method will be described as a method for generating the parallelism signal Sc.

The diffraction area 24 has a principle line direction. The diffraction area 24 has a focusing effect in the principle line direction. In addition, the diffraction area 24 has a focusing effect in a direction perpendicular to the principle line direction. The focal length in the direction perpendicular to the principle line direction differs from the focal length in the principle line direction. That is, the diffraction area 24 has the focusing effect in the principle line direction and the direction perpendicular to the principle line direction. The diffraction area 24 has a stronger focusing effect in the direction perpendicular to the principle line direction, than in the principle line direction, for example.

That is, the diffraction area 24 has astigmatism in the direction perpendicular to the principle line direction. With respect to the diffracted light of the beam of light 1 that has transmitted through the diffraction area 24, a focal position of the diffracted light of the beam of light 1 on a plane that includes the principle line and is parallel to the optical axis of the beam of light 1 and a focal position of the diffracted light of the beam of light 1 on a plane that is perpendicular to the principle line and is parallel to the optical axis of the beam of light 1 are mutually different.

In the above description, the diffraction area 24 has a diffraction function. In addition, the diffraction area 24 has a focusing function in the principle line direction. For example, the focal length in the principle line direction is $f_2$. In addition, the diffraction area 24 has a focusing function in a direction perpendicular to the principle line direction. For example, the focal length in the direction perpendicular to the principle line direction is $f_3$. The focal length $f_2$ is a different length from the focal length $f_3$. Hence, the diffraction area 24 has a non-linear diffraction grating pattern.

The direction of the diffraction area 21, 22, 23, 24 that has the same focusing effect as other diffraction areas 21, 22, 23, 24 is the principle line direction. In addition, the diffraction areas 21, 22, 23, 24 have a stronger focusing effect in the direction perpendicular to this principle line direction. That is, the direction perpendicular to the strong focusing effect axis of the diffraction area 21, 22, 23, 24 has the same focusing effect as other diffraction areas 21, 22, 23, 24.

Here, the direction that links the center of the diffraction area 21 and the center of the diffraction area 24 is the direction perpendicular to the principle line. That is, the principle lines of the diffraction areas 21, 24 are perpendicular to a line segment that links the center of the diffraction area 21 and the center of the diffraction area 24.

Moreover, the direction of the principle line of the diffraction area 24 on the diffraction element 2 is the same direction as the focusing effect directions of the other diffraction areas 21, 22, 23.

The diffraction grating pattern of the diffraction area 24 is designed such that the image height in the principle line direction on the light detection element 3 and the image height in the direction perpendicular to the principle line are equal to each other, when the beam of light 1 incident on the diffraction element 2 is parallel light. That is, the focal length $f_2$ in the principle line direction and the focal length $f_3$ in the direction perpendicular to the principle line direction are set. Thereby, when the beam of light 1 is the parallel light, the spot 14 of the diffracted light has a circular shape on the light detection element 3.

That is, each value may be set as in the following. The focal length $f_2$ is larger than the distance $f_1$. Moreover, the focal length $f_3$ is smaller than the distance $f_1$. That is, the focal length $f_2$ is larger than the distance $f_1$, and the focal length $f_3$ is smaller than the distance $f_1$. Alternatively, the focal length $f_3$ is larger than the distance $f_1$. Moreover, the focal length $f_2$ is smaller than the distance $f_1$. That is, the focal length $f_3$ is larger than the distance $f_1$, and the focal length $f_2$ is smaller than the distance $f_1$.

In this case, the shape of the spot 14 of the diffracted light is distorted according to the parallelism of the beam of light 1, and forms an elliptical shape.

Thus, the quantities of light received by the sub-light receivers 341, 342, 343, 344 of the light receiver 34 are equal to each other, when the beam of light 1 of the parallel light transmits through the center position of the diffraction element 2, with respect to the four diffraction areas 21, 22, 23, 24 of the diffraction element 2, perpendicularly to the diffraction element 2. That is, the signals $SD_1$, $SD_2$, $SD_3$, $SD_4$ output from these sub-light receivers 341, 342, 343, 344 are all equal to each other.

The parallelism signal Sc is calculated by below equation (9). Note that there is no displacement and no angle change of the beam of light 1 on the surface of the diffraction grating of the diffraction element 2.

$$Sc=(SD_2+SD_3)-(SD_1+SD_4) \qquad (9)$$

The signals $SD_1$, $SD_2$, $SD_3$, $SD_4$ in equation (9) are the signals corresponding to the quantities of light received by the sub-light receivers 341, 342, 343, 344 of the above light receiver 34 respectively. The signal processing circuit 6 performs computation expressed by equation (9), by using these signals $SD_1$, $SD_2$, $SD_3$, $SD_4$. Thereby, the parallelism signal Sc is calculated.

Figure 15A:
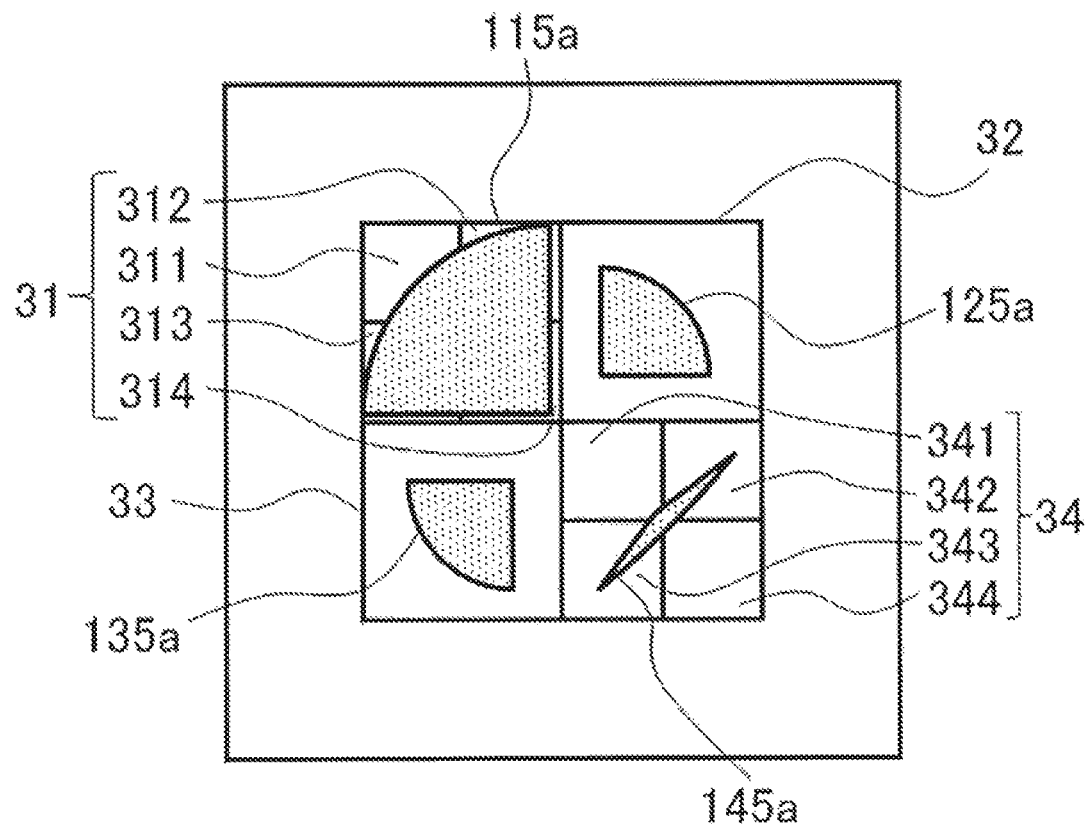
FIGS. 15A and 15B are diagrams schematically illustrating behavior of spots 11, 12, 13, 14 of diffracted light formed on the light detection element 3 in response to a change in parallelism of the beam of light 1 of the first embodiment.
Figure 15B:
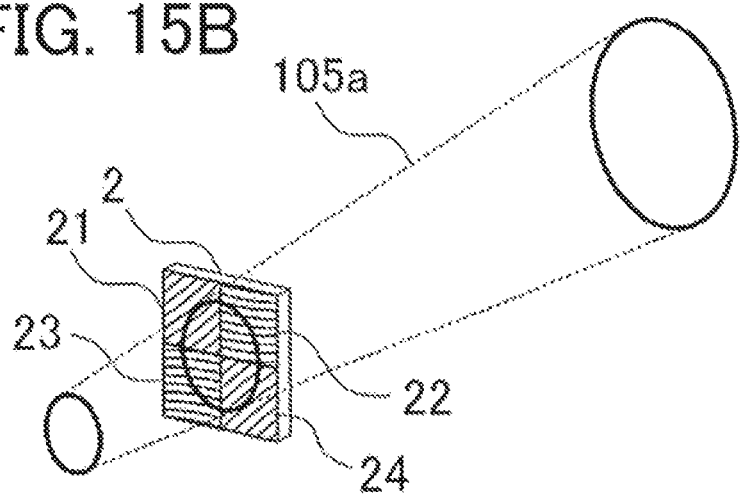
Figure 16A:
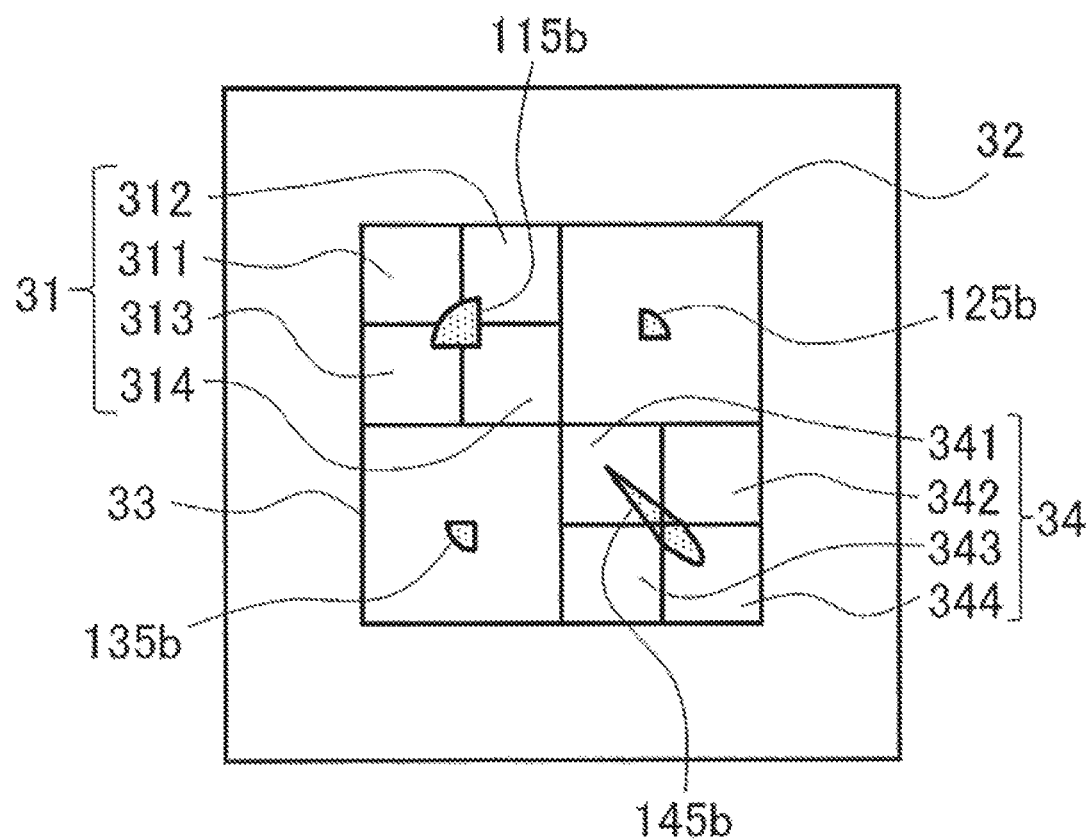
FIGS. 16A and 16B are diagrams schematically illustrating behavior of spots 11, 12, 13, 14 of diffracted light formed on the light detection element 3 in response to a change in parallelism of the beam of light 1 of the first embodiment.

FIG. 15A and FIG. 16A are diagrams schematically illustrating the behavior of the spots 11, 12, 13, 14 of the diffracted light formed on the light detection element 3 in response to a change in parallelism of the beam of light 1. Moreover, FIG. 15B and FIG. 16B are perspective views of the beam of light 1 that transmits through the diffraction element 2.

FIG. 15A and FIG. 15B illustrate a case in which the beam of light 1 transmits through the center of the diffraction element 2 while increasing the diameter of the beam of light. The beam of light 1 in this case is illustrated as a beam of light 105*a* in FIG. 15B. Moreover, the spots 11, 12, 13, 14 of the diffracted light illustrated in FIG. 3 are illustrated as spots 115*a*, 125*a*, 135*a*, 145*a* of the diffracted light in FIG. 15A.

Note that "the diameter of the beam of light becomes large" illustrated in the embodiment indicates a case in which, as the beam of light 1 (here, the beam of light 105*a*) proceeds, the diameter of the beam of light becomes larger.

Figure 16B:
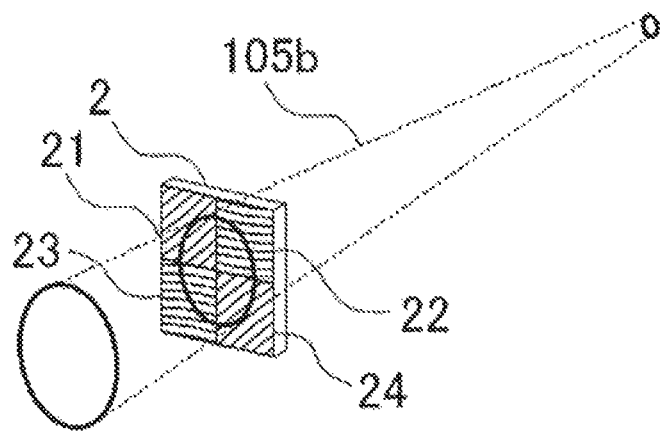

FIG. 16A and FIG. 16B illustrate a case in which the beam of light 1 transmits through the center of the diffraction element 2 while the diameter of the beam of light is becoming small. The beam of light 1 in this case is illustrated as a beam of light 105*b* in FIG. 16B. Moreover, the spots 11, 12, 13, 14 of the diffracted light illustrated in FIG. 3 are illustrated as spots 115*b*, 125*b*, 135*b*, 145*b* of the diffracted light in FIG. 16A.

Note that "the diameter of the beam of light becomes small" illustrated in the embodiment indicates a case in which, as the beam of light 1 (here, the beam of light 105*b*) proceeds, the diameter of the beam of light becomes smaller.

That is, FIG. 15A, FIG. 15B, FIG. 16A, and FIG. 16B illustrate cases in which the beam of light 1, which is not parallel light, transmits through the center of the diffraction element 2. That is, there are illustrated the cases in which the beam of light 1 transmits through the center of the diffraction element 2, while changing the diameter of the beam of light in the light traveling direction. Here, the change of the diameter of the beam of light includes a case where the diameter of the beam of light changes so as to become large and a case where the diameter of the beam of light changes so as to become small. Note that the central light ray of the beam of light 1 is perpendicular to the diffraction element 2.

Next, the cases in which the diameter of the beam of light 1 changes in the optical axis direction will be described individually.

As described above, the signals $SD_1$, $SD_2$, $SD_3$, $SD_4$ are all equal to each other, in FIG. 4A and FIG. 4B. Hence, the parallelism signal Sc calculated from equation (9) is zero.

Next, the case in which the diameter of the beam of light 105a becomes larger in the light traveling direction as illustrated in FIG. 15A and FIG. 15B will be described. For example, the beam of light 105a in this case is referred to as "diverging light", in contrast to "parallel light".

In this case, the shape of the spot 145a of the diffracted light corresponding to the beam of light 105b incident on the diffraction area 24 of the diffraction element 2 is an elliptical shape that extends in the direction linking the center of the sub-light receiver 342 and the center of the sub-light receiver 343, in contrast to the shape of the spot 140 of the diffracted light of the parallel beam of light 100 illustrated in FIG. 4A and FIG. 4B. This is because the direction linking the center of the sub-light receiver 342 and the center of the sub-light receiver 343 is in parallel with the principle line of the diffraction area 24.

Hence, the quantity of light of the spot 145a of the diffracted light incident on the sub-light receivers 342, 343 is larger than the quantity of light of the spot 140 of the diffracted light in the case of the beam of light 100 of the parallel light. Hence, the signal $SD_2$ and $SD_3$ become large.

On the other hand, the quantity of light of the spot 145a of the diffracted light incident on the sub-light receivers 341, 344 is smaller than the quantity of light of the spot 140 of the diffracted light in the case of the beam of light 100 of the parallel light. Hence, the signal $SD_1$ and $SD_4$ become small.

From the above, from equation (9), the parallelism signal Sc becomes large when the beam of light 105a of the diverging light transmits through the center of the diffraction element 2. If the parallelism signal Sc is zero when the beam of light 100 of the parallel light transmits through the center of the diffraction element 2, the value of the parallelism signal Sc is a positive value when the beam of light 105a of the diverging light transmits through the center of the diffraction element 2.

Lastly, the case in which the diameter of the beam of light 105b becomes small in the light traveling direction as illustrated in FIG. 16A and FIG. 16B will be described. For example, the beam of light 105b in this case is referred to as "converging light", in contrast to "parallel light".

In this case, the shape of the spot 145b of the diffracted light corresponding to the beam of light 105b incident on the diffraction area 24 of the diffraction element 2 is an elliptical shape that extends in the direction linking the center of the sub-light receiver 341 and the center of the sub-light receiver 344, in contrast to the shape of the spot 140 of the diffracted light of the parallel beam of light 100 illustrated in FIG. 4A and FIG. 4B. This is because the direction linking the center of the sub-light receiver 342 and the center of the sub-light receiver 343 is in parallel with the principle line of the diffraction area 24.

Hence, the quantity of light of the spot 145b of the diffracted light incident on the sub-light receivers 341, 344 is larger than the quantity of light of the spot 140 of the diffracted light in the case of the beam of light 100 of the parallel light. Hence, the signal $SD_1$ and $SD_4$ become large.

On the other hand, the quantity of light of the spot 145b of the diffracted light incident on the sub-light receivers 342, 343 is smaller than the quantity of light of the spot 140 of the diffracted light in the case of the beam of light 100 of the parallel light. Hence, the signal $SD_2$ and $SD_3$ become small.

From the above, from equation (9), the parallelism signal Sc becomes small when the beam of light 105b of the converging light transmits through the center of the diffraction element 2. If the parallelism signal Sc is zero when the beam of light 100 of the parallel light transmits through the center of the diffraction element 2, the value of the parallelism signal Sc is a negative value when the beam of light 105b of the converging light transmits through the center of the diffraction element 2.

As above, the detection device 9 can acquire parallelism information (parallelism signal Sc) of the beam of light 1.

In this case, the parallelism signal not influenced by the fluctuation of the entire quantity of light is obtained by dividing equation (9) by equation (1b). That is, a displacement signal less influenced by the fluctuation of the entire quantity of light is obtained.

Moreover, equation (9) of parallelism information uses the signals of the sub-light receivers, like equation (7) of angle change information. That is, the beam of light 1 of the parallel light is divided by the diffraction element 2, to acquire the displacement information. In contrast, the spots of the diffracted light are divided by the light receiving areas (sub-light receivers) on the light receiving surface of the light detection element 3, to acquire the angle change information and to acquire the parallelism information.

Hence, the detection error becomes smaller as the interspace becomes smaller between the sub-light receivers 341, 342, 343, 344, by the same reason as the displacement information. This is the same as the case of angle change information.

The detection error can be reduced by orthogonally arranging the horizontal division line that divides the sub-light receivers 341, 342, 343, 344 of the light receiver 34 in the horizontal direction and the vertical division line that divides the sub-light receivers 341, 342, 343, 344 of the light receiver 34 in the vertical direction. The horizontal division line is a line that divides the sub-light receivers 341, 342 and the sub-light receivers 343, 344. The vertical division line is a line that divides the sub-light receivers 341, 343 and the sub-light receivers 342, 344.

The detection device 9 determines whether the beam of light 1 is the diverging light or the converging light, on the basis of the shape of the astigmatism of the focused diffracted light 10.

The light detection element 3 includes a plurality of sub-light receivers 341, 342, 343, 344 that the light receiver 34 that receives the focused diffracted light 10 is divided into.

The detection device 9 determines whether the beam of light 1 is the diverging light or the converging light, on the basis of the each quantity of light received by the respective sub-light receivers 341, 342, 343, 344.

In the above, the astigmatic method has been described. However, this is not a limitation, but a Foucault method, a spot size method, or the like may be used, for example. For example, the spot size method determines on the basis of the size of the diameter of the spot on the light receiver 34. In these cases, it is necessary to design the diffraction grating pattern of the diffraction area 24 on the diffraction element 2 and the sub-light receivers 341, 342, 343, 344 of the light receiver 34 on the light detection element 3, in accordance with each method.

Here, attention is needed to simultaneously acquire the displacement information, the angle change information, and the parallelism information.

For example, as known from equation (9), if the displacement or the angle change of the beam of light 1 is such that the spot 140 of the diffracted light is disproportionately located in the sub-light receiver 341, the parallelism signal Sc is not zero even when the beam of light 100 is the parallel light, and a wrong value is obtained.

Hence, it is difficult to simultaneously detect the parallelism, in addition to the displacement and the angle change. In the detection of the parallelism, it is necessary that the displacement and the angle change of the beam of light 100 be adjusted to the center when the beam of light 100 is the parallel light. That is, the beam of light 100 is perpendicularly incident on the center of the diffraction element 2.

However, if means for controlling the displacement, the angle, and the parallelism is provided for the purpose of controlling the displacement, the angle, and the parallelism to a predetermined constant state, this configuration can achieve.

In the detection of the displacement, the angle change, and the parallelism of the beam of light 100, each detection value influences each other to a lesser degree, and the error component converges, as the beam of light 100 transmits through the center of the diffraction element 2, and the beam of light 100 is incident perpendicularly to the diffraction element 2. That is, when the beam of light 100 is controlled to transmit through the center area of the diffraction element 2 and be incident perpendicularly to the diffraction element 2, the error component of each detection value is small.

The detection of the displacement, the angle change, or the parallelism of the beam of light 100 is influenced by change of others. For example, the detection of the angle change is influenced by the quantity of the displacement.

Hence, for example, the direction of the angle change is determined in a state where the quantity of the displacement of the beam of light 1 relative to the diffraction element 2, which is determined on the basis of the each quantity of light received by the respective light receivers 31, 32, 33, 34, is controlled to a specific value or within a specific range. Here, the "specific value" is commensurate with the quantity of the displacement of the beam of light 1. Moreover, the "specific range" is commensurate with the quantity of the displacement of the beam of light 1.

<Generation of Displacement Signal and Angle Change Signal of Beam of Light 1>

As described below, the angle change can be detected simultaneously with the displacement.

Figure 17:
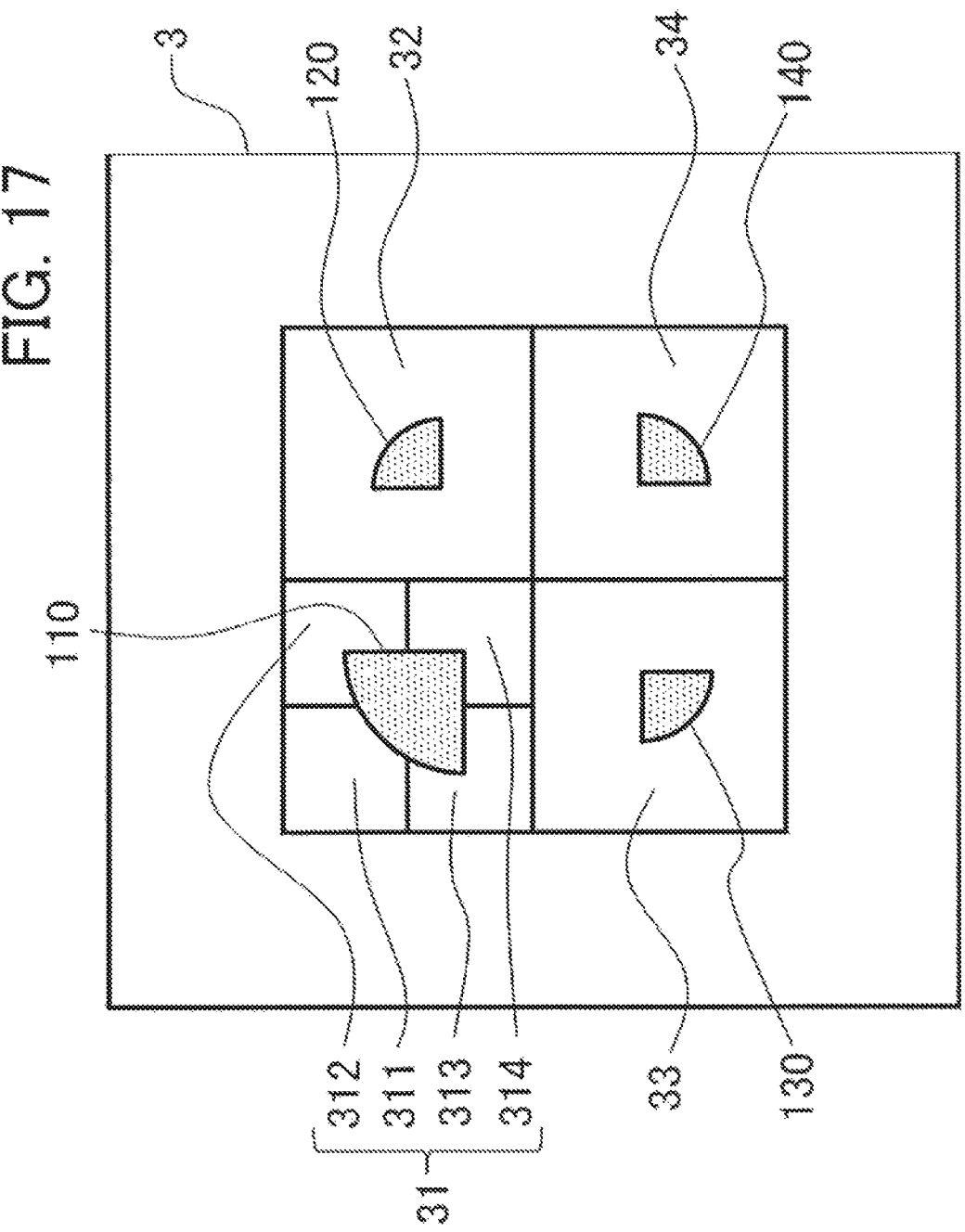
FIG. 17 is a schematic diagram illustrating a configuration of the light detection element 3 of the first embodiment.

FIG. 17 is a schematic diagram illustrating a configuration of the light detection element 3.

In this case, the sub-light receivers 341, 342, 343, 344 can be removed as illustrated in FIG. 17. The sub-light receivers 341, 342, 343, 344 are light receivers for use in detecting the parallelism. Note that the sub-light receivers 341, 342, 343, 344 are illustrated in FIG. 18 and FIG. 19.

Figure 18A:
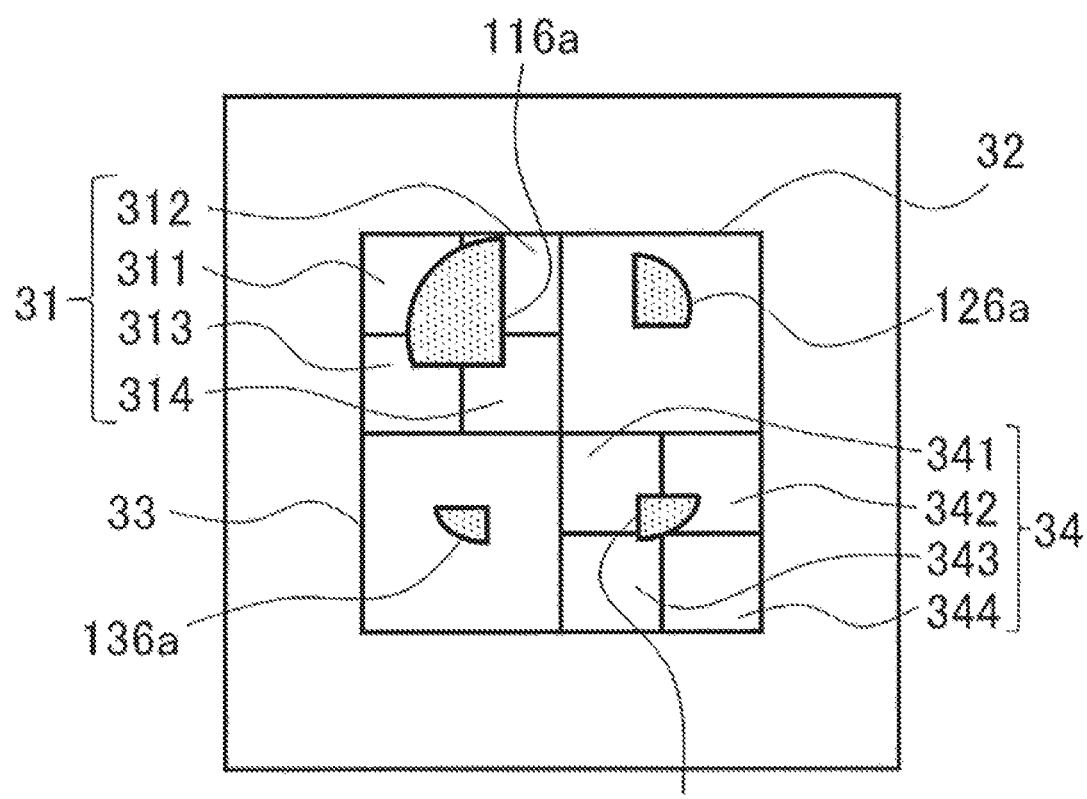
FIGS. 18A and 18B are diagrams schematically illustrating behavior of spots 11, 12, 13, 14 of diffracted light formed on the light detection element 3 in response to a displacement and an angle change of the beam of light 1 of the first embodiment.
Figure 18B:
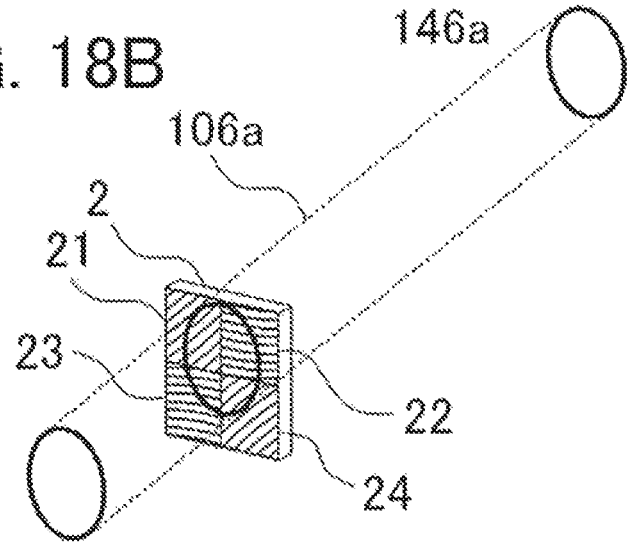
Figure 19A:
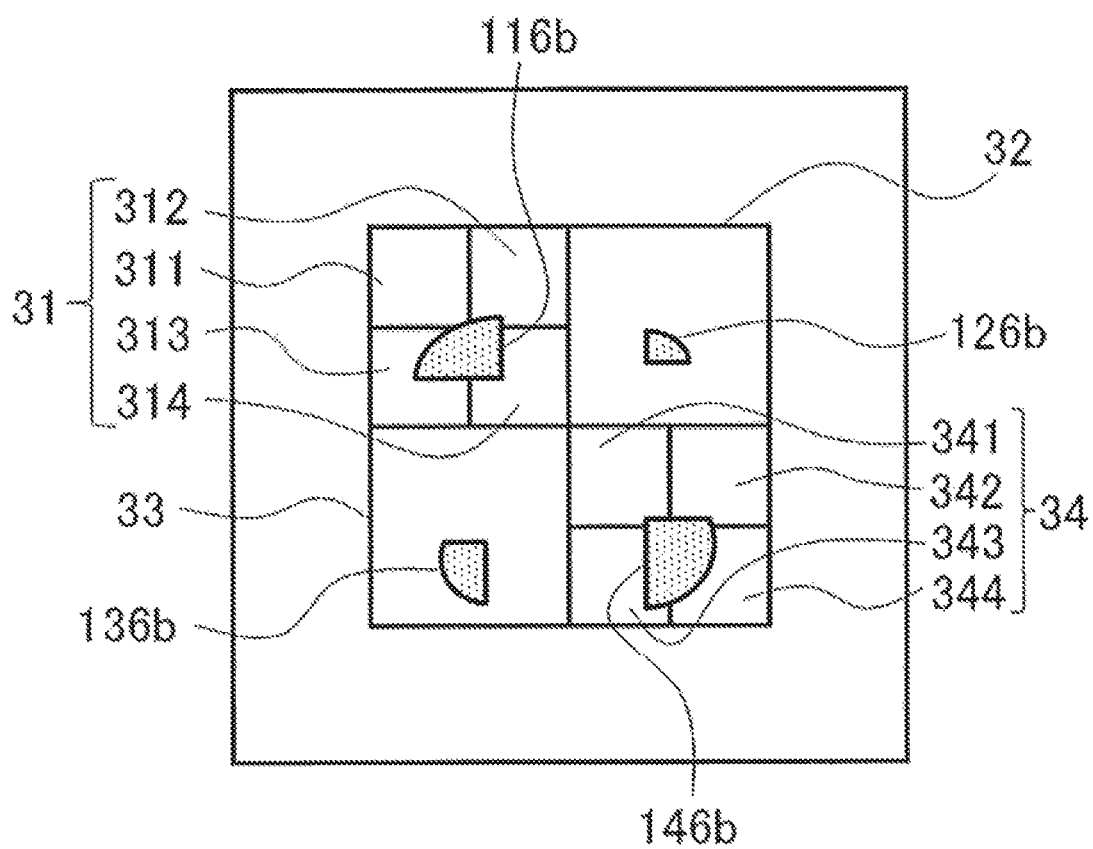
FIGS. 19A and 19B are diagrams schematically illustrating behavior of spots 11, 12, 13, 14 of diffracted light formed on the light detection element 3 in response to a displacement and an angle change of the beam of light 1 of the first embodiment.
Figure 19B:
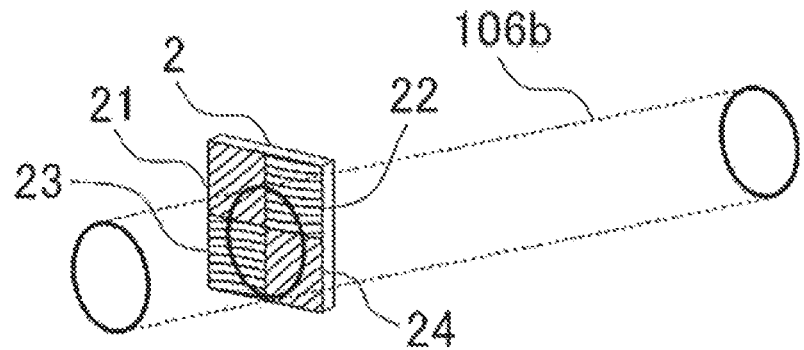

FIG. 18A and FIG. 19A are diagrams schematically illustrating the behavior of the spots 11, 12, 13, 14 of the diffracted light formed on the light detection element 3 in response to the displacement and the angle change of the beam of light 1. Moreover, FIG. 18B and FIG. 19B are perspective views of the beam of light 1 that transmits through the diffraction element 2.

Here, a case of the displacement in the vertical direction and the angle change in the vertical direction will be described as an example.

As described above, the displacement information of the beam of light 1 of the parallel light utilizes the fact that the displacement of the incident position of the beam of light 1 relative to the four diffraction areas 21, 22, 23, 24 on the diffraction element 2 appears on the light detection element 3.

FIG. 18A and FIG. 18B illustrate a case in which the incident position of the beam of light 1 is displaced in the upward direction from the center of the diffraction element 2, and the beam of light 1 transmits through the diffraction element 2 while being inclined in the upward direction. The beam of light 1 in this case is illustrated as a beam of light 106a in FIG. 18B. Moreover, the spots 11, 12, 13, 14 of the diffracted light illustrated in FIG. 3 are illustrated as spots 116a, 126a, 136a, 146a of the diffracted light in FIG. 18A.

Figure 29A:
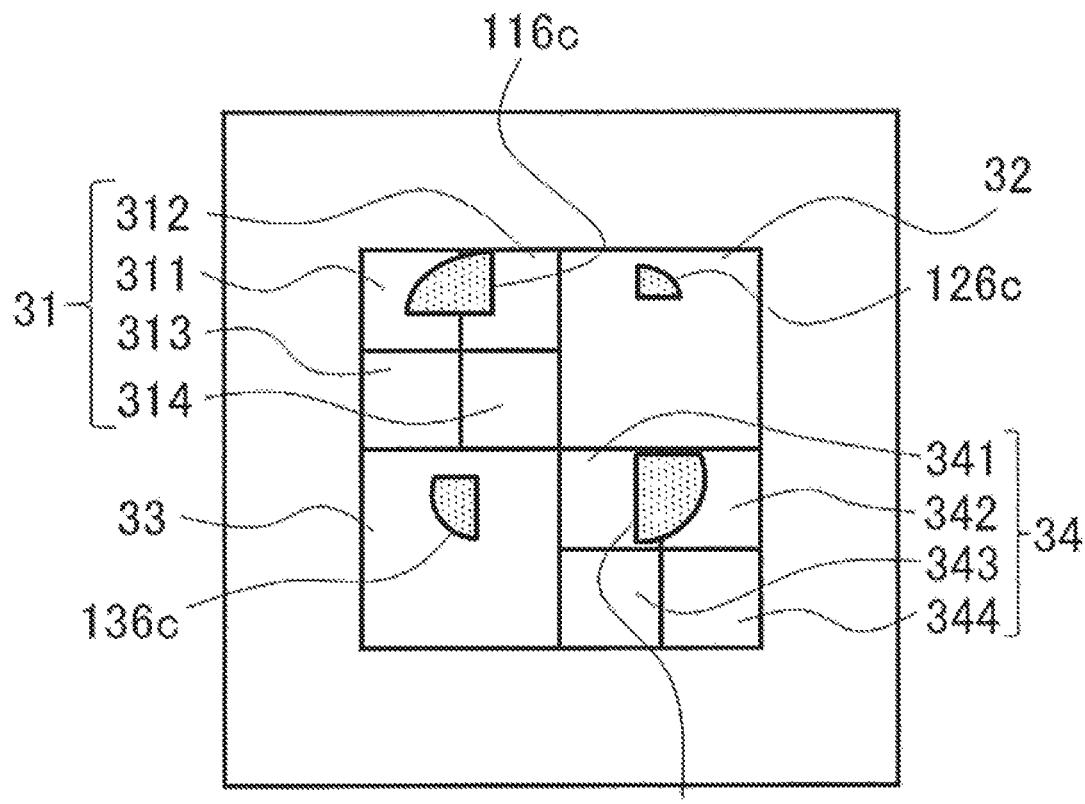
FIGS. 29A and 29B are diagrams schematically illustrating behavior of spots 11, 12, 13, 14 of diffracted light formed on the light detection element 3 in response to a displacement and an angle change of the beam of light 1 of the first embodiment.
Figure 29B:
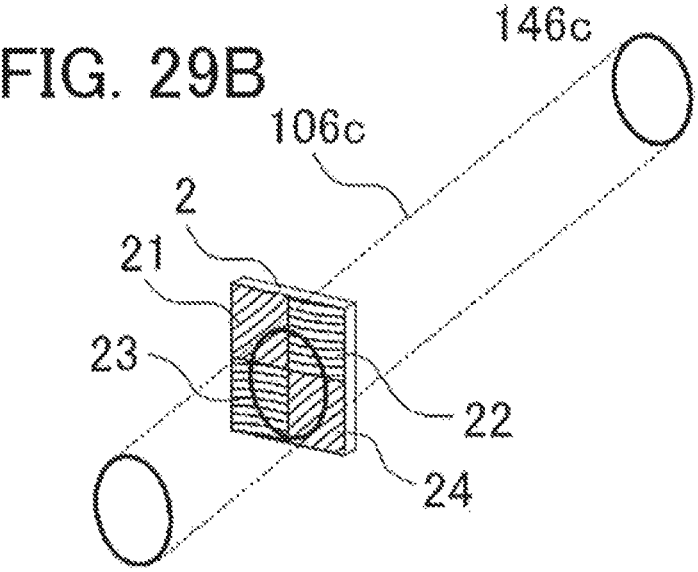

FIG. 29A and FIG. 29B illustrate a case in which the incident position of the beam of light 1 is displaced in the downward direction from the center of the diffraction element 2, and the beam of light 1 transmits through the diffraction element 2 while being inclined in the upward direction. The beam of light 1 in this case is illustrated as a beam of light 106c in FIG. 29B. Moreover, the spots 11, 12, 13, 14 of the diffracted light illustrated in FIG. 3 are illustrated as spots 116c, 126c, 136c, 146c of the diffracted light in FIG. 29A.

FIG. 19A and FIG. 19B illustrate a case in which the incident position of the beam of light 1 is displaced in the downward direction from the center of the diffraction element 2, and the beam of light 1 transmits through the diffraction element 2 while being inclined in the downward direction. The beam of light 1 in this case is illustrated as a beam of light 106b in FIG. 19B. Moreover, the spots 11, 12, 13, 14 of the diffracted light illustrated in FIG. 3 are illustrated as spots 116b, 126b, 136b, 146b of the diffracted light in FIG. 19A.

Figure 30A:
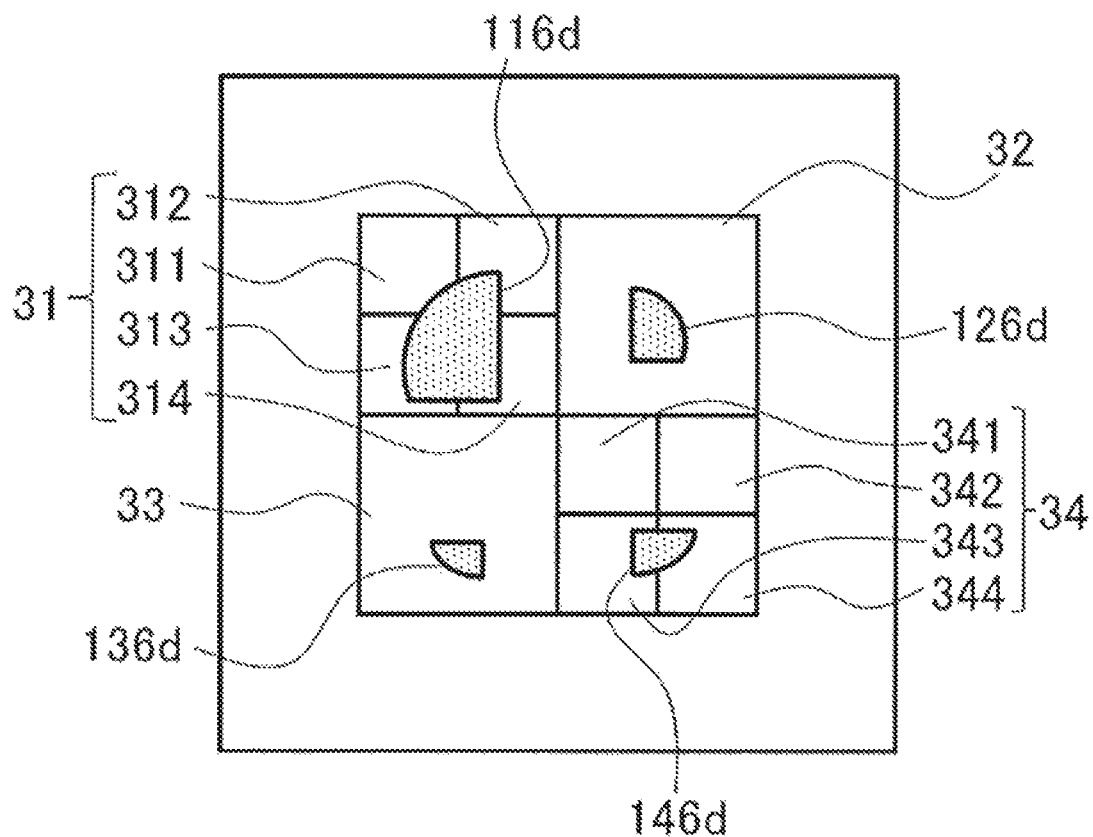
FIGS. 30A and 30B are diagrams schematically illustrating behavior of spots 11, 12, 13, 14 of diffracted light formed on the light detection element 3 in response to a displacement and an angle change of the beam of light 1 of the first embodiment.
Figure 30B:
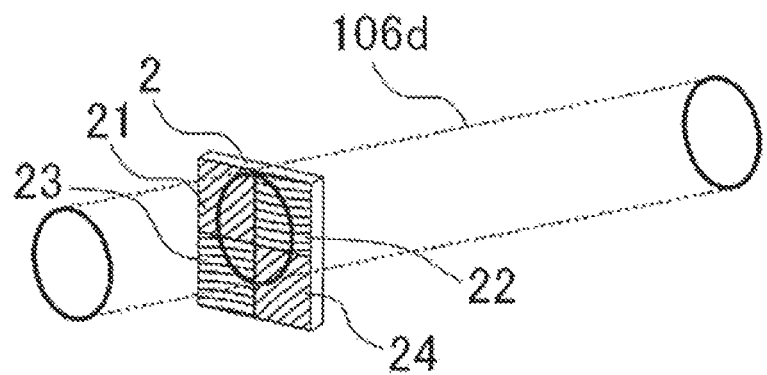

FIG. 30A and FIG. 30B illustrate a case in which the incident position of the beam of light 1 is displaced in the upward direction from the center of the diffraction element 2, and the beam of light 1 transmits through the diffraction element 2 while being inclined in the downward direction. The beam of light 1 in this case is illustrated as a beam of light 106d in FIG. 30B. Moreover, the spots 11, 12, 13, 14 of the diffracted light illustrated in FIG. 3 are illustrated as spots 116d, 126d, 136d, 146d of the diffracted light in FIG. 30A.

That is, FIG. 18A, FIG. 18B, FIG. 29A, and FIG. 29B illustrate cases in which the beam of light 1 is inclined in the upward direction and is displaced in the vertical direction of the diffraction element 2. Moreover, FIG. 19A, FIG. 19B, FIG. 30A, and FIG. 30B illustrate cases in which the beam of light 1 is inclined in the downward direction and is displaced in the vertical direction of the diffraction element 2.

FIG. 18A, FIG. 18B, FIG. 19A, FIG. 19B, FIG. 29A, FIG. 29B, FIG. 30A, and FIG. 30B illustrate complex cases including both of the change of the inclination of the beam of light 1 in the vertical direction and the displacement of the beam of light 1 in the vertical direction relative to the diffraction element 2.

The cases in which the beam of light 1 is displaced in the vertical direction will be described individually.

First, the case in which the beam of light 106a transmits through an upper side than the center of the diffraction element 2 while being inclined in the upward direction, as illustrated in FIG. 18A and FIG. 18B will be described.

In this case, the spots 116a, 126a of the diffracted light have upwardly elongated shapes in the vertical direction, as compared with the spots 110, 120 of the diffracted light having no displacement. That is, the spots 116a, 126a of the diffracted light have the upwardly elongated shapes of the upper parts of the spots 110, 120 of the diffracted light. The spots 116a, 126a of the diffracted light have shapes obtained by moving the entire spots 111a, 121a of the diffracted light illustrated in FIG. 5A in the upward direction.

On the other hand, the spots 136a, 146a of the diffracted light have upwardly shortened shapes in the vertical direction, as compared with the spots 130, 140 of the diffraction light beam having no displacement. That is, the spots 136a, 146a of the diffracted light have the upwardly shortened shapes of the lower parts of the spots 130, 140 of the diffracted light. The spots 136a, 146a of the diffracted light have shapes obtained by moving the entire spots 131a, 141a of the diffracted light illustrated in FIG. 5A in the upward direction.

The spots 116a, 126a, 136a, 146a of the diffracted light have shapes similar to the spots 111a, 121a, 131a, 141a of the diffracted light of the beam of light 101a illustrated in FIG. 5A, respectively. The beam of light 101a is displaced in the upward direction without inclination.

The quantity of light incident on the diffraction area 21 of the diffraction element 2 is larger than the case of the beam of light 100 having no displacement as illustrated in FIG. 4A and FIG. 4B. Hence, the quantity of light of the spot 116a of the diffracted light is larger than the quantity of light of the spot 110 of the diffracted light having no displacement. Thus, the quantity of light received by the entire light receiver 31 increases. Hence, the signal SA becomes large.

Similarly, the quantity of light incident on the diffraction area 22 of the diffraction element 2 is also larger than the case of the beam of light 100 having no displacement as illustrated in FIG. 4A and FIG. 4B. Hence, the quantity of light of the spot 126a of the diffracted light is larger than the quantity of light of the spot 120 of the diffracted light having no displacement. Thus, the quantity of light received by the light receiver 32 increases. Hence, the signal SB becomes large.

On the other hand, the quantity of light incident on the diffraction area 23 of the diffraction element 2 is smaller than the case of the beam of light 100 having no displacement as illustrated in FIG. 4A and FIG. 4B. Hence, the quantity of light of the spot 136a of the diffracted light is smaller than the quantity of light of the spot 130 of the diffracted light having no displacement. Thus, the quantity of light received by the light receiver 33 decreases. Hence, the signal SC becomes small.

Similarly, the quantity of light incident on the diffraction area 24 of the diffraction element 2 is also smaller than the case of the beam of light 100 having no displacement as illustrated in FIG. 4A and FIG. 4B. Hence, the quantity of light of the spot 146a of the diffracted light is smaller than the quantity of light of the spot 140 of the diffracted light having no displacement. Thus, the quantity of light received by the entire light receiver 34 decreases. Hence, the signal SD becomes small.

From the above, from equation (1), the displacement signal Sv in the vertical direction becomes large when the beam of light 100 of the parallel light is displaced in the upward direction. If the displacement signal Sv is zero when the beam of light 100 transmits through the center of the diffraction element 2, the value of the displacement signal Sv (of the beam of light 106a) is a positive value when the beam of light 100 is displaced in the upward direction.

Here, when the quantity of the displacement of the beam of light 106a is the same as the quantity of the displacement of the beam of light 101a, the spots 116a, 126a, 136a, 146a of the diffracted light have the same shapes as the spots 111a, 121a, 131a, 141a of the diffracted light. Hence, the signals SA, SB, SC, SD of the beam of light 106a are equal to the signals SA, SB, SC, SD of the beam of light 101a. Thus, the displacement signal Sv of the beam of light 106a has the same value as the displacement signal Sv of the beam of light 101a.

That is, the displacement signal Sv in the vertical direction indicated by equation (1) is not influenced by the displacement of the spot 116a of the diffracted light in the upward direction on the light detection element 3 because of the angle change. Thus, the displacement signal Sv in the vertical direction can be calculated, not depending on the angle change. Note that a premise is that the spots 116a, 126a, 136a, 146a of the diffracted light are not displaced beyond the light receivers 31, 32, 33, 34 respectively.

Next, the case in which the beam of light 106c transmits through a lower side than the center of the diffraction element 2 while being inclined in the upward direction, as illustrated in FIG. 29A and FIG. 29B will be described.

In this case, the spots 116c, 126c of the diffracted light have downwardly shortened shapes in the vertical direction, as compared with the spots 110, 120 of the diffraction light beam having no displacement. That is, the spots 116c, 126c of the diffracted light have the downwardly shortened shapes of the upper parts of the spots 110, 120 of the diffracted light. The spots 116c, 126c of the diffracted light have shapes obtained by moving the entire spots 111b, 121b of the diffracted light illustrated in FIG. 6A in the upward direction.

On the other hand, the spots 136c, 146c of the diffracted light have downwardly elongated shapes in the vertical direction, as compared with the spots 130, 140 of the diffraction light beam having no displacement. That is, the spots 136c, 146c of the diffracted light have the downwardly elongated shapes of the lower parts of the spots 130, 140 of the diffracted light. The spots 136c, 146c of the diffracted light have shapes obtained by moving the entire spots 131b, 141b of the diffracted light illustrated in FIG. 6A in the upward direction.

The spots 116c, 126c, 136c, 146c of the diffracted light have shapes similar to the spots 111b, 121b, 131b, 141b of the diffracted light of the beam of light 101b illustrated in FIG. 6A, respectively. The beam of light 101b is displaced in the downward direction without inclination.

The quantity of light incident on the diffraction area 21 of the diffraction element 2 is smaller than the case of the beam of light 100 having no displacement as illustrated in FIG. 4A and FIG. 4B. Hence, the quantity of light of the spot 116c of the diffracted light is smaller than the quantity of light of the spot 110 of the diffracted light having no displacement. Thus, the quantity of light received by the entire light receiver 31 decreases. Hence, the signal SA becomes small.

Similarly, the quantity of light incident on the diffraction area 22 of the diffraction element 2 is smaller than the case of the beam of light 100 having no displacement as illustrated in FIG. 4A and FIG. 4B. Hence, the quantity of light of the spot 126c of the diffracted light is smaller than the quantity of light of the spot 120 of the diffracted light having no displacement. Thus, the quantity of light received by the light receiver 32 decreases. Hence, the signal SB becomes small.

On the other hand, the quantity of light incident on the diffraction area 23 of the diffraction element 2 is larger than the case of the beam of light 100 having no displacement as illustrated in FIG. 4A and FIG. 4B. Hence, the quantity of light of the spot 136c of the diffracted light is larger than the quantity of light of the spot 130 of the diffracted light having no displacement. Thus, the quantity of light received by the light receiver 33 increases. Hence, the signal SC becomes large.

Similarly, the quantity of light incident on the diffraction area 24 of the diffraction element 2 is larger than the case of the beam of light 100 having no displacement as illustrated in FIG. 4A and FIG. 4B. Hence, the quantity of light of the spot 146c of the diffracted light is larger than the quantity of light of the spot 140 of the diffracted light having no displacement. Thus, the quantity of light received by the entire light receiver 34 increases. Hence, the signal SD becomes large.

From the above, from equation (1), the displacement signal Sv in the vertical direction becomes small when the beam of light 100 of the parallel light is displaced in the downward direction. If the displacement signal Sv is zero when the beam of light 100 transmits through the center of the diffraction element 2, the value of the displacement signal Sv (of the beam of light 106c) is a negative value when the beam of light 100 is displaced in the downward direction.

Here, when the quantity of the displacement of the beam of light 106c is the same as the quantity of the displacement of the beam of light 101b, the spots 116c, 126c, 136c, 146c of the diffracted light have the same shapes as the spots 111b, 121b, 131b, 141b of the diffracted light. Hence, the signals SA, SB, SC, SD of the beam of light 106c are equal to the signals SA, SB, SC, SD of the beam of light 101b. Thus, the displacement signal Sv of the beam of light 106c has the same value as the displacement signal Sv of the beam of light 101b.

That is, the displacement signal Sv in the vertical direction indicated by equation (1) is not influenced by the displacement of the spot 116c of the diffracted light in the upward direction on the light detection element 3 because of the angle change. Thus, the displacement signal Sv in the vertical direction can be calculated, not depending on the angle change. Note that a premise is that the spots 116b, 126b, 136b, 146b of the diffracted light are not displaced beyond the light receivers 31, 32, 33, 34 respectively.

Next, the case in which the beam of light 106b transmits through a lower side of the diffraction element 2 than the center of the diffraction element 2 while being inclined in the downward direction, as illustrated in FIG. 19A and FIG. 19B will be described.

Next, the cases in which the beam of light 1 is inclined in the downward direction will be described.

Similarly to the generation of the above angle change signal, the position of the spot 116b of the diffracted light of the beam of light 1 incident on the diffraction area 21 of the diffraction element 2 moves to a lower side than the position of the spot 111b of the diffracted light that is displaced in the downward direction without inclination as illustrated in FIG. 6A and FIG. 6B. The moving amount of the spot 116b of the diffracted light from the spot 111b of the diffracted light depends on the incident angle dt formed when the beam of light 116b of the parallel light is incident on the diffraction element 2, as indicated by equation (6).

Hence, the quantity of light of the spot 116b of the diffracted light incident on the sub-light receivers 311, 312 is smaller than the quantity of light of the spot 111b of the diffracted light whose angle is not changed (no inclination). Thus, the signals $SA_1$, $SA_2$ become small.

On the other hand, the quantity of light of the spot 116b of the diffracted light incident on the sub-light receivers 313, 314 is larger than the quantity of light of the spot 111b of the diffracted light whose angle is not changed (no inclination). Hence, the signals $SA_3$, $SA_4$ become large.

Unlike the displacement signal Sv, the angle signal Ss is influenced by the displacement of the beam of light 1.

The angle signal Ss is calculated by equation (10), equation (10a), and equation (10b) illustrated below.

$$Ss=(SA_{1a}+SA_{2a})-(SA_3'+SA_4') \tag{10}$$

$$SA_3'=SA_{3a}+SA_{3b} \tag{10a}$$

$$SA_4'=SA_{4a}+SA_{4b} \tag{10b}$$

In equation (10), equation (10a), and equation (10b), the signals $SA_{1a}$, $SA_{2a}$, $SA_{3a}$, $SA_{4a}$ indicate amounts of changes of the signals $SA_1$, $SA_2$, $SA_3$, $SA_4$ owing to the angle change of the beam of light 106a of the parallel light, and the signals $SA_{3b}$, $SA_{4b}$ indicate amounts of changes of the signals $SA_3$, $SA_4$ owing to the displacement of the beam of light 106a.

Thus, an equation for calculating an angle signal Ss' indicating only information of the angle change in the vertical direction is below equation (11).

$$Ss'=(SA_{1a}+SA_{2a})-(SA_{3a}+SA_{4a}) \tag{11}$$

Here, the signal $SA_{3b}$ and the signal $SA_{4b}$ are calculated by below equation (12a) and equation (12b) respectively, by using the displacement signal Sv of the beam of light 106a in the vertical direction.

$$SA_{3b}=k_3 \times SV \tag{12a}$$

$$SA_{4b}=k_4 \times SV \tag{12b}$$

In equation (12a) and equation (12b), the coefficient $k_3$ and the coefficient $k_4$ are coefficients of the quantity of the received light relative to the displacement signal. The coefficient $k_3$ and the coefficient $k_4$ are fixed values set by designing the configuration of the detection device 9.

As described above, the displacement signal Sv in the vertical direction is calculated separately, not depending on the angle change.

Hence, below equation (13) is derived from equation (10), equation (10a), equation (10b), equation (11), equation (12a), and equation (12b). The angle signal Ss' indicates only the angle information in the vertical direction.

$$Ss'=Ss+(k_3+k_4) \times Sv \tag{13}$$

In equation (13), $(k_3+k_4)$ is a design value. Hence, the angle signal Ss' is calculated on the basis of the angle signal Ss in the vertical direction and the displacement signal Sv in the vertical direction.

Moreover, from equation (13), when the displacement signal Sv is known, the amount of the change of the angle signal Ss' is equal to the amount of the change of the angle signal Ss. Thus, if the angle signal Sv is zero when the beam of light 100 is not inclined, the value of the displacement signal Sv (of the beam of light 106b) obtained when the beam of light 100 is inclined in the upward direction is a positive value, under a condition that the displacement signal Sv is controlled to a specific value (or a specific range).

Next, the case in which the beam of light 106d transmits through an upper side than the center of the diffraction element 2 while being inclined in the downward direction, as illustrated in FIG. 30A and FIG. 30B will be described.

Similarly to the generation of the above angle change signal, the position of the spot 116d moves to a lower side than the position of the spot 111a illustrated in FIG. 5A. The spot 116d is the diffracted light of the beam of light 1 incident on the diffraction area 21 of the diffraction element 2. The spot 111a is a spot of the diffracted light that is displaced in the upward direction without inclination. The moving amount of the spot 116d of the diffracted light from the spot 111a of the diffracted light depends on the incident angle dt formed when the beam of light 116d of the parallel light is incident on the diffraction element 2, as indicated by equation (6).

Hence, the quantity of light of the spot 116d of the diffracted light incident on the sub-light receivers 311, 312 is smaller than the quantity of light of the spot 111a of the diffracted light having no inclination. Hence, the signals $SA_1$, $SA_2$ become small.

On the other hand, the quantity of light of the spot 116b of the diffracted light incident on the sub-light receivers 313, 314 is larger than the quantity of light of the spot 111a of the diffracted light having no inclination. Hence, the signals $SA_3$, $SA_4$ become large.

The angle signal Ss' is obtained from equation (13), similarly to the case of the beam of light 106b that transmits through the diffraction grating 2 while being inclined in the upward direction. The angle signal Ss' is angle information in the vertical direction.

Moreover, from equation (13), when the displacement signal Sv is known, the amount of the change of the angle signal Ss' is equal to the amount of the change of the angle signal Ss. Thus, if the angle signal Sv is zero when the beam of light 100 is not inclined, the value of the displacement signal Sv (of the beam of light 106d) obtained when the beam of light 100 is inclined in the downward direction is a negative value, under a condition that the displacement signal Sv is controlled to a specific value (or a specific range).

As described above, the displacement information and the angle information can be acquired simultaneously.

Moreover, the angle signal Sp in the horizontal direction is calculated by equation (14), equation (14a), and equation (14b) illustrated below.

$$Sp=(SA_{1a}+SA_{3a})-(SA_2'+SA_4') \qquad (14)$$

$$SA_2'=SA_{2a}+SA_{2c} \qquad (14a)$$

$$SA_4'=SA_{4a}+SA_{4c} \qquad (14b)$$

In equation (14), equation (14a), and equation (14b), the signals $SA_{1a}$, $SA_{2a}$, $SA_{3a}$, $SA_{4a}$ indicate the amounts of changes of the signals $SA_1$, $SA_2$, $SA_3$, $SA_4$ owing to the displacement of the angle change of the beam of light 106a of the parallel light. Moreover, the signals $SA_{2c}$, $SA_{4c}$ indicate the amounts of changes of the signals $SA_2$, $SA_4$ owing to the displacement of the beam of light 106a.

Thus, an equation for calculating an angle signal Sp' indicating only information of the angle change in the horizontal direction is below equation (15).

$$Sp'=(SA_{1a}+SA_{3a})-(SA_{2a}+SA_{4a}) \qquad (15)$$

Here, if the displacement signal Sh of the beam of light 106a in the horizontal direction is used, the signal $SA_{2c}$ and the signal $SA_{4c}$ are calculated by below equation (16a) and equation (16b), respectively.

$$SA_{2c}=k_2 \times Sh \qquad (16a)$$

$$SA_{4c}=k_4' \times Sh \qquad (16b)$$

In equation (16a) and equation (16b), the coefficient $k_2$ and the coefficient $k_4'$ are coefficients of the received quantity of light relative to the displacement signal. The coefficient $k_2$ and the coefficient $k_4'$ are fixed values set by designing the configuration of the detection device 9.

As described above, the displacement signal Sh in the horizontal direction is calculated separately, not depending on the angle change.

Hence, below equation (17) is derived from equation (14), equation (14a), equation (14b), equation (15), equation (16a), and equation (16b). The angle signal Sp' indicates only angle information in the horizontal direction.

$$Sp'=Sp+(k_2+k_4') \times Sh \qquad (17)$$

In equation (17), $(k_2+k_4')$ is a design value. Hence, the angle signal Sp' is calculated on the basis of the angle signal Sp in the horizontal direction and the displacement signal Sh in the horizontal direction.

According to the above-described method for detecting the displacement and the angle change and the detection device 9 that uses the detection method, the displacement information and the angle change information of the beam of light 1 relative to the diffraction element 2 can be acquired simultaneously.

Moreover, unlike the CCD, the four light receivers 31, 32, 33, 34 receive light to process the signals for example, and thereby the computation time or the transfer time can be made faster.

Moreover, unlike the PSD, the sizes of the light receivers 31, 32, 33, 34 can be made smaller, and thereby the processing time for converting the light to the signals can be made faster.

Moreover, in the above description, the light receiver 31 detects the angle. However, this is not a limitation, but the same effect is obtained by dividing other light receivers 32, 33, 34 into sub-light receivers to detect the angle, for example.

In the above description, the light receiver 34 detects the parallelism. However, this is not a limitation, but the same effect is obtained by dividing other light receivers 31, 32, 33 into sub-light receivers to detect the parallelism, for example.

In the above description, the diffraction element 2 has the focusing function, in addition to the diffraction function. Hence, the diffraction element 2 has a non-linear diffraction grating pattern.

Figure 20:
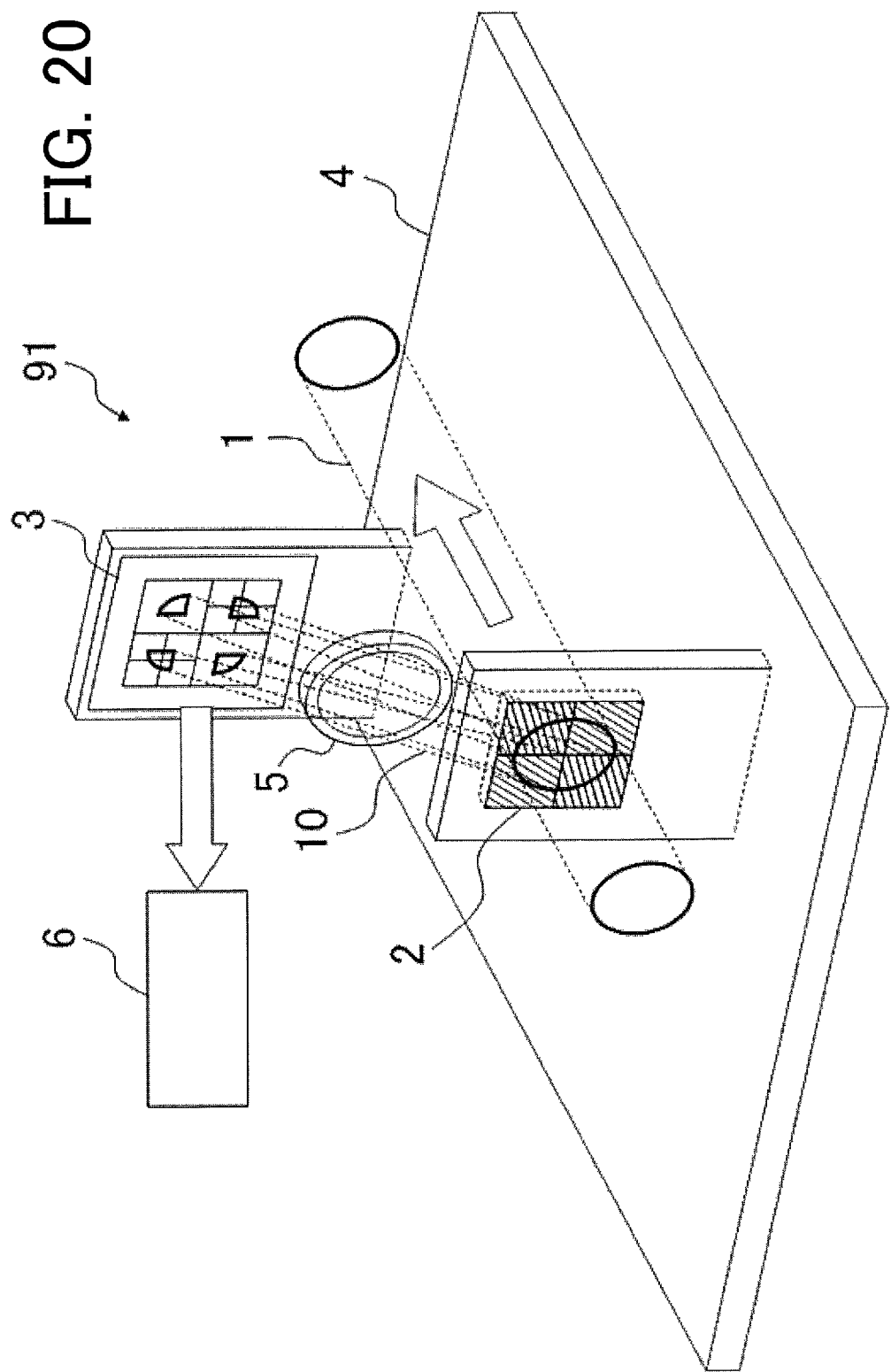
FIG. 20 is a configuration diagram illustrating a configuration of a detection device 91 of the first embodiment.

However, as illustrated in FIG. 20, the same effect is obtained by focusing the diffracted light by a condensing lens 5. In FIG. 20, the condensing lens 5 is located between the diffraction element 2 and the light detection element 3. The condensing lens 5 focuses the +1st order diffracted light 10.

The detection device 91 includes the condensing element 5 that focuses the diffracted light 10 emerged from the diffraction element 2. The diffracted light 10 is focused by the condensing element 5 and reaches the light detection element 3.

Figure 21:
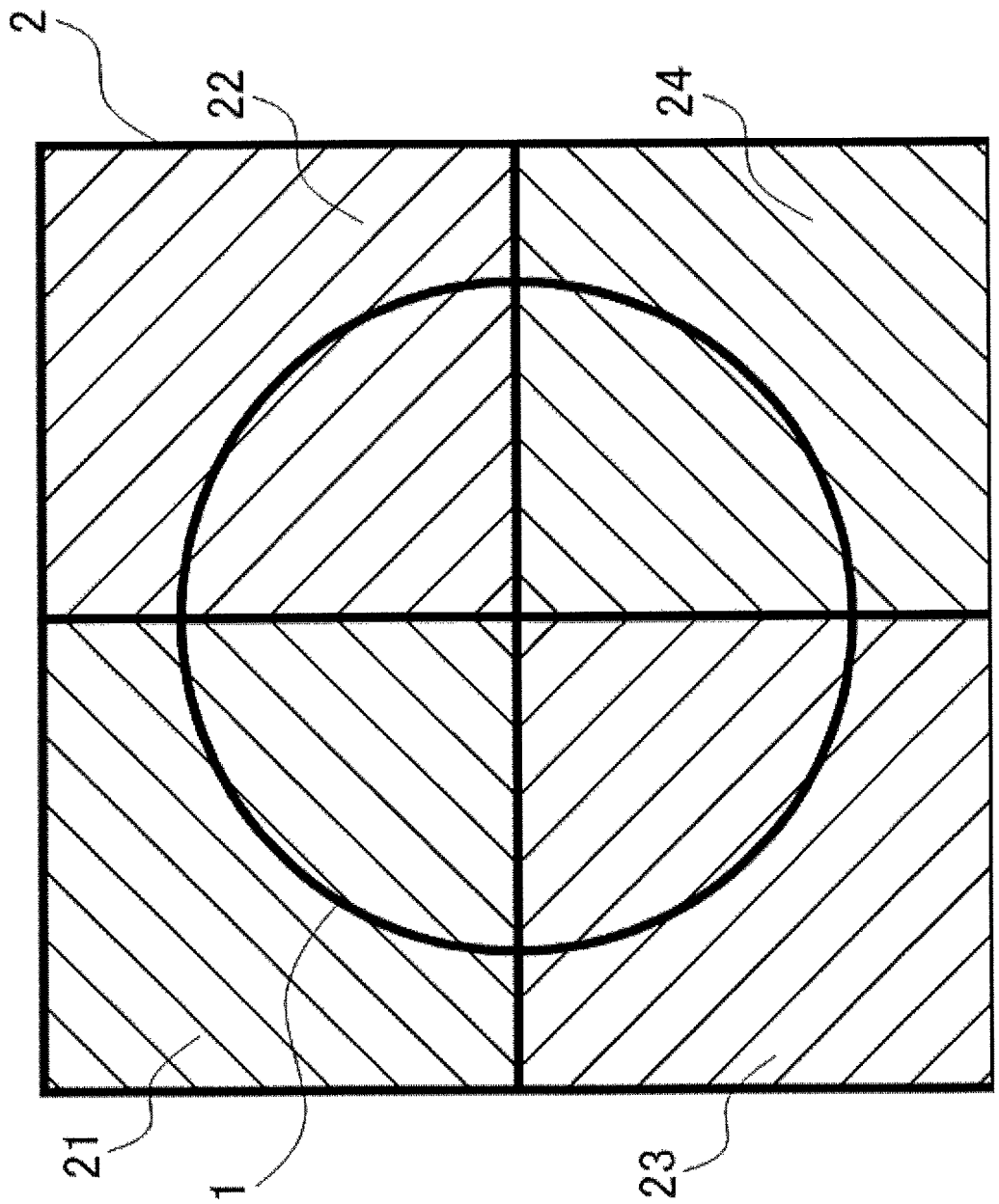
FIG. 21 is a schematic diagram illustrating the diffraction element 2 of the first embodiment.

In this case, as illustrated in FIG. 21, the diffraction element 2 has a simple diffraction grating pattern of straight lines. In FIG. 21, the diffraction grating patterns of the diffraction areas 21, 24 are perpendicular to a line segment that links the center of the diffraction area 21 and the center of the diffraction area 24. Moreover, the diffraction grating patterns of the diffraction areas 22, 23 are perpendicular to a line segment that links the center of the diffraction area 22 and the center of the diffraction area 23. Thus, production of the diffraction element 2 is easy.

FIG. 20 is a configuration diagram illustrating a configuration of the detection device 91. FIG. 21 is a schematic diagram illustrating the diffraction element 2.

Moreover, in the above description, the diffraction areas 21, 22, 23, 24 of the diffraction element 2 have a non-linear diffraction grating pattern. Thus, the diffraction element 2 has the lens effect by this non-linear diffraction grating pattern. However, the diffraction areas 22, 23, 24 can obtain the same effect without the lens effect.

However, the spots 12, 13, 14 of the diffracted light on the light receiver 31 becomes larger, and the measurement range becomes narrower, than the case having the lens effect. Hence, it is desirable to focus the diffracted light. The same applies to the diffraction area 21.

Note that the diffraction element 2 having the focusing function and the condensing lens 5 can be used in combination.

Figure 22:
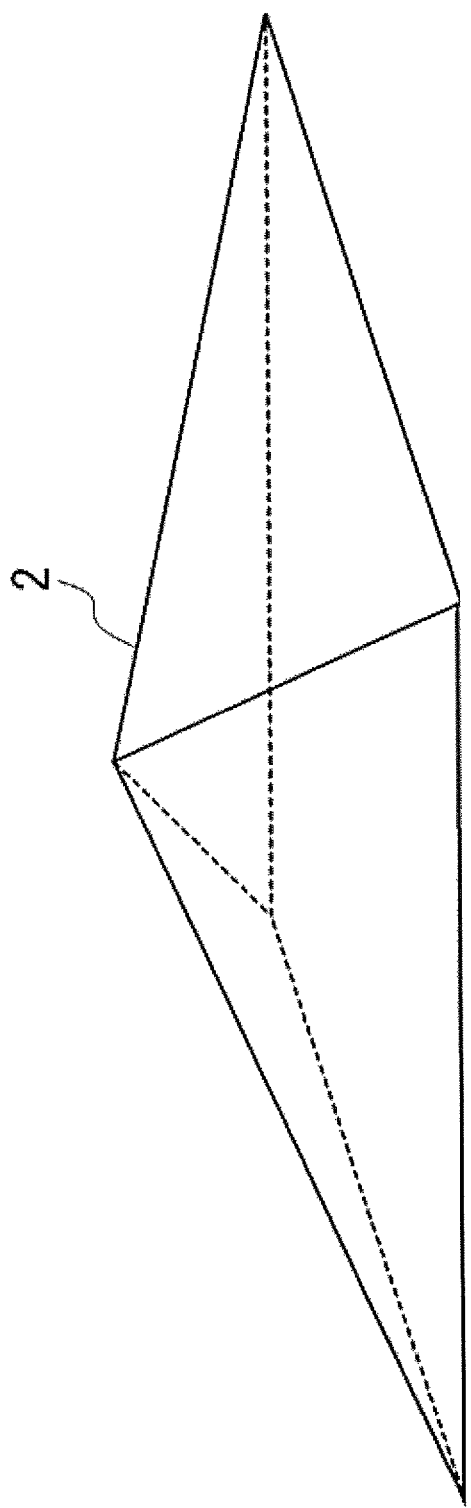
FIG. 22 is a perspective view illustrating a form of the diffraction element 2 of the first embodiment.

Moreover, the diffraction element 2 includes the diffraction grating. However, the diffraction element 2 is not limited to this form, but may be a square pyramid prism as illustrated in FIG. 22, for example. However, it is impossible to generate non-diffracted light simultaneously, and thus it is necessary to additionally generate a dedicated beam of light for detecting a displacement and an angle change.

FIG. 22 is a perspective view illustrating a form of the diffraction element 2. The diffraction element 2 illustrated in FIG. 22 has a square pyramid shape. The square pyramid consists of a quadrangular bottom face and four triangular side faces. The square pyramid is located such that the center position of the optical axis of the beam of light 1 transmits through a vertex of the square pyramid. The square pyramid is located such that a vicinity of the center position of the optical axis of the beam of light 1 transmits through the vertex of the square pyramid. The beam of light 1 incident on the four side faces of the square pyramid is diffracted by a prism effect, in accordance with the incident angle relative to each side face. However, all the beam of light 1 is diffracted, and is unable to generate non-diffracted light simultaneously. Hence, there is a need for means for dividing the beam of light 1 into two before the beam of light 1 is incident on the diffraction element 2. For example, this is achieved by using a half mirror.

Figure 23:
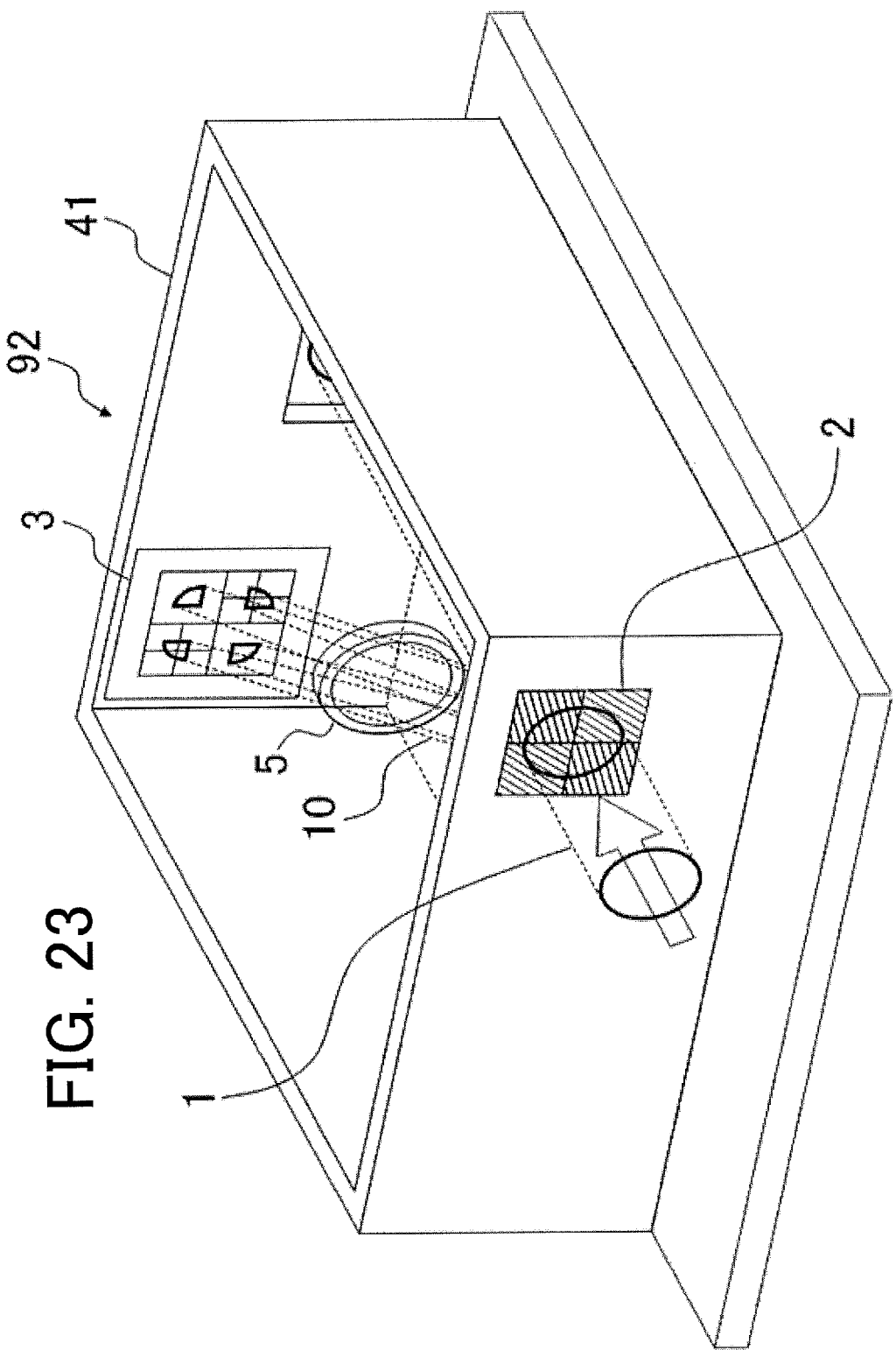
FIG. 23 is a configuration diagram illustrating a configuration of a detection device 92 of the first embodiment.

FIG. 23 is a configuration diagram illustrating a configuration of a detection device 92.

In FIG. 1 or FIG. 20, the diffraction element 2 and the light detection element 3 are held by different plate-shaped parts that protrude from the plate-shaped housing 4, for example. In this case, it is difficult to stably maintain the positional relationship between the diffraction element 2 and the light detection element 3.

On the other hand, the housing 41 illustrated in FIG. 23 has a box shape. Then, the diffraction element 2 and the light detection element 3 are fixed on the side surfaces of the housing 41.

The housing 41 has rigidity, and thereby the diffraction element 2 and the light detection element 3 can maintain a stable positional relationship.

Moreover, the housings 4, 41 are fixed on a lidar device, an optical communication device, or the like. Thereby, the information of the displacement and the information of the angle change of the beam of light 1, relative to the lidar device, the optical communication device, or the like, can be acquired.

Although the upper surface of the housing 41 is an opening, six directions may be completely closed if an opening through which the beam of light 1 passes is provided.

Moreover, the installation sites of the detection devices 9, 91, 92 are inside the housing of the lidar device, the optical communication device, or the like. However, if the site can receive the beam of light 1, the installation may be outside the housing.

However, attention must be paid to the relative displacement or angle change between the housing of the lidar device, the optical communication device, or the like and the housing 4 of the detection devices 9, 91, 92. In order to detect highly accurate displacement or angle change of the beam of light 1, the detection devices 9, 91, 92 are needed to be attached to the housing of the lidar device, the optical communication device, or the like, with rigidity.

<Lidar Device>

Figure 24:
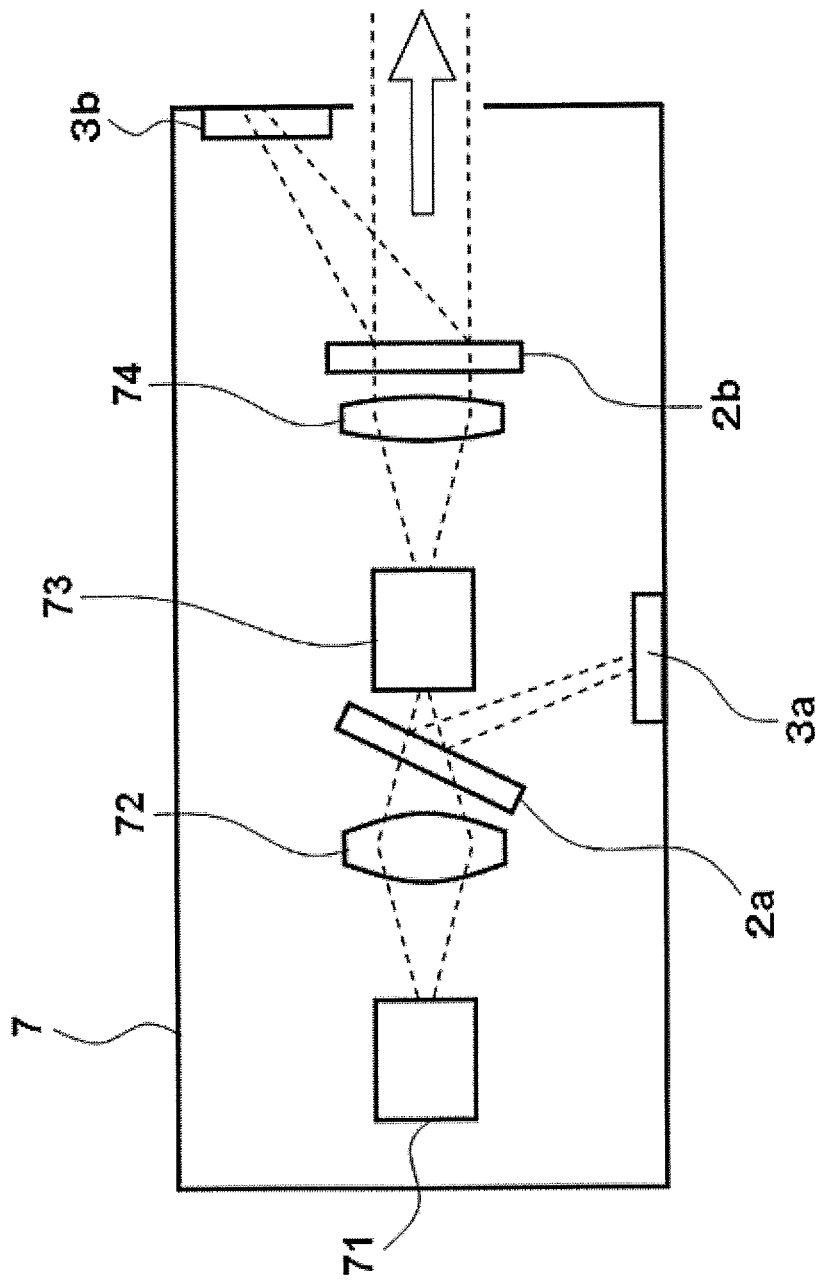
FIG. 24 is a configuration diagram illustrating a configuration of a lidar device 7.

FIG. 24 is a configuration diagram illustrating a configuration of a lidar device 7.

The lidar device 7 includes diffraction elements 2a, 2b, light detection elements 3a, 3b, a light source 71, a condensing lens 72, a light amplification element 73, and a collimator lens 74.

The light emitted from the light source 71 is incident on the condensing lens 72. The light incident on the condensing lens 72 is focused by the condensing lens 72. The light focused by the condensing lens 72 is incident on the light amplification element 73. The focused light incident on the light amplification element 73 is the light that is not diffracted by the diffraction element 2a.

The diffraction element 2a is located between the condensing lens 72 and the light amplification element 73. In FIG. 24, the diffraction element 2a is located and inclined with respect to the optical axis of the condensing lens 72. The light diffracted by the diffraction element 2a proceeds in a direction deviated from the optical axis of the condensing lens 72. That is, the light diffracted by the diffraction element 2a proceeds in a direction diverted from the optical axis of the condensing lens 72. The diffracted light deviated from the optical axis of the condensing lens 72 reaches the light detection element 3a. The diffracted light diverted from the optical axis of the condensing lens 72 reaches the light detection element 3a.

The light intensity of the focused light incident on the light amplification element 73 is amplified by the light amplification element 73. The light amplified by the light amplification element 73 is parallelized by the collimator lens 74. That is, the light amplified by the light amplification element 73 becomes parallel light by the collimator lens 74.

The light (parallel light) parallelized by the collimator lens 74 reaches the diffraction grating 2b. The light diffracted by the diffraction grating 2b reaches the light detection element 3b. Moreover, the light that is not diffracted by the diffraction grating 2b is emitted from the lidar device 7 to the outside.

The light emitted from the lidar device 7 to the outside hits dusts or the like in the air and scatters, for example. The lidar device 7 can determine the shape, the size, or the like. of the dusts or the like in the air, by receiving the scattering light.

In the lidar device 7, the position of the light incident on the light amplification element 73 and the position of the light emitted from the lidar device 7 are important. Hence, the position of the light incident on the light amplification element 73 is detected by means of the diffraction element 2a and the light detection element 3a. In addition, the position of the light emitted from the lidar device 7 is detected by means of the diffraction element 2b and the light detection element 3b.

The position of the light incident on the light amplification element 73 is adjusted by moving the condensing lens 72 in the optical axis direction or on a plane perpendicular to the optical axis, on the basis of these detection results, for example. Moreover, the position of the light emitted from the lidar device 7 is adjusted by moving the collimator lens 74 in the optical axis direction or on a plane perpendicular to the optical axis, for example.

\<Optical Communication Device\>

Figure 25:
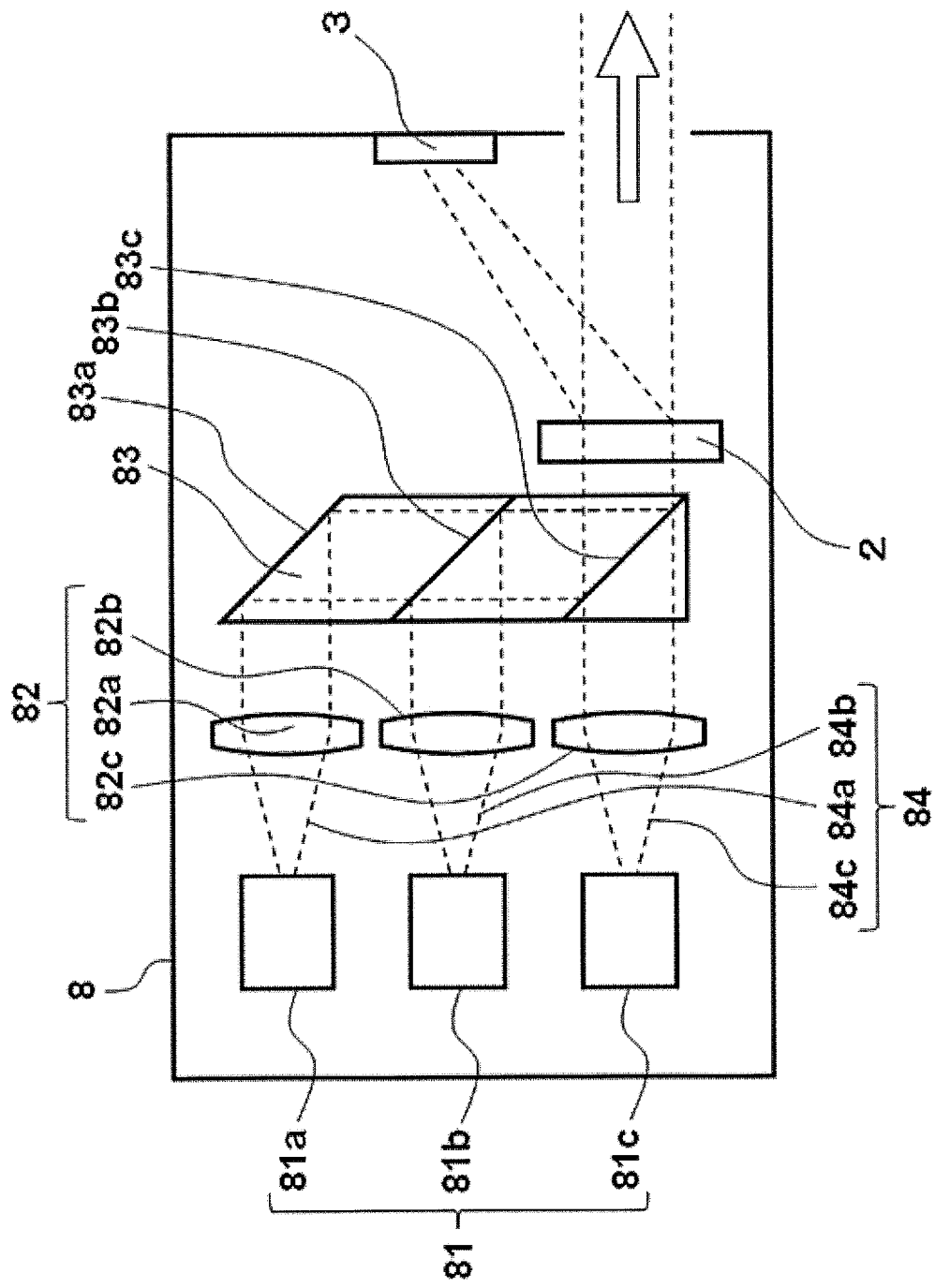
FIG. 25 is a configuration diagram illustrating a configuration of an optical communication device 8.

FIG. 25 is a configuration diagram illustrating a configuration of an optical communication device 8.

The optical communication device 8 includes a diffraction element 2, a light detection element 3, light sources 81, collimator lenses 82, and a prism 83.

The optical communication device 8 illustrated in FIG. 25 includes three light sources 81a, 81b, 81c, for example. In addition, the optical communication device 8 illustrated in FIG. 25 includes three collimator lenses 82a, 82b, 82c, for example. In addition, the prism 83 of the optical communication device 8 illustrated in FIG. 25 includes three faces 83a, 83b, 83c.

The light beam 84a emitted from the light source 81a reaches the collimator lens 82a. The light beam 84a that has reached the collimator lens 82a is parallelized by the collimator lens 82a. That is, the light beam 84a that has reached the collimator lens 82a becomes parallel light by the collimator lens 82a. The light beam 84a (parallel light) parallelized by the collimator lens 82a is incident on the prism 83 and is reflected by the face 83a.

The light beam 84b emitted from the light source 81b reaches the collimator lens 82b. The light beam 84b that has reached the collimator lens 82b is parallelized by the collimator lens 82b. That is, the light beam 84b that has reached the collimator lens 82b becomes parallel light by the collimator lens 82b. The light beam 84b (parallel light) parallelized by the collimator lens 82b is incident on the prism 83 and is reflected by the face 83b.

The light beam 84c emitted from the light source 81c reaches the collimator lens 82c. The light beam 84c that has reached the collimator lens 82c is parallelized by the collimator lens 82c. That is, the light beam 84c that has reached the collimator lens 82c becomes parallel light by the collimator lens 82c. The light beam 84c (parallel light) parallelized by the collimator lens 82c is incident on the prism 83 and transmits through the face 83c.

The light beam 84a reflected by the face 83a transmits through the face 83b and is superimposed on the light beam 84b reflected by the face 83b. The light beam 84a reflected by the face 83a transmits through the face 83b. Then, the light beam 84a that has transmitted through the face 83b is combined with the light beam 84b reflected by the face 83b. The superimposed light beam 84a and light beam 84b are reflected by the face 83c. The light beam 84c that has transmitted through the face 83c is superimposed on the light beam 84a and the light beam 84b reflected by the face 83c. The light beam 84c that has transmitted through the face 83c is combined with the light beam 84a and the light beam 84b reflected by the face 83c.

The superimposed light beams 84a, 84b, 84c reach the diffraction grating 2. The light diffracted by the diffraction grating 2 reaches the light detection element 3. Moreover, the light that is not diffracted by the diffraction grating 2 is emitted from the optical communication device 8 to the outside.

In the optical communication device 8, the position of the light emitted from the optical communication device 8 is important. Hence, the position of the light emitted from the optical communication device 8 is detected by means of the diffraction element 2 and the light detection element 3.

For example, each of the collimator lenses 82a, 82b, 82c is moved in the optical axis direction or on a plane perpendicular to the optical axis, on the basis of these detection results. Then, the position of the light emitted from the optical communication device 8 is adjusted. These adjustments are performed by lighting up each of the light sources 81a, 81b, 81c individually.

The optical communication device 8 can perform communication by including information in the light beams 84a, 84b, 84c.

The diffraction element 2 and the light detection element 3 can be located outside the optical communication device 8. However, locating the diffraction element 2 and the light detection element 3 inside the optical communication device 8 facilitates detection of aging, and correction of the aging, of the components 81, 82, 83 of the optical communication device 8.

Variant Example

Next, a variant example according to the first embodiment will be described.

Figure 26:
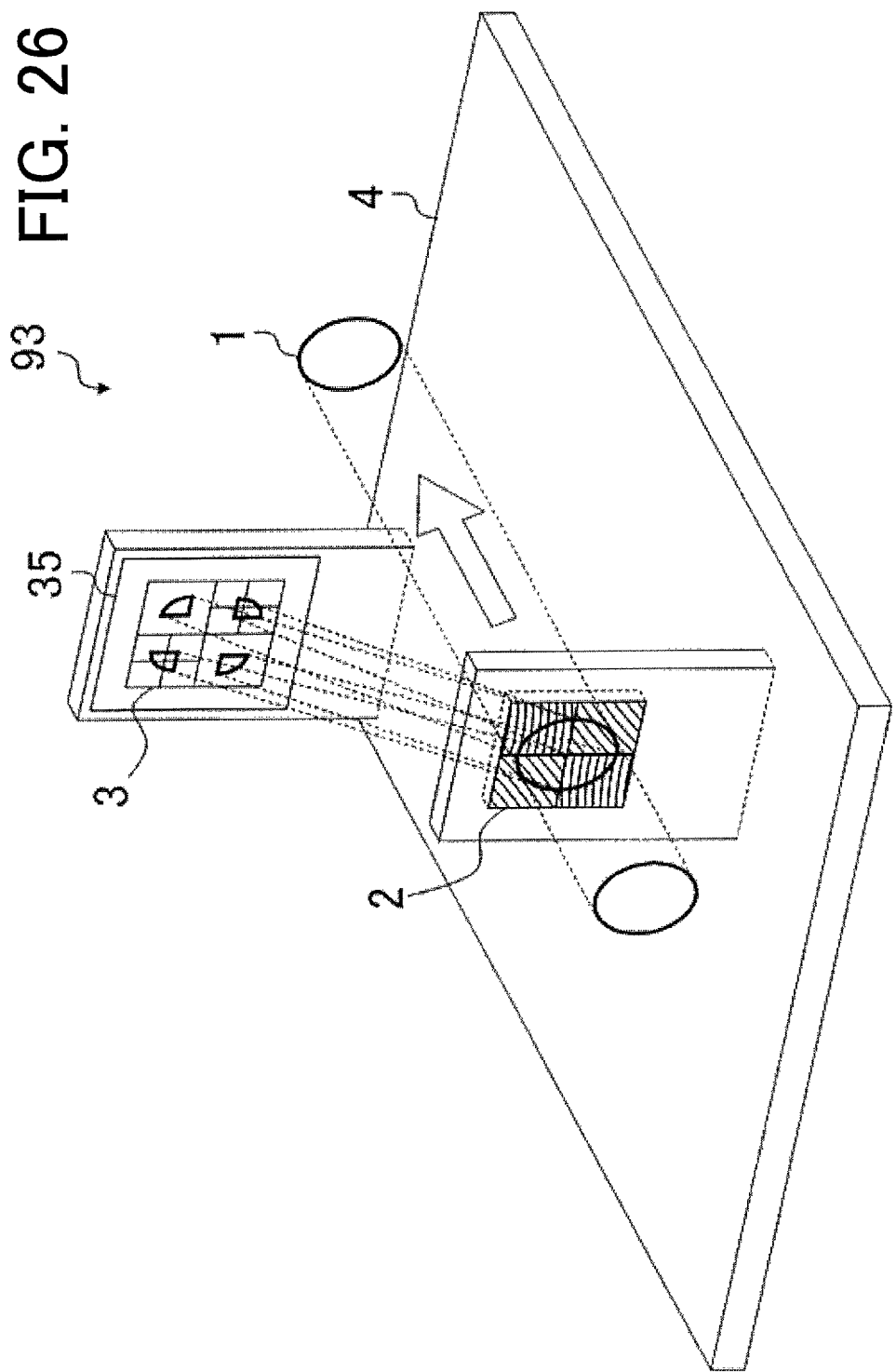
FIG. 26 is a diagram schematically illustrating a detection device 93 of a variant example for detecting a displacement and an angle change.

FIG. 26 is a diagram schematically illustrating a detection device 93 for detecting a displacement and an angle change, which is illustrated as a variant example. The detection device 93 for detecting the displacement and the angle change has a configuration of the detection device 9 illustrated in FIG. 1 excluding the light detection element 3 and the signal processing circuit 6. Other elements of the detection device 93 are the same as the elements of the detection device 9. The same components as the detection device 9 are the diffraction element 2 and the housing 4.

In the variant example, a configuration of a light detection integrated circuit 35, which is added in place of the light detection element 3 and the signal processing circuit 6 of FIG. 1, will be described.

The light detection integrated circuit 35 includes the light detection element 3. The configuration of the light detection element 3 of the light detection integrated circuit 35 is the same as FIG. 3, for example. Moreover, the light detection element 3 of the light detection integrated circuit 35 has the same function as the function described in FIG. 3. Moreover, the light detection element 3 of the light detection integrated circuit 35 is located at the same position as the light detection element 3 of the detection device 9 illustrated in FIG. 1.

That is, the detection device 93 is the same as the detection device 9, in diffracting the light by the diffraction element 2, in receiving the diffracted light by the light detection element 3 of the light detection integrated circuit 35, and in outputting the signals SA, SB, SC, SD by the light detection element 3.

Hence, in the following, processing of the signals $SA_1$, $SA_2$, $SA_3$, $SA_4$, SB, SC, SD of the light detection element 3 of the light detection integrated circuit 35 will be described.

Figure 27:
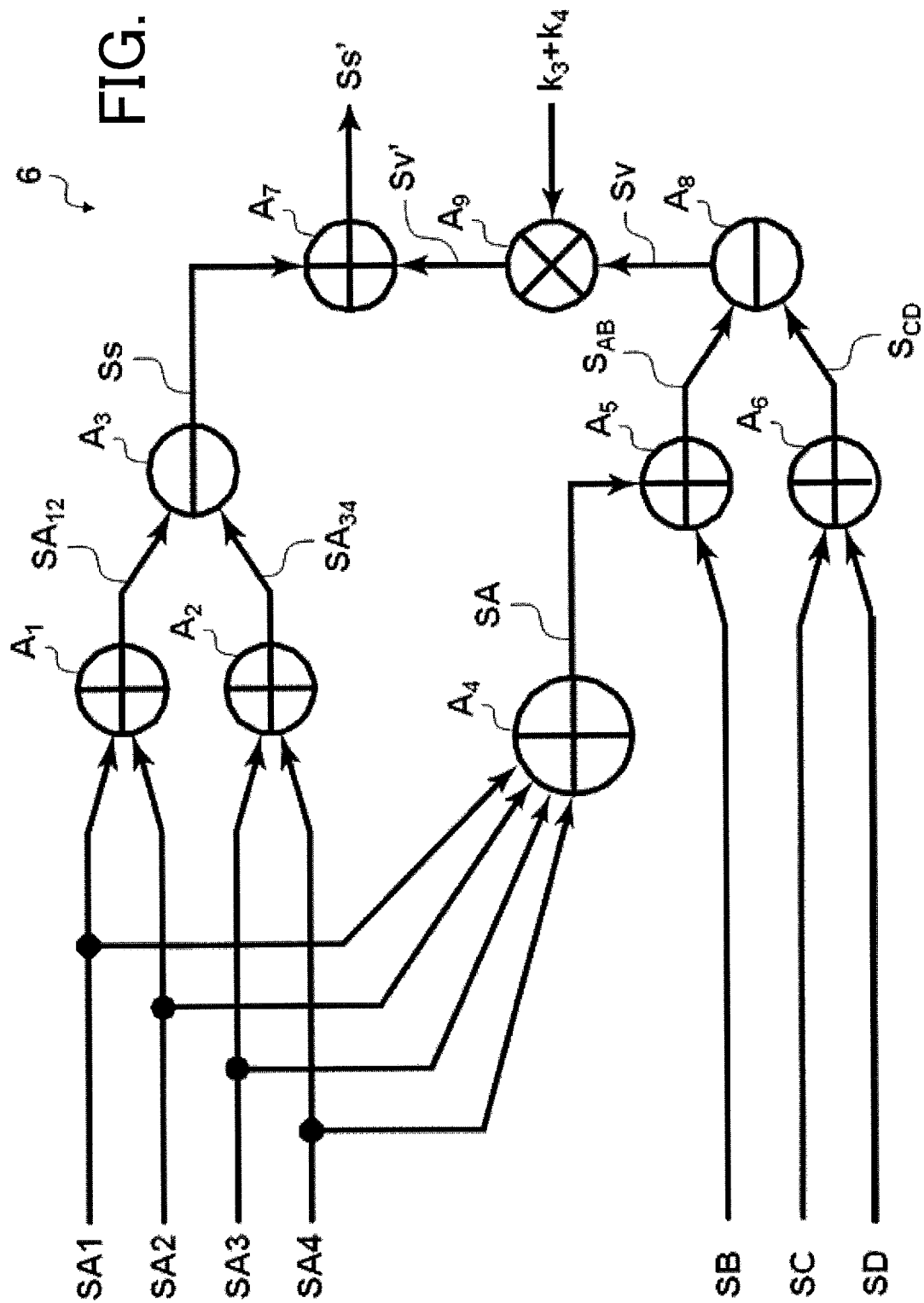
FIG. 27 is a signal processing block diagram showing a configuration of a signal processing circuit 6 of the variant example.

FIG. 27 is a signal processing block diagram illustrating a configuration of the signal processing circuit 6. This illustrates signal processing for outputting the displacement signal Sv and the angle change signal Ss' in the vertical direction of the beams of light 106a, 106b of the parallel light described in FIG. 18 and FIG. 19. FIG. 18 and FIG. 19 describe the cases in which the beams of light 106a, 106b have displacement in the vertical direction and angle change in the vertical direction. Note that the displacement signal Sh and the angle change signal Sp' in the horizontal direction are achieved with the same circuit configuration.

The signal $SA_1$ and the signal $SA_2$ are added by an adder $A_1$. The adder $A_1$ outputs a signal $SA_{12}$. The signal $SA_3$ and the signal $SA_4$ are added by an adder $A_2$. The adder $A_2$ outputs a signal $SA_{34}$.

The signal $SA_{12}$ and the signal $SA_{34}$ are subtracted by a subtractor $A_3$. The subtractor $A_3$ outputs a signal Ss.

The signal $SA_1$, the signal $SA_2$, the signal $SA_3$, and the signal $SA_4$ are added by an adder $A_4$. The adder $A_4$ outputs a signal SA.

The signal SB and the signal SA are added by an adder $A_5$. The adder $A_5$ outputs a signal $S_{AB}$.

The signal SC and the signal SD are added by an adder $A_6$. The adder $A_6$ outputs a signal $S_{CD}$.

The signal $S_{AB}$ and the signal $S_{CD}$ are subtracted by a subtractor $A_8$. The subtractor $A_8$ outputs a signal Sv.

A multiplier $A_9$ multiplies the signal Sv by $(k_3+k_4)$. The multiplier $A_9$ outputs a signal Sv'.

The signal Ss and the signal Sv' are added by an adder $A_7$. The adder $A_7$ outputs a signal Ss'.

Figure 28:
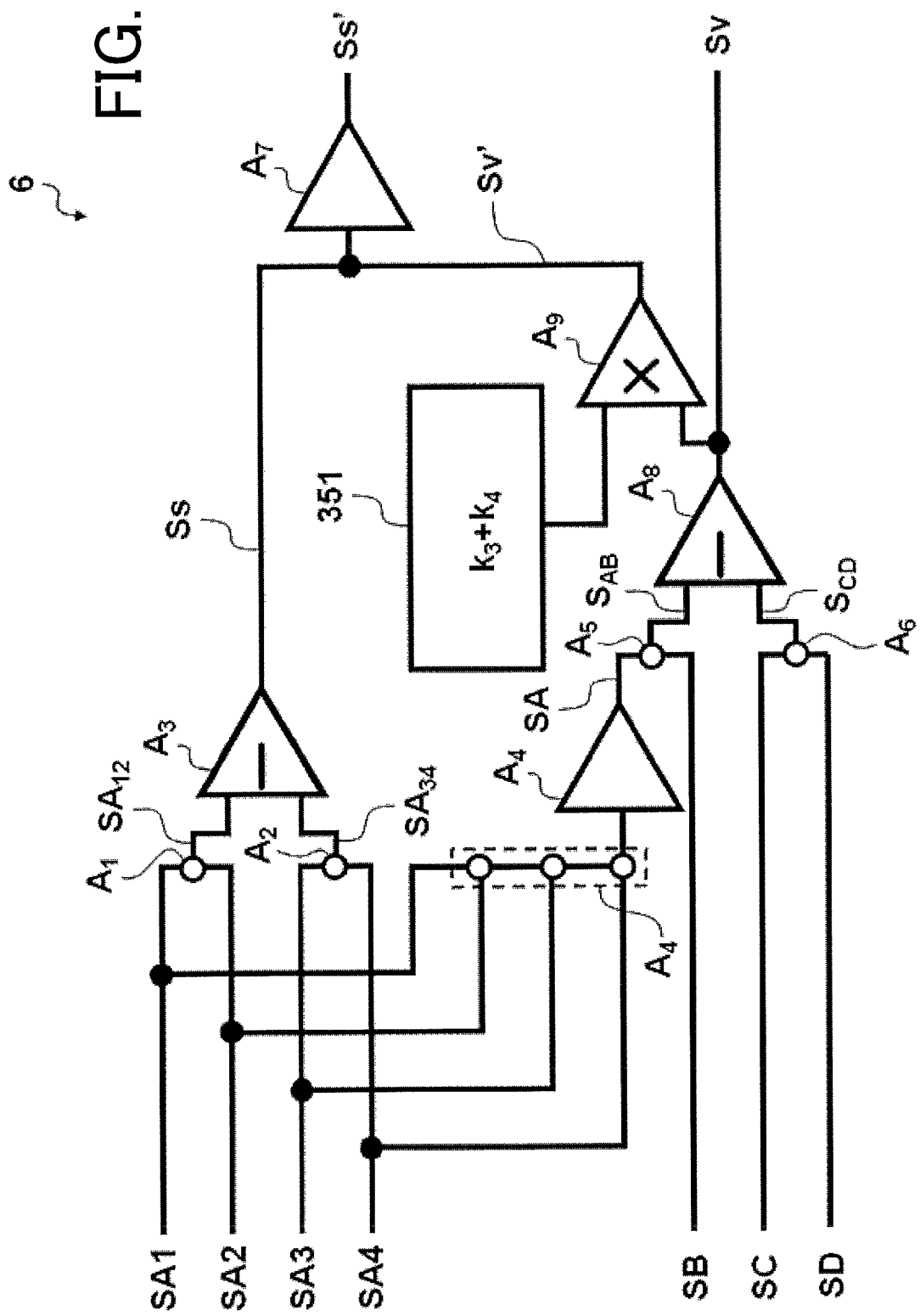
FIG. 28 is a diagram illustrating an adder-subtractor of an operational amplifier as a configuration of the signal processing circuit 6 of the variant example.

FIG. 28 is a diagram illustrating the signal processing illustrated in FIG. 27, with a circuit using an operational amplifier.

The detection device 93 of the variant example includes a circuit illustrated in FIG. 28 in the light detection integrated circuit 35.

Here, a coefficient setter 351 outputs a voltage or a current equivalent to the coefficient $(k_3+k_4)$ of equation (13). The coefficient setter 351 amplifies or attenuates the displacement signal Sv in the vertical direction, by a gain according to the voltage or the current equivalent to the coefficient $(k_3+k_4)$.

Moreover, the coefficient setter 351 may set the coefficient by adjusting a resistance value. According to this, the coefficient setter 351 can be configured with a general amplifier circuit. Thus, the coefficient setter 351 is a simple circuit.

Moreover, the coefficient setter 351 may be arranged outside the light detection integrated circuit 35. According to this, even when there is individual difference in coefficient $(k_3+k_4)$ between respective produced devices, it is easy for each coefficient setter 351 to adjust the coefficient $(k_3+k_4)$.

In the above, the displacement signal Sv or the like is mainly calculated on the basis of the difference between the signals output by the light detection element 3, as an example. However, the displacement signal Sv or the like can be calculated on the basis of a ratio between the signals output by the light detection element 3.

For example, next equation (18a) can be used instead of equation (1).

$$Sv=(SA+SB)/(SC+SD) \tag{18a}$$

Moreover, next equation (18b) can be used instead of equation (1), for example.

$$Sv=(SA \times SB)/(SC \times SD) \tag{18b}$$

Like these, the equation for calculating the displacement signal Sv or the like can be conceived variously.

Although the above description has described the forms integrated into the lidar device, the optical communication device, or the like, this is not a limitation. A detection device that detects the displacement and the angle change of the beam of light as an independent device can obtain the same effect.

Although the embodiments of the present invention have been described as above, the present invention is not limited to these embodiments.

On the basis of each of the above embodiments, the following matter will be written as additional statement (1) and additional statement (2). Each of additional statement (1) and additional statement (2) is denoted with reference numbers independently. Hence, "additional statement 1" exists in both of additional statement (1) and additional statement (2), for example.

<Additional Statement (1)>
<Additional Statement 1>

A light detection device comprising:
a diffraction element to diffract an incident beam of light; and
a light detection element including a light receiver to receive the diffracted light,
wherein the diffraction element generates beams of the diffracted light by dividing the beam of light, and
the light detection element determines a displacement of the beam of light relative to the diffraction element on the basis of quantities of light of the beams of the diffracted light, and determines an angle change of the beam of light relative to the diffraction element by dividing a quantity of light of one of the beams of the diffracted light.

<Additional Statement 2>

The light detection device according to additional statement 1, including a plurality of the light receivers corresponding to the beams of the diffracted light.

<Additional Statement 3>

The light detection device according to additional statement 2, wherein the light detection device determines a displacement direction of the beam of light relative to the diffraction element, on the basis of quantity of light received by the respective light receivers.

<Additional Statement 4>

The light detection device according to additional statement 2 or 3, wherein the light detection device determines a quantity of the displacement of the beam of light relative to the diffraction element, on the basis of each quantity of light received by the respective light receivers.

<Additional Statement 5>

The light detection device according to any one of additional statements 2 to 4, wherein at least one of the light receivers includes a plurality of first sub-light receivers that the light receiver is divided into.

<Additional Statement 6>

The light detection device according to additional statement 5, wherein the light detection device determines an direction of the angle change of the beam of light relative to the diffraction element, on the basis of each quantity of light received by the respective first sub-light receivers.

<Additional Statement 7>

The light detection device according to additional statement 6, wherein the light detection device determines the direction of the angle change in a state where the quantity of the displacement of the beam of light relative to the diffraction element determined on the basis of the each quantity of light received by the respective light receivers is controlled to a specific value or a specific range.

<Additional Statement 8>

The light detection device according to any one of additional statements 5 to 7, wherein the light detection device determines a quantity of the angle change of the beam of light relative to the diffraction element, on the basis of each quantity of light received by the respective first sub-light receivers.

<Additional Statement 9>

The light detection device according to additional statement 8, wherein the light detection device determines the quantity of the angle change on the basis of each quantity of change in the each quantity of light received by the respective first sub-light receivers estimated from the each quantity of light received by the respective first sub-light receivers and the quantity of the displacement of the beam of light relative to the diffraction element determined on the basis of the each quantity of light received by the respective light receivers.

<Additional Statement 10>

The light detection device according to any one of additional statement 5 to 9, wherein the plurality of first sub-light receivers are located in a direction in which the diffracted light is displaced on the light receiver including the first sub-light receivers when the beam of light is inclined relative to the diffraction element, the quantity of light received by the first sub-light receiver located in the direction in which the diffracted light is displaced increases, and the quantity of light received by the first sub-light receiver located in an opposite direction to the direction in which the diffracted light is displaced decreases.

<Additional Statement 11>

The light detection device according to additional statement 10, wherein the light detection device determines a quantity of the angle change or an direction of the angle change of the beam of light, by comparing the quantity of light of the diffracted light whose quantity of light has increased and the quantity of light of the diffracted light whose quantity of light has decreased.

<Additional Statement 12>

The light detection device according to any one of additional statements 1 to 11, wherein the diffraction element includes a plurality of diffraction areas, and the plurality of diffraction areas divide the beam of light.

<Additional Statement 13>

The light detection device according to additional statement 12, wherein the diffraction areas are a diffraction grating or a prism.

<Additional Statement 14>

The light detection device according to additional statement 12 or 13, wherein the plurality of diffraction areas are located in a direction in which the beam of light is displaced, the quantity of light of the diffracted light of the diffraction area located in the direction in which the beam of light is displaced increases, and the quantity of light of the diffracted light of the diffraction area located in an opposite direction to the direction in which the beam of light is displaced decreases.

<Additional Statement 15>

The light detection device according to additional statement 14, wherein the light detection device determines a quantity of the displacement or a displacement direction of the beam of light, by comparing the quantity of light of the diffracted light whose quantity of light has increased and the quantity of light of the diffracted light whose quantity of light has decreased.

<Additional Statement 16>

The light detection device according to any one of additional statements 12 to 15, wherein the diffraction element focuses the diffracted light in at least one of the plurality of diffraction areas.

<Additional Statement 17>

The light detection device according to any one of additional statements 1 to 16, wherein the diffraction element focuses at least a part of the diffracted light.

<Additional Statement 18>

The light detection device according to any one of additional statements 1 to 17, comprising a condensing element to focus the diffracted light emerged from the diffraction element, wherein the diffracted light is focused by the condensing element and reaches the light detection element.

<Additional Statement 19>

The light detection device according to any one of additional statements 16 to 18, wherein the light detection device determines whether the beam of light is diverging light or converging light, on the basis of a shape of astigmatism of the focused diffracted light.

<Additional Statement 20>

The light detection device according to any one of additional statements 16 to 18, wherein the light detection device determines whether the beam of light is diverging light or converging light, on the basis of a size of a diameter of a spot on the light receiver of the focused diffracted light.

<Additional Statement 21>

The light detection device according to any one of additional statements 16 to 20, wherein the light detection element includes a plurality of second sub-light receivers that the light receiver to receive the focused diffracted light is divided into.

<Additional Statement 22>

The light detection device according to additional statement 21, wherein the light detection device determines whether the beam of light is diverging light or converging light, on the basis of each quantity of light received by the respective second sub-light receivers.

<Additional Statement 23>

A lidar device comprising the light detection device according to any one of additional statements 1 to 22.

<Additional Statement 24>

An optical communication device comprising the light detection device according to any one of additional statements 1 to 22.

<Additional Statement (2)>

<Additional Statement 1>

A light detection device comprising:

a diffraction element including a plurality of diffraction areas, and to transmit and diffract one beam of light incident on the plurality of diffraction areas to generate beams of the diffracted light; and a light detection element including a plurality of light receivers corresponding to the beams of the diffracted light, and to generate signals according to each quantity of light of the diffracted light incident on the respective light receivers, wherein the plurality of diffraction areas are arranged side by side in a direction in which the beam of light is displaced, and displacement of the beam of light changes quantity of light of the beam of light incident on the respective diffraction areas, and thereby changes quantity of light of the respective beams of the diffracted light, at least one of the light receivers includes a plurality of first sub-light receivers that the light receiver is divided into, and the plurality of first sub-light receivers are arranged side by side in a direction in which the diffracted light beam is displaced on the light receiver including the first sub-light receivers when the beam of light is inclined relative to the diffraction element, so that angle change of the beam of light incident on the diffraction element changes each quantity of light received by the respective first sub-light receivers.

<Additional Statement 2>

The light detection device according to additional statement 1, wherein the quantity of light of the diffracted light beam of the diffraction area located in the direction in which the beam of light is displaced increases, and the quantity of light of the diffracted light beam of the diffraction area located in the opposite direction to the direction in which the beam of light is displaced decreases, and when the beam of light is inclined relative to the diffraction element, the quantity of light received by the first sub-light receiver located in the direction in which the diffracted light beam is displaced on the light receiver including the first sub-light receivers increases, and the quantity of light received by the first sub-light receiver located in the opposite direction to the direction in which the diffracted light beam is displaced on the light receiver including the first sub-light receivers decreases.

<Additional Statement 3>

The light detection device according to additional statement 1 or 2, wherein the diffraction area focuses the beams of the diffracted light.

<Additional Statement 4>

The light detection device according to any one of additional statements 1 to 3, wherein the diffraction area is a diffraction grating or a prism.

<Additional Statement 5>

The light detection device according to any one of additional statements 1 to 4, comprising a condensing element to focus the beams of the diffracted light emerged from the diffraction element, wherein the beams of the diffracted light are focused by the condensing element and reach the light detection element.

<Additional Statement 6>

The light detection device according to any one of additional statements 1 to 5, wherein at least one of the light receivers includes a plurality of second sub-light receivers that the light receiver is divided into, the diffracted light beam with astigmatism is incident on the plurality of second sub-light receivers, and the light detection device determines whether the beam of light is diverging light or converging light, by detecting an elongated direction of the diffracted light beam owing to the astigmatism by the second sub-light receivers.

DESCRIPTION OF REFERENCE CHARACTERS 1, 100, 101a, 101b, 102a, 102b, 103a, 103b, 104a, 104b, 105a, 105b, 106a beam of light, 10 +1st order diffracted light, 11, 110, 111a, 111b, 112a, 112b, 113a, 113b, 114a, 114b, 115a, 115b, 116a, 116b spot of diffracted light, 12, 120, 121a, 121b, 122a, 122b, 123a, 123b, 124a, 124b, 125a, 125b, 126a, 126b spot of diffracted light, 13, 130, 131a, 131b, 132a, 132b, 133a, 133b, 134a, 134b, 135a, 135b, 136a, 136b spot of diffracted light, 14, 140, 141a, 141b, 142a, 142b, 143a, 143b, 144a, 144b, 145a, 145b, 146a, 146b spot of diffracted light, 151, 152, 153 beam of light of diffracted light, 2 diffraction element, 21, 22, 23, 24 diffraction area, 3 light detection element, 31, 32, 33, 34 light receiver, 311, 312, 313, 314, 341, 342, 343, 344 sub-light receiver, 35 light detection integrated circuit, 351 coefficient setter, 4 housing, 5 condensing lens, 6 signal processing circuit, 9, 91, 92 detection device, $A_1$, $A_2$, $A_4$, $A_5$, $A_6$, $A_7$ adder, $A_3$, $A_8$ subtractor, $A_9$ multiplier, SA, SB, SC, SD, $SA_1$, $SA_2$, $SA_3$, $SA_4$, $SA_{12}$, $Sa_{34}$, $S_{AB}$, $S_{CD}$ signal, $SD_1$, $SD_2$, $SD_3$, $SD_4$ signal, Sv, Sv' displacement signal, Ss, Ss', Sh, Sh' angle signal, Sc parallelism signal, $f_0$ focal length, $f_1$ distance, $d_0$, $d_1$ incidence height, $dt_0$, $dt_1$ height, dt angle, C center position, Ca optical axis.

What is claimed is:

1. A light detection device comprising:

a diffraction element to diffract a beam of light that is incident on the diffraction element; and a light detection element including at least one light receiver to receive the diffracted light diffracted by the diffraction element, wherein the diffraction element generates beams of the diffracted light by dividing the beam of light, the light detection element determines a displacement of the beam of light relative to the diffraction element on the basis of quantities of light of the beams of the diffracted light, and determines an angle change of the beam of light relative to the diffraction element by dividing quantity of light of one of the beams of the diffracted light, the light detection element includes a plurality of the light receivers corresponding to the beams of the diffracted light, and at least one of the light receivers includes a plurality of first sub-light receivers that the light receiver is divided into.

2. The light detection device according to claim 1, wherein the light detection device determines a quantity of the displacement of the beam of light relative to the diffraction element, on the basis of each quantity of light received by the respective light receivers.

3. The light detection device according to claim 1, wherein the light detection device determines a quantity of the angle change of the beam of light relative to the diffraction element, on the basis of each quantity of light received by the respective first sub-light receivers.

4. The light detection device according to claim 3, wherein the light detection device determines the quantity of the angle change on the basis of each quantity of change in the each quantity of light received by the respective first sub-light receivers estimated from the each quantity of light received by the respective first sub-light receivers and the quantity of the displacement of the beam of light relative to the diffraction element determined on the basis of the each quantity of light received by the respective light receivers.

5. The light detection device according to claim 1, wherein the diffraction element includes a plurality of diffraction areas, and the plurality of diffraction areas divide the beam of light.

6. The light detection device according to claim 5, wherein the diffraction element makes the diffracted light focus, with at least one of the plurality of diffraction areas.

7. The light detection device according to claim 1, wherein the diffraction element focuses at least a part of the diffracted light.

8. The light detection device according to claim 1, further comprising:

a condensing element to focus the diffracted light emerged from the diffraction element, wherein the diffracted light is focused by the condensing element and reaches the light detection element.

9. The light detection device according to claim 6, wherein the light detection device determines whether the beam of light is diverging light or converging light, on the basis of a shape of astigmatism of the focused diffracted light.

10. The light detection device according to claim 6, wherein the light detection element includes a plurality of second sub-light receivers that the light receiver is divided into, the light receiver receiving the focused diffracted light.

11. The light detection device according to claim 10, wherein the light detection device determines whether the beam of light is diverging light or converging light, on the basis of each quantity of light received by the respective second sub-light receivers.

12. A light detection device comprising:
a diffraction element to diffract a beam of light that is incident on the diffraction element; and
a light detection element including at least one light receiver to receive diffracted light diffracted by the diffraction element,
wherein the diffraction element generates beams of the diffracted light by dividing the beam of light,
the light detection element determines a displacement of the beam of light relative to the diffraction element on the basis of quantities of light of the beams of the diffracted light, and determines an angle change of the beam of light relative to the diffraction element by dividing quantity of light of one of the beams of the diffracted light,
the diffraction element includes a plurality of diffraction areas,
the plurality of diffraction areas divide the beam of light,
the diffraction element makes the diffracted light focus, with at least one of the plurality of diffraction areas, and
the light detection device determines whether the beam of light is diverging light or converging light, on the basis of a shape of astigmatism of the focused diffracted light.

13. The light detection device according to claim 12, wherein the diffraction element focuses at least a part of the diffracted light.

14. The light detection device according to claim 12, further comprising:
a condensing element to focus the diffracted light emerged from the diffraction element,
wherein the diffracted light is focused by the condensing element and reaches the light detection element.

15. The light detection device according to claim 12, wherein the light detection element includes a plurality of sub-light receivers that the light receiver is divided into, the light receiver receiving the focused diffracted light.

16. The light detection device according to claim 15, wherein the light detection device determines whether the beam of light is diverging light or converging light, on the basis of each quantity of light received by the respective sub-light receivers.

17. A light detection device comprising:
a diffraction element to diffract a beam of light that is incident on the diffraction element; and
a light detection element including at least one light receiver to receive diffracted light diffracted by the diffraction element,
wherein the diffraction element generates beams of the diffracted light by dividing the beam of light,
the light detection element determines a displacement of the beam of light relative to the diffraction element on the basis of quantities of light of the beams of the diffracted light, and determines an angle change of the beam of light relative to the diffraction element by dividing quantity of light of one of the beams of the diffracted light,
the diffraction element includes a plurality of diffraction areas,
the plurality of diffraction areas divide the beam of light,
the diffraction element makes the diffracted light focus, with at least one of the plurality of diffraction areas, and
the light detection element includes a plurality of sub-light receivers that the light receiver is divided into, the light receiver receiving the focused diffracted light.

18. The light detection device according to claim 17, wherein the diffraction element focuses at least a part of the diffracted light.

19. The light detection device according to claim 17, further comprising:
a condensing element to focus the diffracted light emerged from the diffraction element,
wherein the diffracted light is focused by the condensing element and reaches the light detection element.

20. The light detection device according to claim 17, wherein the light detection device determines whether the beam of light is diverging light or converging light, on the basis of each quantity of light received by the respective sub-light receivers.

* * * * *